US012587947B2

(12) United States Patent
    Khalid

(10) Patent No.:    US 12,587,947 B2
(45) Date of Patent:        Mar. 24, 2026

(54) METHODS AND APPARATUS FOR CLIENT STICKINESS IN WIRELESS NETWORKS

(71) Applicant: Charter Communications Operating, LLC, St. Louis, MO (US)

(72) Inventor:   Saran Khalid, Denver, CO (US)

(73) Assignee: Charter Communications Operating, LLC, St. Louis, MO (US)

( * ) Notice:    Subject to any disclaimer, the term of this patent is extended or adjusted under 35 U.S.C. 154(b) by 410 days.

(21) Appl. No.: 18/208,583

(22) Filed:      Jun. 12, 2023

(65) Prior Publication Data

US 2024/0414632 A1     Dec. 12, 2024

(51) Int. Cl.
    *H04W 48/04*        (2009.01)
    *H04W 8/02*         (2009.01)
    *H04W 64/00*        (2009.01)

(52) U.S. Cl.
    CPC ............. *H04W 48/04* (2013.01); *H04W 8/02* (2013.01); *H04W 64/00* (2013.01)

(58) Field of Classification Search
    CPC ..... H04W 48/02; H04W 48/04; H04W 64/00; H04W 8/02
    USPC ................................................ 455/432.1, 511
    See application file for complete search history.

(56) References Cited

U.S. PATENT DOCUMENTS

| 8,548,489 B2 * | 10/2013 | Iwamura | ............... | H04W 88/16 |
| | | | | 455/438 |
| 9,144,082 B2 * | 9/2015 | Rubin | .................. | H04B 7/0408 |

| 12,094,018 B1 * | 9/2024 | O'Malley | .............. | G06N 20/00 |
| 2012/0221673 A1 * | 8/2012 | Lee | ......................... | G06F 9/451 |
| | | | | 709/213 |
| 2015/0223192 A1 * | 8/2015 | Cao | ................... | H04W 52/0219 |
| | | | | 370/252 |
| 2015/0281884 A1 * | 10/2015 | Smith | ..................... | G01S 19/13 |
| | | | | 455/456.3 |
| 2016/0330655 A1 * | 11/2016 | Vashi | .............. | H04W 36/00226 |
| 2019/0159119 A1 * | 5/2019 | Djordjevic | ............ | H04W 48/18 |
| 2022/0070649 A1 * | 3/2022 | Sahin | .................. | H04L 65/1073 |
| 2023/0079792 A1 * | 3/2023 | Zhu | ........................ | H04W 76/30 |
| | | | | 370/329 |

FOREIGN PATENT DOCUMENTS

WO        WO-2012001366 A2 *   1/2012   ............ H04W 64/00

* cited by examiner

*Primary Examiner* — Joseph Arevalo
(74) *Attorney, Agent, or Firm* — Straub & Straub; Stephen T. Straub; Michael P. Straub

(57)                ABSTRACT

The present invention relates to methods and apparatus for preventing roaming of user equipment on a first wireless network. An exemplary embodiment includes the steps of: receiving, at a location tracking device of a first wireless network, geographic location information for a user equipment device connected to a first wireless base station of the first wireless network; determining, by the location tracking device, whether or not to restrict the user equipment device from roaming to a second wireless network based on the received geographic location information; and when the determination is to restrict the user equipment device from roaming to the second wireless network, communicating a temporary roaming restriction instruction to the user equipment device, the temporary roaming restriction instruction when implemented by the user equipment device restricting the user equipment device from roaming to the second wireless network.

20 Claims, 19 Drawing Sheets

INDICATES POSITION/AREA OF BORDER SITES IN NATIVE NETWORK AFFECTED BY FOREIGN NETWORK

COUNTRY 1 (E.G., USA)

SITES COVERING BORDER AREA IN NATIVE NETWORK

INDICATES POSITION/AREA OF BORDER SITES IN NATIVE NETWORK AFFECTED BY FOREIGN NETWORK

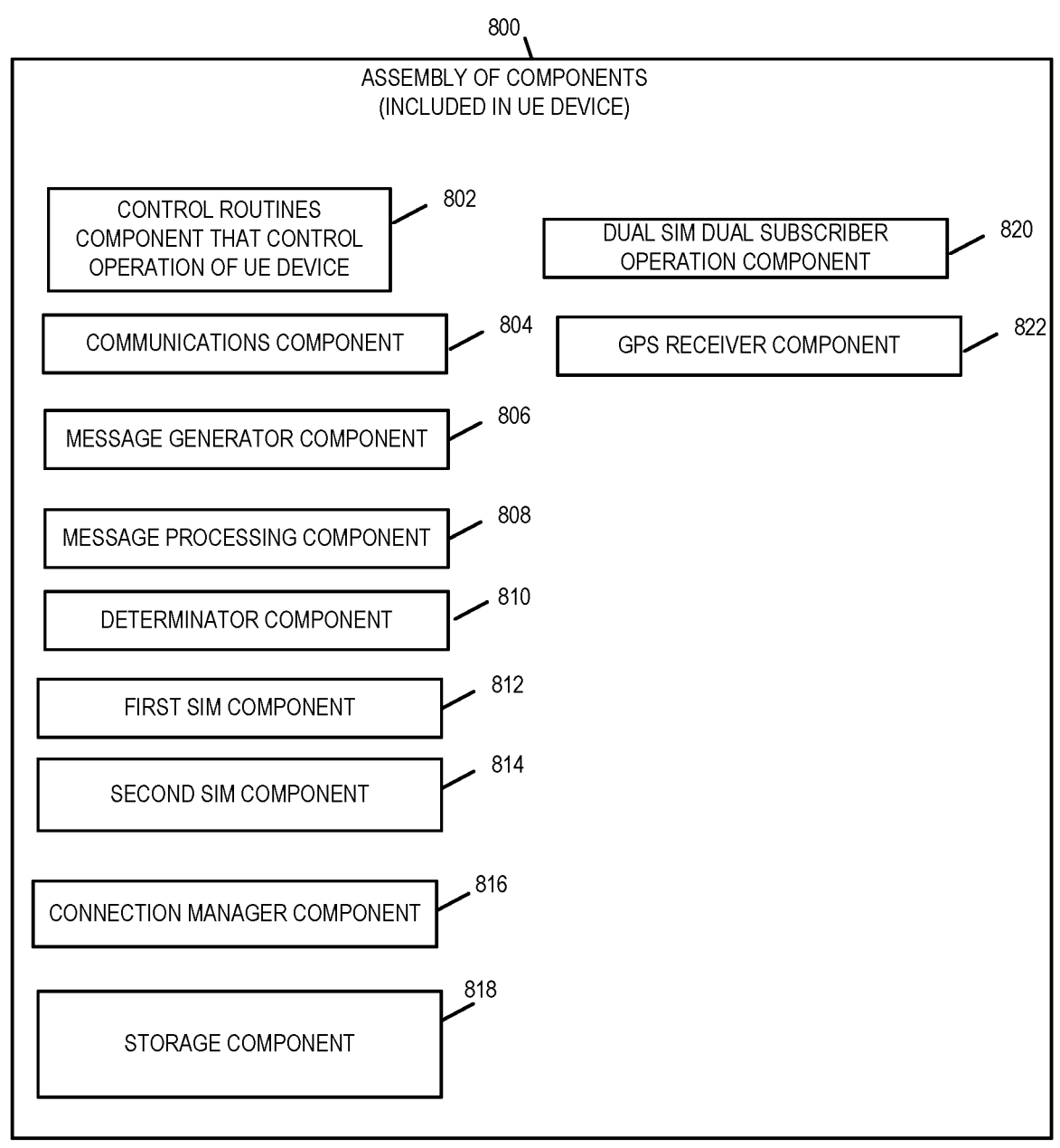

800

ASSEMBLY OF COMPONENTS
(INCLUDED IN UE DEVICE)

CONTROL ROUTINES
COMPONENT THAT CONTROL
OPERATION OF UE DEVICE — 802

COMMUNICATIONS COMPONENT — 804

MESSAGE GENERATOR COMPONENT — 806

MESSAGE PROCESSING COMPONENT — 808

DETERMINATOR COMPONENT — 810

FIRST SIM COMPONENT — 812

SECOND SIM COMPONENT — 814

CONNECTION MANAGER COMPONENT — 816

STORAGE COMPONENT — 818

DUAL SIM DUAL SUBSCRIBER
OPERATION COMPONENT — 820

GPS RECEIVER COMPONENT — 822

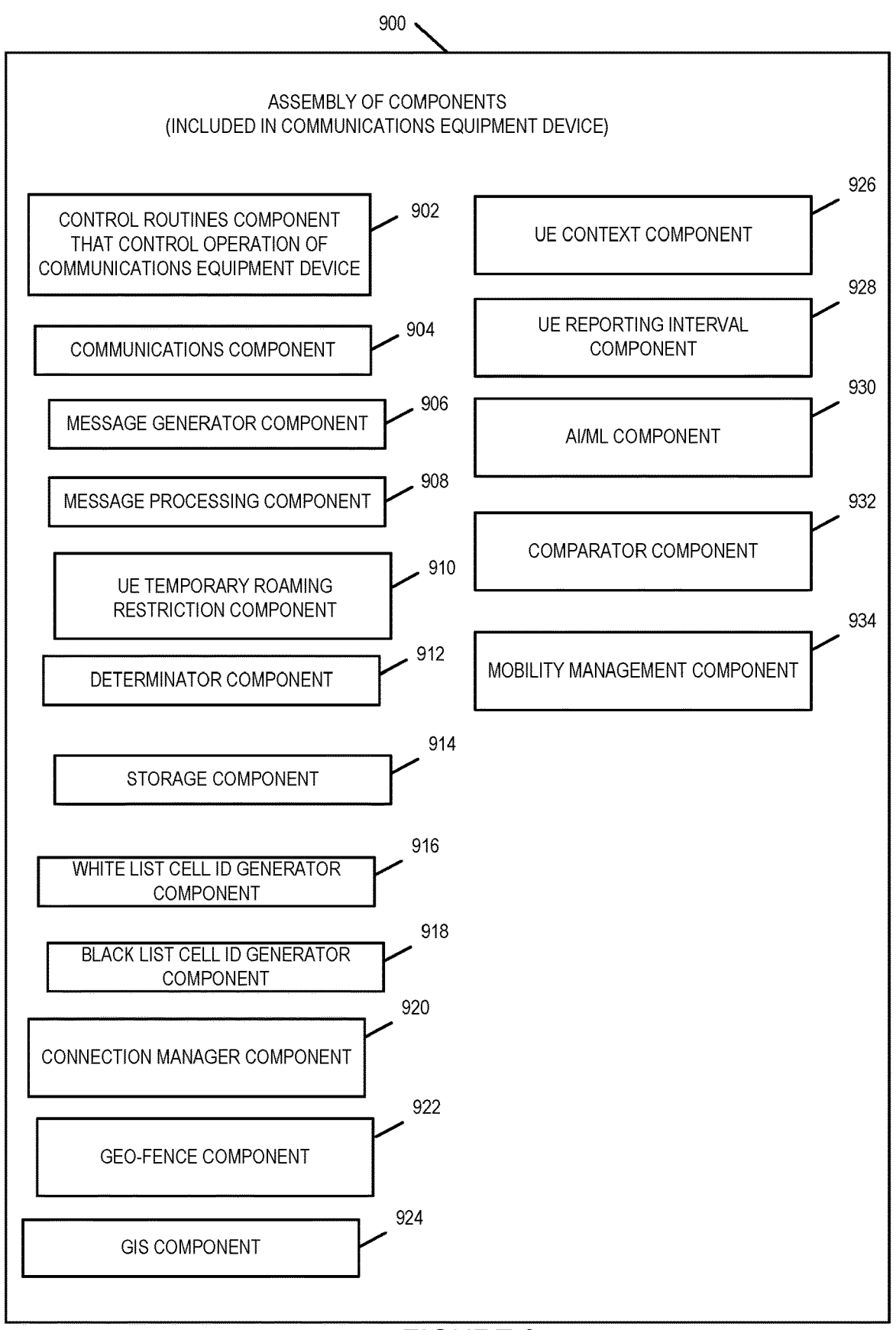

ASSEMBLY OF COMPONENTS
(INCLUDED IN COMMUNICATIONS EQUIPMENT DEVICE)

CONTROL ROUTINES COMPONENT THAT CONTROL OPERATION OF COMMUNICATIONS EQUIPMENT DEVICE — 902

COMMUNICATIONS COMPONENT — 904

MESSAGE GENERATOR COMPONENT — 906

MESSAGE PROCESSING COMPONENT — 908

UE TEMPORARY ROAMING RESTRICTION COMPONENT — 910

DETERMINATOR COMPONENT — 912

STORAGE COMPONENT — 914

WHITE LIST CELL ID GENERATOR COMPONENT — 916

BLACK LIST CELL ID GENERATOR COMPONENT — 918

CONNECTION MANAGER COMPONENT — 920

GEO-FENCE COMPONENT — 922

GIS COMPONENT — 924

UE CONTEXT COMPONENT — 926

UE REPORTING INTERVAL COMPONENT — 928

AI/ML COMPONENT — 930

COMPARATOR COMPONENT — 932

MOBILITY MANAGEMENT COMPONENT — 934

CONTROL ROUTINES
COMPONENT THAT CONTROL
OPERATION OF WIRELESS
BASE STATION          1002

ASSEMBLY OF COMPONENTS
(INCLUDED IN WIRELESS BASE STATION)

COMMUNICATIONS COMPONENT          1004

MESSAGE GENERATOR COMPONENT          1006

MESSAGE PROCESSING COMPONENT          1008

DETERMINATOR COMPONENT          1010

STORAGE COMPONENT          1012

1400

1450

1452     1454

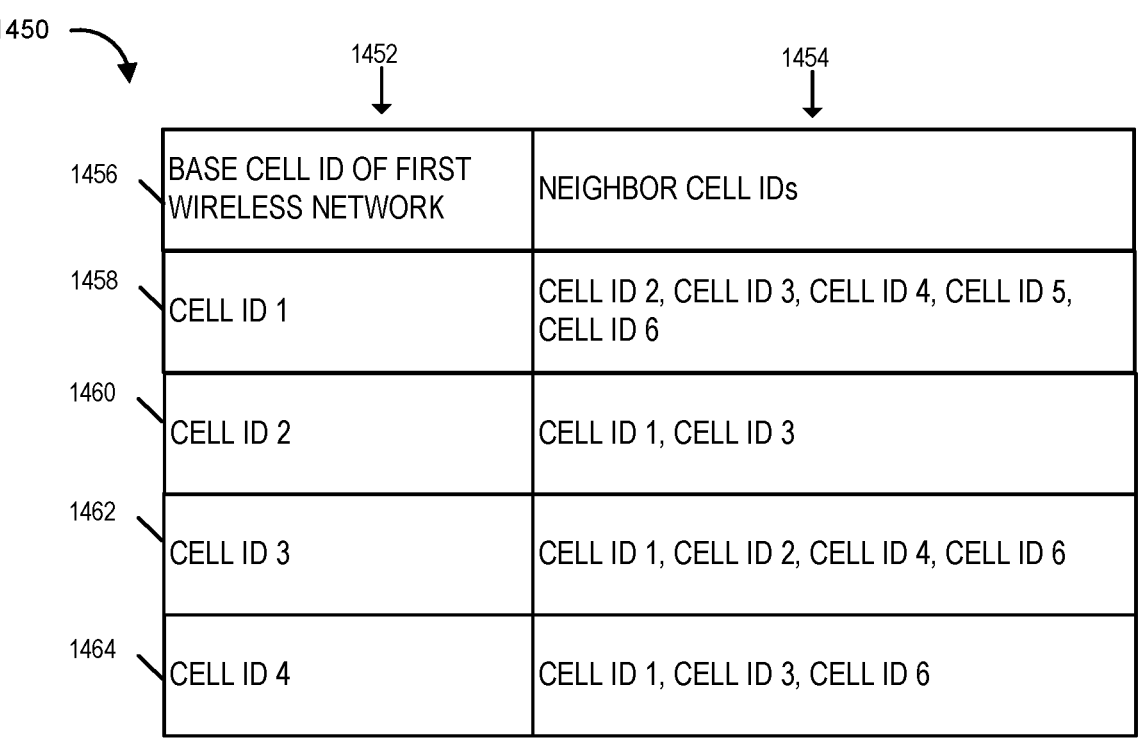

| BASE CELL ID OF FIRST WIRELESS NETWORK | NEIGHBOR CELL IDs |
|---|---|
| CELL ID 1 | CELL ID 2, CELL ID 3, CELL ID 4, CELL ID 5, CELL ID 6 |
| CELL ID 2 | CELL ID 1, CELL ID 3 |
| CELL ID 3 | CELL ID 1, CELL ID 2, CELL ID 4, CELL ID 6 |
| CELL ID 4 | CELL ID 1, CELL ID 3, CELL ID 6 |

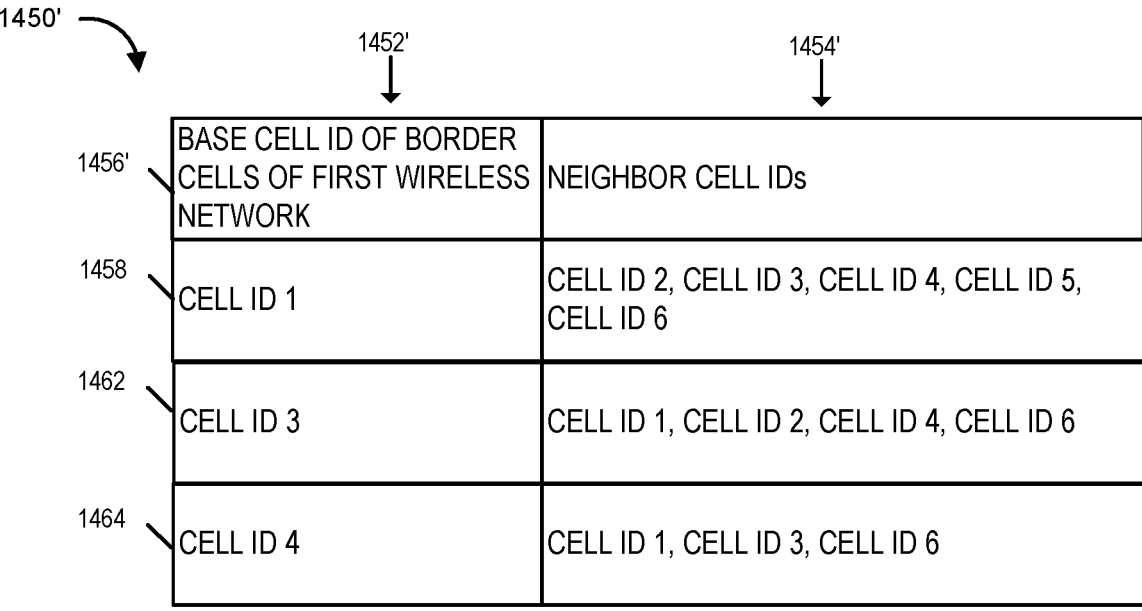

| BASE CELL ID OF BORDER CELLS OF FIRST WIRELESS NETWORK | NEIGHBOR CELL IDs |
|---|---|
| CELL ID 1 | CELL ID 2, CELL ID 3, CELL ID 4, CELL ID 5, CELL ID 6 |
| CELL ID 3 | CELL ID 1, CELL ID 2, CELL ID 4, CELL ID 6 |
| CELL ID 4 | CELL ID 1, CELL ID 3, CELL ID 6 |

| BASE CELL ID OF BORDER CELLS OF FIRST WIRELESS NETWORK | NEIGHBOR CELL RESTRICTIONS WHITE LIST AND BLACK LIST NEIGHBOR CELL IDs |
|---|---|
| CELL ID 1 | WHITE LIST - CELL ID 2, CELL ID 3, CELL ID 4 BLACK LIST- CELL ID 5, CELL ID 6 |
| CELL ID 3 | WHITE LIST - CELL ID 1, CELL ID 2, CELL ID 4 BLACK LIST - CELL ID 6 |
| CELL ID 4 | WHITE LIST  - CELL ID 1, CELL ID 3 BLACK LIST - CELL ID 6 |

Figure 17:
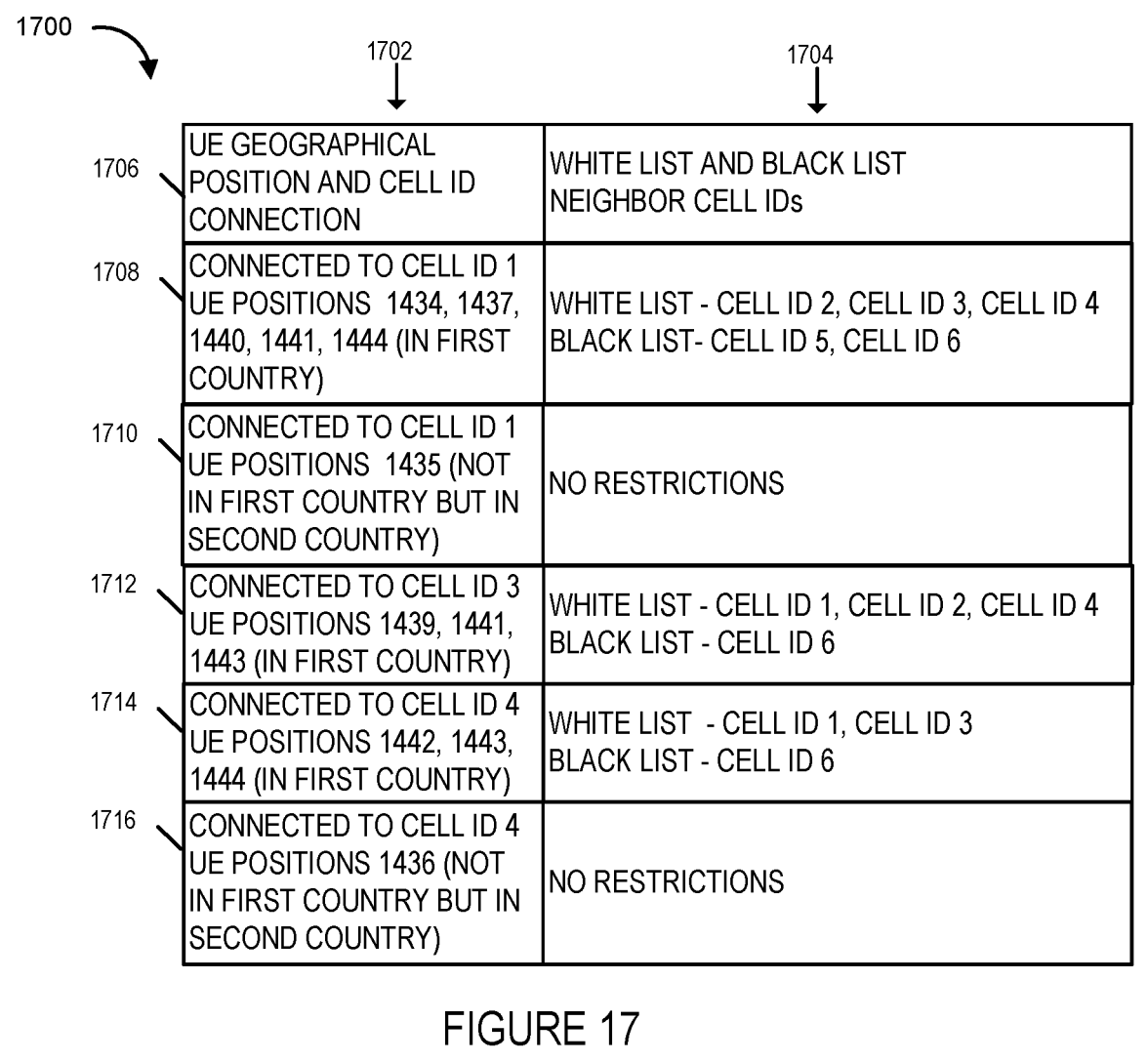

1700

1702                    1704

| UE GEOGRAPHICAL POSITION AND CELL ID CONNECTION | WHITE LIST AND BLACK LIST NEIGHBOR CELL IDs |
|---|---|
| 1706 | |
| 1708 CONNECTED TO CELL ID 1 UE POSITIONS 1434, 1437, 1440, 1441, 1444 (IN FIRST COUNTRY) | WHITE LIST - CELL ID 2, CELL ID 3, CELL ID 4 BLACK LIST- CELL ID 5, CELL ID 6 |
| 1710 CONNECTED TO CELL ID 1 UE POSITIONS 1435 (NOT IN FIRST COUNTRY BUT IN SECOND COUNTRY) | NO RESTRICTIONS |
| 1712 CONNECTED TO CELL ID 3 UE POSITIONS 1439, 1441, 1443 (IN FIRST COUNTRY) | WHITE LIST - CELL ID 1, CELL ID 2, CELL ID 4 BLACK LIST - CELL ID 6 |
| 1714 CONNECTED TO CELL ID 4 UE POSITIONS 1442, 1443, 1444 (IN FIRST COUNTRY) | WHITE LIST - CELL ID 1, CELL ID 3 BLACK LIST - CELL ID 6 |
| 1716 CONNECTED TO CELL ID 4 UE POSITIONS 1436 (NOT IN FIRST COUNTRY BUT IN SECOND COUNTRY) | NO RESTRICTIONS |

| UE 1 MOVING OUT OF COVERAGE OF NATIVE NETWORK | UE 2 MOVING INTO COVERAGE OF NATIVE NETWORK |

1812

1807

UE 2

METHODS AND APPARATUS FOR CLIENT STICKINESS IN WIRELESS NETWORKS

FIELD OF INVENTION

The present invention relates to methods and apparatus for keeping wireless client devices on a first wireless network (i.e., client stickiness) by preventing roaming to a second wireless network based on geographical position information of the wireless client devices.

BACKGROUND OF THE INVENTION

Wireless networks operate within country borders independently and may use the same spectrum already in use by a different carrier across a country border. For example, two different wireless operators may operate different wireless networks on different sides of a border separating two countries.

Each of the two wireless operators being responsible for providing wireless services in their respective countries. However, the wireless coverage area of the two wireless operators does not strictly remain within the borders of their respective countries. Instead, the wireless signals from the wireless base stations of each of the operators shots or travels to the other side of the border as well. In which case, the coverage area of each of the two wireless operators includes locations, sites or areas on the opposite side of the border from which the wireless base station is located. This can cause roaming issues in which the subscribers can get charged incorrectly if they get transferred from their native network to a non-native network on the other side of the border between the two countries. This happens for example, when the two operators across the border from each other have a roaming agreement, i.e., the subscribers or clients are automatically placed on the operator or carrier's network across the border when the radio frequency (RF) conditions are good.

This situation can and typically does happen in border areas such as for example, where rivers separate the countries, or even where streets are located close to a border between countries. This problem can also occur in Hybrid Mobile Network Operator systems in which it is desirable for the HMNO operator/service provider to keep user equipment devices (i.e., client devices) on the HMNO network, i.e., the native network, instead of being transferred to a non-native network.

From the foregoing, it should be understood that there is a need for new and/or improved methods and apparatus to solve the problem of wireless subscribers unfairly getting charged for roaming while they are still within the native country of subscription. There is further need for new and/or improved methods and apparatus to implement temporary roaming restrictions on user equipment devices near borders between two countries based on the user equipment device's location as well as assessments of the native wireless network and the foreign wireless network as reported by user equipment devices. There is a further need that the solution not introduce overhead communications for all user equipment devices across the network which would add congestion to the network.

From the foregoing, it should be understood that there is a need for new and/or improved methods and apparatus for keeping user equipment devices on their native wireless network when in an area, location and/or site which have overlapping coverage with foreign wireless network(s). There is a need for new and/or improved methods and apparatus for temporarily restricting user equipment devices (e.g., client devices) from roaming onto foreign wireless networks base stations located in a foreign country when the user equipment devices are physically located within the native country. There is a further need for new and/or improved methods and apparatus for determining dynamically and in real time determining which of two networks a user equipment device should connect to based on the user equipment devices location and subscriber agreement.

There is a further need for new and/or improved methods and apparatus for implementing temporary roaming restrictions on user equipment devices which are dynamically updated in real time so as to reduce costs associated with providing services to the user equipment devices. There is a further need for new and/or improved methods and apparatus for automatically optimizing the number of reporting messages sent by user equipment devices reporting location information to a network equipment device for location tracking purposes so as to not overload a network. There is a further need for new and/or improved methods for solving the technological problem of how to restrict user equipment devices from roaming off of native networks when in the native country of a first native wireless network while allowing the same user equipment devices to roam onto a foreign network when located in the foreign country.

From the foregoing, it should be understood that there is a need for new and/or improved methods and apparatus for eliminating roaming charges when a user equipment device is within an that has overlapping cell coverage from multiple wireless networks. From the foregoing it should be understood that there is a need for new and/or improved methods and apparatus for providing dynamic real time temporary roaming and connection restrictions via a wireless core network for user equipment device operating in areas with overlapping coverage from multiple networks. From the foregoing, it should be understood that there is a need for new and improved methods and/or apparatus for identifying regions/coverage areas of a first wireless network with overlapping coverage areas from a second wireless network that are negatively affected by the second wireless network.

SUMMARY OF THE INVENTION

Various embodiments of the present invention provide new and/or improved methods and apparatus for, among other things, keeping user equipment devices on native networks by temporarily imposing roaming restrictions on user equipment devices based on a user equipment device's physical geographic location. Various embodiments of the present invention are also particularly useful for preventing user equipment devices of a native wireless network from roaming onto a foreign wireless network based in a foreign country and incurring roaming charges when the user equipment devices are located in the native country but near the border of the native country and foreign country. Various embodiments of the present invention is particularly useful for Hybrid Mobile Network Operators who have a MVNO network and a MSO network, the MVNO network operated on behalf of the Hybrid Mobile Network Operator by an independent Mobile Network Operator different than the Hybrid Mobile Network Operator. Various embodiments of the present invention solve one or more of the problems discussed above.

In one exemplary embodiment in accordance with present invention, temporary roaming restrictions are determined and applied for user equipment devices (e.g., mobile devices) of a wireless network physically located near a country's border. The roaming restrictions are determined dynamically in real time by a location tracker device located in or attached to the core network based on the physical geographical location reported by the user equipment's device to the location tracker device. The temporary roaming restrictions prevent the user equipment device from roaming onto a foreign network's based on the location of the user equipment device and therein keep the user equipment device on its native network when the user equipment device is in its native country. As the geographic location of the user equipment device changes the temporary restrictions are updated. The system and methods are typically only applied to border sites and not the entire network. Border sites are areas such as for example cells or cell sectors near the border which have been identified as having overlapping cell coverage from a foreign network located in the foreign country across the border. This done to avoid increasing overhead communications for all the user equipment devices across the entire network which would occur if all user equipment devices had to continuously report physical geographic location information. Instead, by limiting the system and method to border sites the overhead communications on the network is limited to the exchange of messages between user equipment devices in the border site areas and the location tracker device.

An exemplary communications method of in accordance with one embodiment of the present invention includes the steps of: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

In some embodiments, the first user equipment device is a subscriber of the first wireless network and includes subscriber identification information for the first wireless network (e.g., a SIM card or e-SIM with subscriber credentials for operation on the first wireless network); and the first wireless network and the second wireless network have a roaming agreement allowing user equipment devices subscribed to the first wireless network (e.g., having first wireless network subscriber credential information) to roam onto the second wireless network to receive services.

In some method embodiments, the method further includes the step of: charging (e.g., by an operator of the second wireless network) roaming charges to any user equipment device of the first wireless network (e.g., subscriber of the first wireless network) that roams onto the second wireless network.

In some embodiments, the first wireless network includes a plurality of wireless base stations which are located and operated within a first country, said first wireless base station being one of the plurality of first wireless network base stations located and operated in the first country; the second wireless network includes a plurality of wireless base stations which are located and operated within a second country, said second wireless base station being one of the plurality of second wireless network base stations located and operated in the second country; and the one or more of the second wireless network base stations have cell coverage extending into and overlapping with the cell coverage in the first country provided by one or more of the first wireless network base stations.

In various embodiments, the second wireless base station has cell coverage extending into and overlapping with the cell coverage of the first wireless base station in the first country.

In some embodiments, one or more of the first wireless network base stations have cell coverage extending into and overlapping with the cell coverage in the second country provided by one or more of the second wireless network base stations.

In some embodiments, the first wireless network and the second wireless network operate using the same or overlapping wireless spectrum to wirelessly communicate with user equipment devices allowing user equipment devices of the first wireless network to connect to wireless base stations of the second wireless network.

In some embodiments, the first wireless network uses a first set of spectrum to communicate with user equipment devices on the first wireless network and the second wireless network utilizes a second set of spectrum to communicate with user equipment devices on the second wireless network, said first and said second set of spectrum being different; and at least some of the user equipment devices of the first wireless network are equipped to operate on both the first set of spectrum and the second set of spectrum (e.g., by having two transceivers, a first transceiver for communicating on the first set of spectrum and a second transceiver for operating on the second set of spectrum).

In various embodiments, the temporary roaming restriction instruction also includes a location reporting interval or time period instructing the first user equipment device to report its geographic location on a recurring basis each time the interval or time period expires.

In various embodiments, the reporting interval is based on the geographic position of the first user equipment device and one or more of the following: velocity and heading of the first user equipment.

In some embodiments, the method further includes the steps of: receiving from the first user equipment device travel data for a first period of time (e.g., a month); using an artificial intelligence machine learning system to analyze the first user equipment device travel data to determine travel patterns for the first user equipment device; and determining based on said determined travel patterns determining a set of reporting intervals for the first user equipment device. In some such embodiments, the travel data includes GPS location information, velocity information and heading information for the first wireless device taken at regular intervals (e.g., every 5 minutes). In some embodiments, the set of reporting intervals for the first user equipment device include different intervals based on GPS location, velocity, and heading and time of day and day of the week (e.g., different intervals for weekdays than weekends, different intervals for commuting times for the first user equipment device than the non-commuting times).

In various embodiments, the method further includes the steps of: receiving, at the location tracking device of the first wireless network, second geographic location information for the first user equipment device connected to the first wireless base station of the first wireless network at the expiration of the first reporting interval; dynamically determining in real time, by the location tracking device, whether or not to remove the temporary restriction on the first user equipment device from roaming to a second wireless network based on the received second geographic location information; and when said determination is to remove the restriction on the first user equipment device from roaming to the second wireless network, communicating a roaming restriction removal instruction to the first user equipment device, said roaming restriction removal instruction when implemented by the first user equipment device removing any temporary restrictions on the first user equipment device from roaming to the second wireless base station. This occurs for example when the first user equipment device's second geographic location information indicates that the first user equipment device is outside the first country in which the first wireless network is operating/has base stations or the second geographic location information indicates that the first user equipment device has crossed a geo-fence around the border coverage area of the first wireless network.

In some embodiments, when said determination is to not remove the restriction on the first user equipment device from roaming to the second wireless network, determining based on the second geographic location information: (i) whether to shorten, increase, or maintain the reporting interval for the first user equipment device, (ii) whether the roaming restriction instruction needs to be updated (e.g., previously provided white list or black list of cell IDs needs to be updated based on the second geographic location information); and communicating any changed or updated reporting interval or roaming restriction instructions to the first user equipment device.

In some embodiments, the first geographic location information is Global Positioning System (GPS) information including a first set of GPS coordinates for the first user equipment device.

In some embodiments, the roaming restriction instruction includes a list of cell identifiers. In some such embodiments, each cell identifier identifies a cell or a cell sector. In some embodiments, each cell identifier is a globally unique identifier.

In various embodiments, the list of cell identifiers is a black list of cell identifiers which identify neighbor cells and cell sectors of the second wireless network; and said temporary roaming restriction instruction includes an indication that the first user equipment device is restricted from roaming or connecting to all cells and cell sectors with a cell identifier included on the list of cell identifiers.

In some embodiments, the list of cell identifiers is a white list of cell identifiers which identify neighbor cells or cell sectors of the first wireless network; and the roaming restriction instruction includes an indication that the first user equipment device is restricted to only roam or connect to a cell or a cell sector having a cell identifier included on the list of cell identifiers.

In some embodiments, the method further includes the step of: prior to said receiving at the location tracking device said first geographic location information for the first user equipment device, determining a cell ID for each cell or cell sector of the second wireless base station with coverage that extends into and overlaps with cell coverage provided by the first wireless base station in a first cell or cell sector of the first wireless base station, said first cell or cell sector of the first wireless base station having a first cell ID. In some such embodiments, the first set of GPS coordinates for the first user equipment device indicates the first user equipment device is within a first area of the first cell or cell sector of the first wireless base, said first area of the first cell or cell sector being an area identified by the first wireless network as an area in which user equipment devices of the first wireless network are to be restricted from roaming onto cells or cell sectors of wireless base stations of the second wireless network.

In various embodiments, the first cell ID is different than any cell ID of any cell or cell sector of the second wireless network.

In various embodiments, the method further includes the step of prior to said receiving at the location tracking device said first geographic location information for the first user equipment device, generating a black list of cell IDs for use in restricting user equipment devices connected to the first wireless base station in the first cell or cell sector having the first cell ID from roaming to the second wireless network based on the determined cell IDs for each cell or cell sector of the second wireless base station with coverage that extends into and overlaps with cell coverage provided by the first wireless base station in the first cell or cell sector of the first wireless base station.

In various embodiments, the method further includes the steps of prior to said receiving at the location tracking device said first geographic location information for the first user equipment device, determining a cell ID for each cell or cell sector of the wireless base station of the first wireless network with coverage that extends into and overlaps with cell coverage provided by the first wireless base station in the first cell or cell sector of the first wireless base station; and generating a white list of cell IDs for use in restricting user equipment devices connected to the first wireless base station in the first cell or cell sector having the first cell ID from roaming to the second wireless network based on the determined cell IDs for each cell or cell sector of the wireless base stations of the first wireless network with coverage that extends into and overlaps with cell coverage provided by the first wireless base station in the first cell or cell sector of the first wireless base station, said user equipment devices being permitted to only roam onto cells or cell sectors with the determined cell IDs on said white list of cell IDs.

In some embodiments, the first area is within a first country in which the first wireless base station is located.

In some embodiments, when said determination is not to restrict the first user equipment device from roaming to the second wireless network, the method further includes the steps of: determining by the location tracking device whether any temporary roaming restrictions have been communicated to the first user equipment device which are still in effect; and in response to determining that temporary roaming restrictions are still in effect at the first user equipment device generating a roaming restriction removal instruction for the first user equipment device, said roaming restriction removal instruction when implemented by the first user equipment device removes any temporary roaming restrictions previously communicated to the first user equipment device from the location tracker device; and communicating, by the location tracker device, the generated roaming restriction removal instruction to the first user equipment device.

In some embodiments, the method further includes that prior to said receiving at the location tracking device said first geographic location information for the first user equipment device, identifying geographical areas in which temporary roaming restrictions are to be applied to user equipment devices connected to the first wireless base station to prevent roaming from the first wireless base station to the second wireless network. In some embodiments, the first geographic location information indicates the first user equipment device is not located within one of the identified geographical areas in which temporary roaming restrictions are to be applied to user equipment devices connected to the first wireless base station to prevent roaming from the first wireless base station to the second wireless network.

In various embodiments, the identified geographical areas in which temporary roaming restrictions are to be applied to user equipment devices connected to the first wireless base station to prevent roaming from the first wireless base station to the second wireless network are all areas within a first country in which the first wireless network operates and in which the first wireless base station is located.

In various embodiments, the method further includes the steps of: prior to said receiving at the location tracking device said first geographic location information for the first user equipment device, receiving a first notification message (e.g., from a AMF of the first wireless network), at the location tracker device, said first notification message including information indicating that the first user equipment device is connected to a border site of the first wireless network, the information including a cell identifier and a user equipment device identifier, the cell identifier uniquely identifies the first wireless network cell or cell sector in which the first user equipment device is located, the user equipment device identifier uniquely identifies the first user equipment device; in response to receiving the first notification message generating, by the location tracker device, a first location reporting instruction message, said first location reporting instruction message instructing the first user equipment device to report the first user equipment device's geographical location; and communicating the first location reporting instruction message to the first user equipment device (e.g., via the AMF). In some such embodiments, the first location reporting instruction message includes: a first reporting interval, said first reporting interval indicating that the first user equipment device is to report the first user equipment device's location on a recurring basis when an amount of time equal to the first reporting interval expires; and format information specifying the format in which the geographical location is to be provided, said format information specifying the format to be as Global Positioning System (GPS) coordinates.

In some embodiments, the method further includes the steps of: generating by the first user equipment device the first geographic location information in response to receiving the first location reporting instruction message, said first geographic location information including the Global Positioning System (GPS) coordinates of the first user equipment device; and communicating the first geographic location information to the location tracker device.

In some embodiments, the first wireless network is a hybrid mobile network operator network operated by a first network operator; the second wireless network is a mobile network operator network operated by a second network operator, said first and second network operators being different; the first network operator and second network operator have entered into an agreement allowing user equipment devices of the first wireless network to operate on the second wireless network; and the coverage area of the first wireless base station and the second wireless base station overlap.

In some embodiments, prior to said receiving at the location tracking device said first geographic location information for the first user equipment device, the method includes the step of determining geographical boundaries of the first wireless network with respect to the second wireless network. In some embodiments, the step of making the determination of whether or not to restrict the first user equipment device from roaming to the second wireless network based on the received first geographical location information includes: determining, by the location tracker device, whether or not the first geographic location information indicates that the first user equipment device is located within the determined boundaries of the first wireless network.

The present invention is also applicable to apparatus and system embodiments wherein one or more devices implement the steps of the method embodiments. In some apparatus embodiments each of the location tracker device, location tracker server, location tracking services device, Geographic Information System, Artificial Intelligence/Machine Learning device/system, Access and Mobility Management Function (AMF) node/device, wireless base stations, user equipment devices, network equipment devices and each of the other apparatus, devices, nodes, entities of the system include one or more processors and/or hardware circuitry, input/output interfaces including receivers and transmitters, and a memory. The memory including instructions which when executed by one or more of the processors control the apparatus/device/node/entity of the system to operate to perform the steps and/or functions of various method embodiments of the invention.

The present invention is also applicable to and includes apparatus and systems such as, for example, apparatus and systems that implement the steps and/or functions of the method embodiments. For example, a location tracker device in accordance with one embodiment of the present invention includes: memory, and a first processor, said first processor controlling the location tracker device to perform the following operations: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 8 illustrates an exemplary assembly of components for a user equipment device in accordance with an embodiment of the present invention.

FIG. 9 illustrates an exemplary assembly of components for a communications equipment device in accordance with an embodiment of the present invention.

FIG. 14 illustrates an exemplary table which correlates base cell ID of each of a set of first wireless network cells with the neighbor cell IDs of each of the base cell's neighbors in accordance with an embodiment of the present invention.

FIG. 15 illustrates an exemplary table that include base cell IDs of border cells of a first wireless network and their corresponding neighbor cell IDs in accordance with an embodiment of the present invention.

FIG. 17 illustrates an exemplary table that provides information mapping a UE geographical position and cell ID to which a UE is connected with a white list and black list of neighbor cell IDs that can be used to restrict the UE from roaming off of a first wireless network in accordance with an embodiment of the present invention.

DETAILED DESCRIPTION

Figure 1:
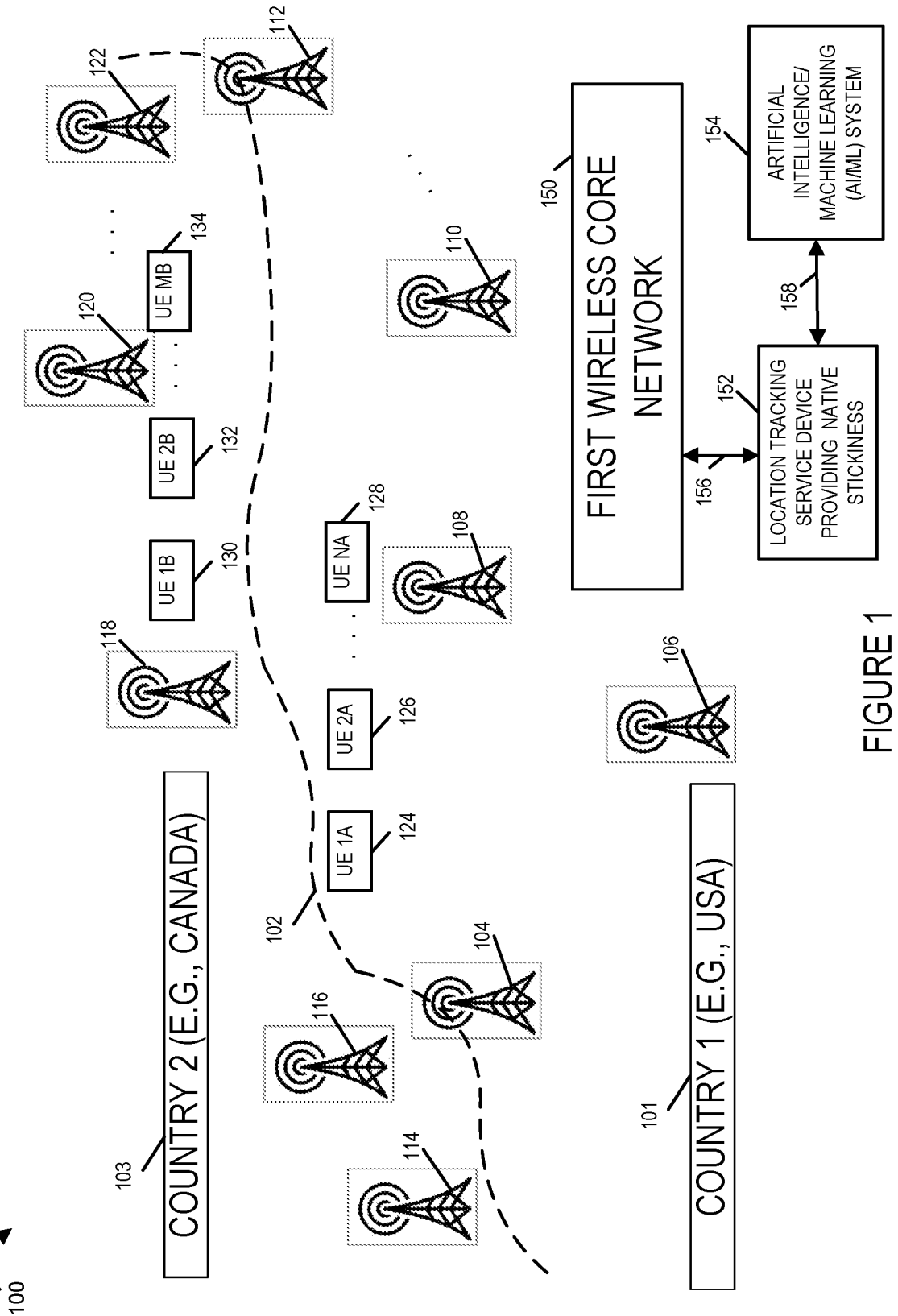
FIG. 1 illustrates an environment with a border between two countries with wireless base stations of two different wireless networks on opposite sides of the border in accordance with an embodiment of the present invention.

As previously discussed above, wireless networks operate within country borders independently and may use the same spectrum already in use by another carrier's wireless network across the country's border. Diagram 100 of FIG. 1 illustrates an environment including a border 102 between two countries (a first country 101 (e.g., United States of America (USA)) and a second country 103 (e.g., Canada) with wireless base stations of two different wireless networks on opposite sides of the border 102 in accordance with an embodiment of the present invention.

The wireless base stations 104, 106, 108, 110, . . . , 112 are part of a first wireless network operated by a first wireless network operator located in the first country 101 (e.g., USA). The first wireless network also includes a first wireless core network 150, a location tracking service device 152, an artificial intelligence/machine learning (AI/ML) system 154 and communications links which couple the equipment and devices of the first wireless network to one another so that they can communicate and/or exchange data, information and messages between the various components of the first wireless network. The first wireless network is sometimes referred to herein as first system or first network. The communications links, may be, wired, wireless, or optical communications links but are typically wired or optical. The communications links connecting the wireless base stations to the first wireless core network or to one another are not shown. The communications links connecting the location tracking service device 152 to the first wireless core network 150 is shown as communications link 156.

The first wireless network provides wireless services to a first set of subscribers which have subscribed to the first wireless network in the first country 101 (e.g., USA). The first wireless network being the native network for the first set of subscribers. The user equipment devices UE 1A 124, UE 2A 126, . . . , UE NA 128 (N being an integer greater than 2) each include subscription information for operating with the first wireless network (e.g., Subscriber Identification Module (SIM) card or digital SIM (eSIM)). The user equipment are typically mobile devices and the location of the devices shown in the FIG. 1 is only exemplary for a single point in time. The wireless base stations 104, 106, 108, 110, . . . , 112 (e.g., gNodeB, eNodeB, or Citizen Broadband Radio Service Device (CBSD) depending on wireless technology deployed) are responsible for providing wireless coverage to the first set of subscribers which operate the user equipment devices (UE 1A 124, UE 2A 126, . . . , UE NA 128 in the first country 101. The user equipment devices UE 1A 124, UE 2A 126, . . . , UE NA 128 are wireless devices (e.g., mobile phones, smartphones, tablets, wireless laptops, etc.) whose native network is the first network. The native network being the network with which they have been provisioned to operate (e.g., for which they include subscription information). A user equipment device is sometimes referred to herein as a UE.

The wireless base stations 114, 116, 118, 120, . . . , 122 are part of a second wireless network operated by a second wireless network operator located in the second country 103 (e.g., Canada). The second wireless network provides wireless services to a second set of subscribers which have subscribed to the second wireless network in the second country 103 (e.g., Canada). The second wireless network being the native network for the second set of subscribers. The user equipment devices UE 1B 130, UE 2B 132, . . . , UE MB 134 (M being an integer greater than 2) each include subscription information for operating with the second wireless network (e.g., Subscriber Identification Module (SIM) card or digital SIM (eSIM)). The wireless base stations 114, 116, 118, 120, . . . , 122 (e.g., gNodeB, eNodeB, or Citizen Broadband Radio Service Device (CBSD) depending on wireless technology deployed in the second wireless network) are responsible for providing wireless coverage to the second set of subscribers which operate the user equipment devices (UE 1B 130, UE 2B 132, . . . , UE MB 134 in the second country 103. The user equipment devices UE 1AB 130, UE 2A 132, . . . , UE NA 134 are wireless devices (e.g., mobile phones, smartphones, tablets, wireless laptops, etc.) whose native network is the second network. The native network being the network with which they have been provisioned to operate (e.g., for which they include subscription information). The second wireless network will typically include a second wireless core network and may, but need not, include a location tracking service device or an artificial intelligence/machine learning system.

Coverage for the first wireless network does not remain strictly within the borders of the first country 101 but instead extends or shoots to the other side of the border 102 into the second country 103 as the radio frequency (RF) signals from the first network base stations extend across the border 102. Similarly, coverage for the second wireless network does not remain strictly within the borders of the second country 103 but instead extends or shoots to the other side of the border 102 into the first country 101 as the radio frequency signals from the second network base stations extend into the first country 101. This causes roaming issues. For example, the first set of subscribers may get charged incorrectly if they end up getting transferred to the second network on other side of the border 102. This happens when first and second wireless network operators have a roaming agreement which allows the first set of subscribers to roam onto and utilize the second wireless network (e.g., while still in the first country). In such instances, the user equipment devices which are native to the first wireless network roam or are automatically placed on the second wireless network across the border 102 when the wireless signal conditions (e.g., RF signal conditions) from the second wireless network base station are good or better than the wireless signal conditions of the first wireless network base station. For example, when UE 1A 124 is being serviced by wireless base station 104 of the first wireless network and moves to a location or position where the wireless signals (e.g., RF signals) received by UE 1A 124 from wireless base station 116 in the second wireless network is stronger than the wireless signals received from any of the wireless base stations in the first wireless network, UE 1A 124 will roam or be automatically transferred from wireless base station 116 on the first wireless network to wireless base station 116 of the second wireless network across the border 102. When the roaming agreement also allow the second set of subscribers to roam onto and utilize the first wireless network the second set of subscribers may get charged incorrectly if they end up getting transferred to the first network on other side of the border 102 (e.g., while still in the second country).

This situation can and does happen in border areas, such as for example where rivers separate the first and second countries, where streets close to the border receive signals from across the border, and more generally wherever the geography and/or topology of the landscape separating the countries along the border is conducing to allowing signals to carry across the border from one country to another.

Various embodiments of the present invention, address and/or solve this roaming problem, by implementing apparatus (e.g., location tracking service device 152 that provides native stickiness) and procedures that keep a UE on its native network by making use of UE's physical location, e.g., by comparing the UE's location to the location of border or to a geo-fence (e.g., created along the border). In various embodiments, the procedures are only implemented or activated when a UE is near a border to reduce the overhead on the native wireless network, e.g., when a UE is within a location or site near the border such as for example within one or more sectors of cells facing toward the border. The native network keeps its subscribers user equipment devices on the native network and prevents roaming to non-native networks whenever the UE is located within the country of the native network even when the signal strength received by the UE from the native network is weaker than from a non-native network. For example, when various embodiments of the invention are implemented with respect to the first wireless network, the UE 1A 124 is kept from roaming onto the second wireless network in the second country when UE 1A 124 is located in the first country even when the wireless signals from wireless base stations received by UE 1A 124 are stronger than wireless signals received from the wireless base station of the first wireless network which is its native network.

When the second wireless network includes a location tracking service device it can also implement various embodiments of the invention which will prevent UE devices native the second wireless network (e.g., UE 1B 130, UE 2B 132, . . . , UE MB 134) which have subscribed to the second wireless network from roaming to the first wireless network when these UE devices are located in the second country 103.

Elements or steps with the same reference numbers used in different figures are the same or similar and those elements or steps will not be described in detail again.

Figure 2:
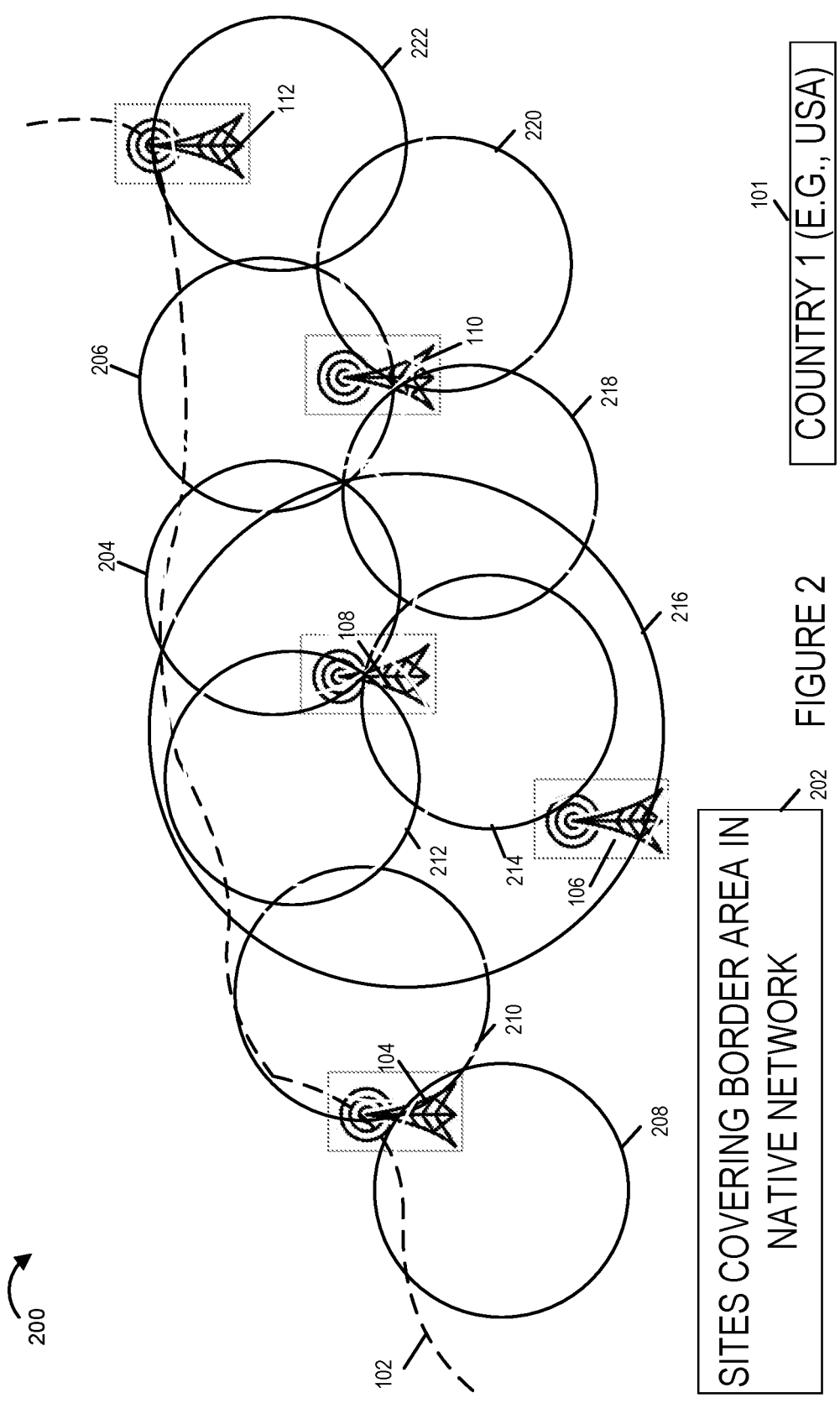
FIG. 2 illustrates exemplary sites (e.g., cell coverage areas) covering a portion of a border area in a native network in accordance with an embodiment of the present invention.

Diagram 200 of FIG. 2 illustrates various elements of FIG. 1 environment 100 along with a set of sites or locations shown as circles covering the border area in the first country 101. The legend 202 indicates that the diagram 200 illustrates sites covering the border area in the native network. The native network referring to the first wireless network in the first country 101 in this example.

The sites 208, 210, 212, 204, 206 and 222 are the closest to the border in terms of distance and therefore are tagged or labeled as first tier border sites. The site 216 has portions that are close to the border and which are not covered by the first tier sites as well as portions that are further away from the border as compared to the first tier sites. The site 216 is representative of a second tier site which will receive some wireless coverage from across the border 102. Third tier sites are sites or areas that are further from the border than the first and second tier sites and do not have any coverage portions which abut the border 102. Sites 214, 218, and 220 are third tier sites. While these third tier sites do not have coverage along the border, wireless coverage from base stations across the border can in some situations still occur in these third tier border sites depending on the strength of the wireless signals from base stations across the border and the geography.

In this example, the sites 208 and 210 are representative of cell coverage areas or in some embodiments cell sector coverage areas of the wireless base station 104 of the first wireless network. The site 216 is representative of cell coverage area or in some embodiments cell sector coverage areas of wireless base station 106 of the first wireless network. The sites 204, 212, and 214 is representative of cell coverage area or in some embodiments the cell sector coverage areas of wireless base station 108. The sites 206, 218 and 220 are representative of cell coverage area or in some embodiments cell sector coverage areas of wireless base station 110 of the first wireless network. The site 220 is representative of cell coverage area or in some embodiments cell sector coverage area of wireless base station 112. In various embodiments, each of the sites 204, 206, 208, 210, 212, 214, 216, 218, 220 and 222 represent a separate cell sector coverage area.

Wireless coverage from the wireless base stations of the second wireless network in the second country will spill over or cross the border into various the various tier 1, 2 and 3 sites in the first country. First, the first wireless network needs to determine how far the coverage of the second wireless network will reach into its territory or coverage area. The wireless signals from the second wireless network base stations will be much stronger in the tier 1 border sties but it can still cause issues in second and third tier sites as well.

In an embodiment of the present invention, the reach of the wireless signals or coverage from the second wireless network into the first wireless network's territory or coverage area is determined using neighbor data obtained by user equipment devices of the first wireless network (i.e., the UE's which have subscriptions to the first network). The user equipment devices (e.g., UE 1A 124, UE 2A 126, . . . , UE NA 128) of the first wireless network to which they have subscribed are constantly measuring neighboring cell wireless signals and this data is collected and correlated against the GPS location of the UE at the time of measurement to determine the signal strength of the wireless signals from the second wireless network inside the border of the first country 101. Once this data has been collected and is available the sites or areas within the first wireless network coverage area of the first country 101 in which UEs can potentially hand off to base stations in the second wireless network in the second country 103 across the border 102 can be determined as well as marked, tagged or labelled to indicate that they are sites in which UEs can potentially roam, migrant and/or be hand offed to the second wireless network based on the strength of signals received from the second wireless network base stations. In various embodiments, the data is stored in a Geographic Information System (GIS) which may be implemented as a database system.

A system or device (e.g., location tracker service device 150) with the ability to query the received and/or stored data can be used to determine the native and non-native neighbors at a location (e.g., a location within a border site such as border site 206). The neighbors being cells (or cell sectors) with cellID's (or cell sector IDs) not in the system being deemed from other carriers and therefore non-native neighbors while cells (or cell sectors) with cellIDs (or cell sector IDs) in the system being native neighbors. CellID is an acronym for Cell Id.

An exemplary way or method of determining neighbors (i.e., neighbor cells and/or cell sectors) will now be described in connection with diagram 300 of FIG. 3. In diagram 300, the mobile device 302 (e.g., a smartphone) measures the signals it receives from the neighbor base stations (e.g., gNB) on the same bandwidth/spectrum and sends this data back to the first network core 150 for example via messages sent to the first wireless core network via one or more wireless base stations of the first wireless network (e.g., wireless base station 110). The mobile device 302 is one of the user equipment devices (UE 1A 124, UE 1B 126, . . . , UE 1N 128) operating in the coverage area of the first wireless network of the first country 101. In this example, mobile device 302 is attached or connected to wireless base station 110 allowing it to communicate information, messages, and data to the first wireless core network 150 via an over the air communications link 302 to the wireless base station 110. Wireless base station 110 then communicates the information to first wireless core network 150 via communications link 314.

Figure 3:
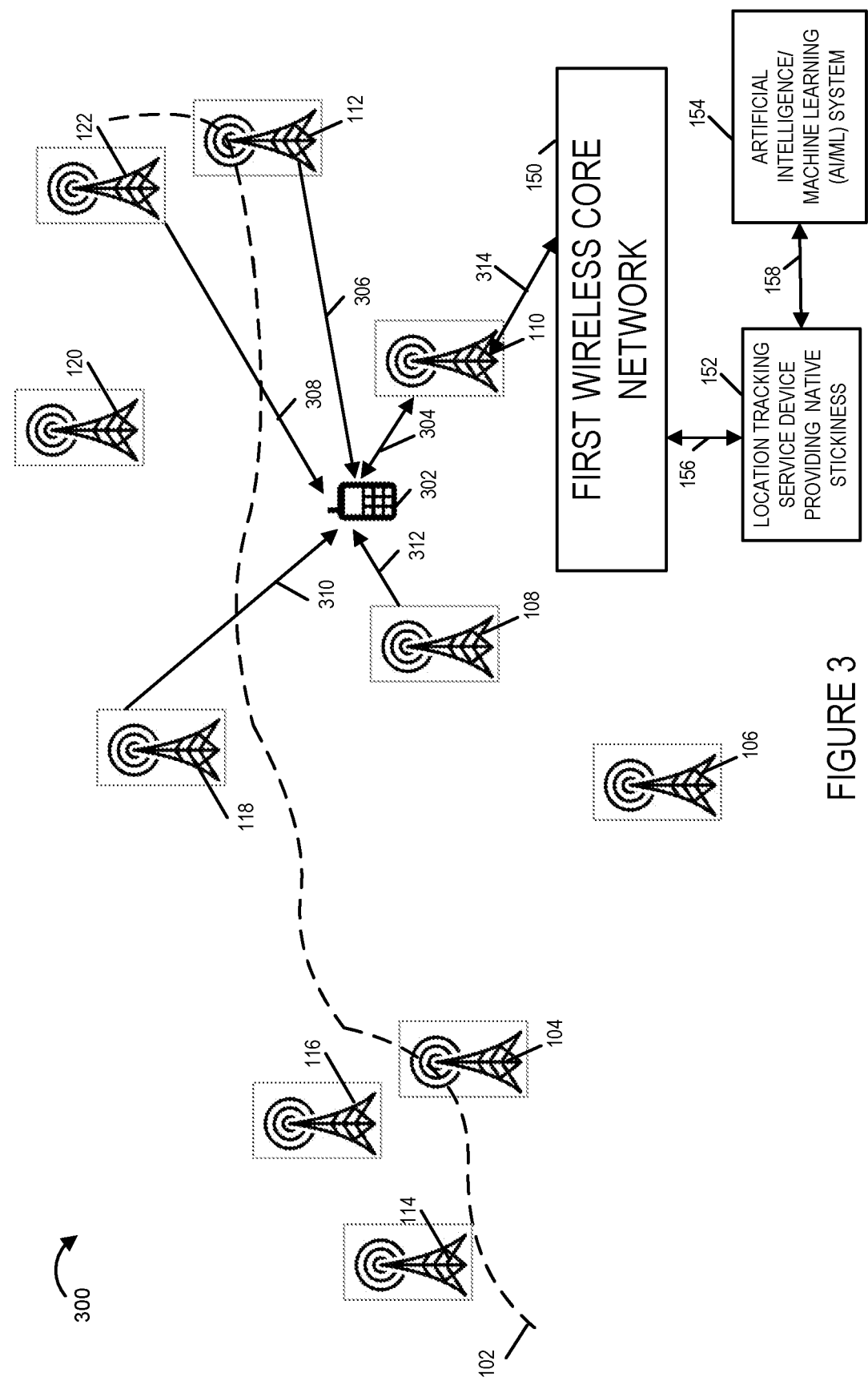
FIG. 3 illustrates an exemplary user equipment mobile device measuring signals from wireless base stations in two different networks in accordance with an embodiment of the present invention.

In the example shown in diagram 300 of FIG. 3, mobile device 302 is within the coverage area of the wireless base station 110 of the first wireless network. For example, mobile device 302 is located in border site 206. The mobile device 302 measures: (i) the strength of the wireless signals 306 it receives from wireless base station 112, (ii) the strength of the wireless signals 308 it receives from wireless base station 112, (iii) the strength of the wireless signals 310 it receives from wireless base station 118, (iv) the strength of the wireless signals 312 it receives from wireless base station 108, as well as the strength wireless signals it receives over communications link 304 from wireless base station 110 to which it is attached and/or connected. The received wireless signals 304, 306, 308, 310 and 312 each include cell identifier information and/or information from which the cell identification information can be derived.

In various embodiments, the wireless signals also include a base station identifier (e.g., a global EnodeB Identifier). In some embodiments, e.g., some New Radio 5G embodiments, the cell ID is a generally unique number used to identify each Base Transceiver Station (BTS) or sector of a BTS within a Location Area Code (LAC) for example it includes gNB ID and Cell Identity (CI). In some embodiments, e.g., 4G embodiments the cell ID is a Global Cell Identity which is a globally unique identifier for a Base Transceiver Station in mobile phone networks which consists of a (i) a Mobile Country Code (MCC), Mobile Network Code (MNC), Location Area Code (LAC) and Cell Identification (CI).

The mobile device 302 includes Global Positioning System (GPS) technology, e.g., GPS device (e.g., GPS receiver) that receives GPS signals and uses the received GPS signals to determine its position or location as well as velocity of the mobile device and directional heading information.

The mobile device 302 communicates the GPS information including position information, signal strength information measured for each of the wireless base station's whose signals are received along with the corresponding cell identification information of the received wireless signal to the first wireless core network 150 via the wireless base station 110. In various embodiments, the mobile device 302 also generates timestamp information indicating when the signal measurements were made. This timestamp information also be included among the information communicated by the mobile device 302 to the first wireless core network 150.

The mobile device 302 travels throughout the first country 101 first wireless network border areas making measurements and communicating the information back to the first wireless core network 150 via wireless base stations. In some embodiments, a plurality of the mobile devices 302 are used to make the measurements as they travel throughout the first wireless network coverage area near the border between the first country 101 and the second country 103. The plurality of mobile device communicating the information to the first wireless core network 150.

In some embodiment, the mobile device 302 or the plurality of mobile devices used to make the measurements does not communicate the collected information/data back to the first wireless core network via wireless base stations but instead saves it in storage and then transfers or communicates the information/data to the first wireless core network via a wired connection or transfers the data/information to a database which is accessible to the first wireless core network 150.

The collected data/information is then used to determine for each position/location for which data/information was collected what are the neighboring cell IDs and the strength of the signals received for these neighboring cells and/or cell sectors. The neighboring cell identification information is then used to determine which neighboring cells and/or cell sectors are part of the first wireless network which is the native network and which neighboring cells and/or cell sectors are not part of the first wireless network and are therefore non-native neighbor cell and/or cell sectors.

The neighboring cells and/or cell sectors along with their corresponding signal strength information are then mapped on a Geographic Information System to determine the area of influence within the first wireless network coverage area and determine the border sites and/or areas that are affected.

In some embodiments, the mapping of the border sites with overlapping coverage areas from foreign networks is performed as part of the initialization, set-up or provisioning of the base stations in the affected coverage areas before bringing the system on-line with paying subscribers. For example, during initial testing of the cell as it is being provisioned. In some embodiments, this mapping is then updated by having a sub-set of user equipment devices operating in coverage areas near the border collect on an on-going basis measurements to determine if there are changes to which coverage areas are being affected by base stations from foreign networks. For example due to new foreign base stations being brought on line or changes in topology or landscape of the coverage areas (new trees, new structures (buildings, bridges) or removal of trees structures (e.g., buildings, bridges)). This sub-set of user equipment devices collecting this data is typically small in comparison to the number of user equipment devices operating in the boundary area (e.g., less than 5%). In various embodiments, the measurements are stored on user equipment device and then sent to the location tracker device or GIS system as a batch file after a determined period of time or when a determined amount of data has been collected. The data being sent at off peak usage hours, e.g., at 2:00 a.m.

Figure 4:
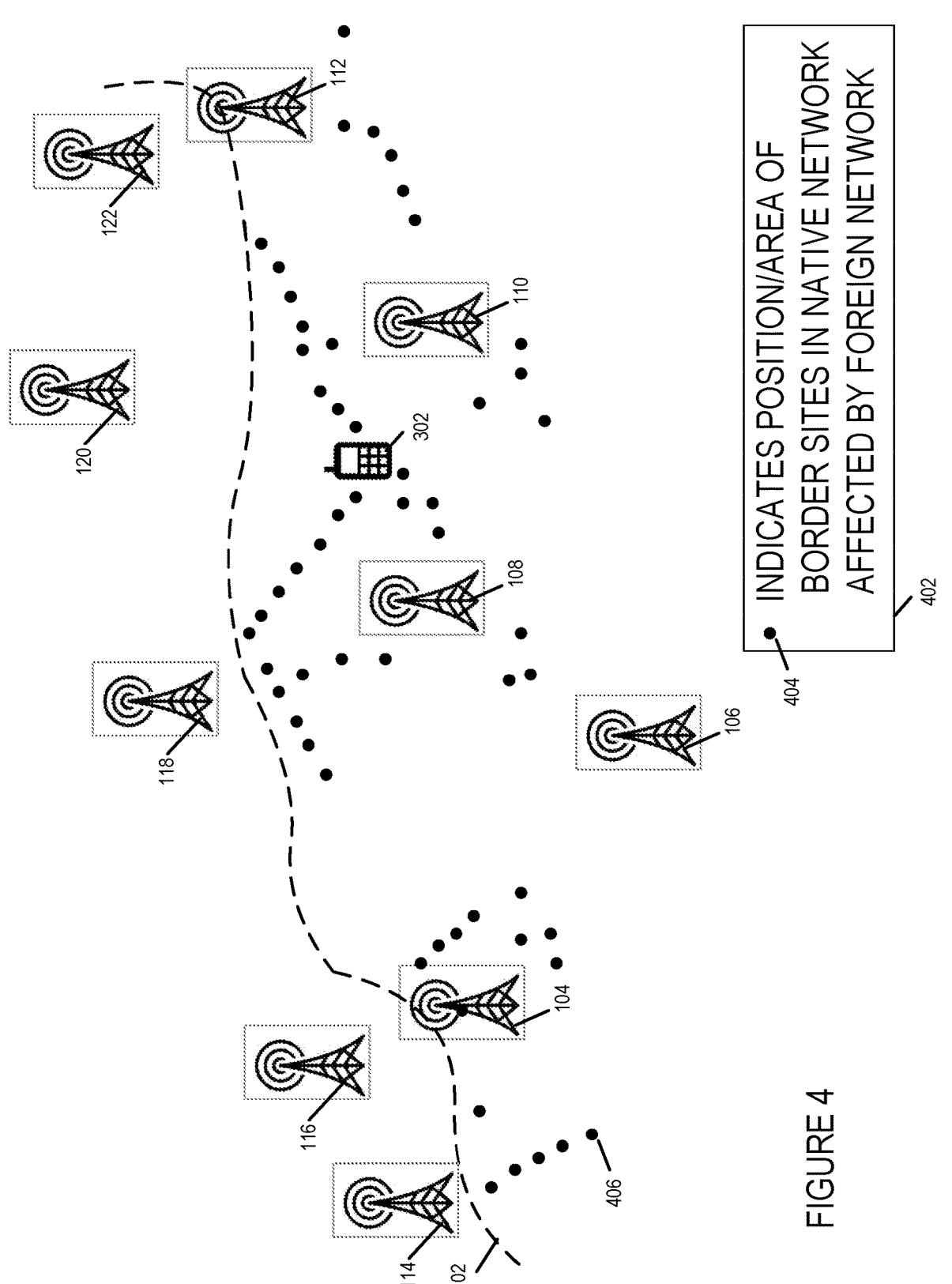
FIG. 4 illustrates exemplary mapping of geographic positions in a first wireless network coverage area to determine border sites (e.g., cell or cell sectors) affected by signals from a second wireless network in accordance with an embodiment of the present invention.

FIG. 4 illustrates positions and/or areas of border sites in the native network sites within the first country 101 determined to be affected by foreign network that is a non-native network. The native network in this example is the first wireless network and the non-native network is the second wireless network operated in the second country 103 having wireless base station 114, 116, 118, 120, . . . , 122. The legend 402 indicates that each of the dots "\*" shown in diagram 400 of FIG. 400 indicate or represent a position and/or area of a border site in the native network (i.e., the first wireless network) affected by the foreign network (i.e., non-native network). Dot 406 shown in diagram 400 of FIG. 4 illustrates an example of position/area of a border site mapped to the geography that is affected by the signals received from the wireless base stations of the second wireless network. In these affected areas, it has been determined from the collected information/data of the received signals that it is possible for a user equipment device which is a subscriber of the first wireless network to be incorrectly handed off from the first wireless network to the second wireless network and thereby be charged roaming fees. This can occur for example, whenever the signal strength from the non-native cell generated by a wireless base station of the second wireless network is better than the signal strength received at the position from the native cells of the generated by the wireless base stations of the first wireless network.

Once these positions/areas of influence have been identified, the border sites (border cells and/or cell sectors of the first wireless network) are tagged, marked, or labelled by priority with respect to whether a user equipment device operating within the border site (border cell or cell sector) is likely to experience roaming to the non-native network or being hand-off to the non-native network (e.g., the second wireless network. These sites are typically the ones that are meant to provide coverage within the first country and are also closest to the border.

As previously discussed, diagram 200 of FIG. 2 illustrates exemplary border sites for the first wireless network that have been identified as discussed in connection with FIGS. 3 and 4. These border sites 204, 206, 208, 210, 212, 214, 216 and 218 correspond to cells or cell sectors of the first wireless network generated by wireless base station of the first wireless network as previously described. Once the sites (cells and/or cell sectors) have been identified and tagged, marked and/or labelled as border sites, e.g., by the location tracking service device or equipment within the first wireless core network, the first wireless network will instruct user equipment devices operating on the first wireless network within these border sites (cell or cell sectors) to report their actual physical location or position to the location tracking service device. This physical location or position information (e.g., geographical position) is used to determine where the user equipment device is relative to the border. The cell or cell sector location alone is not sufficient in determining whether the user equipment device is within the first country 101 or the second country 103 as the coverage area for the cell or cell sectors of the first wireless network extend into the second country (e.g., border site 206 coverage area extends across the border 102).

This physical location of the user equipment device is typically determined by the user equipment devices using GPS technology to determine GPS location information. Since the physical location is only needed for the user equipment devices near the border, typically only user equipment devices near the border in the first wireless network provide their physical location. This may be achieved by only instructing user equipment devices which are within an identified border site to provide their physical location. Sites that have tagged, labelled, marked and/or identified as border sites (or the wireless base stations which generate the cell or cell sector coverage within these border sites) will be instructed by the first wireless core network to share the location data of these user equipment devices. The shared location data of the user equipment devices near the border 102 is then used to keep the user equipment device on the first wireless network.

In an exemplary embodiment of the present invention, a new network component is needed to track user equipment location and help the wireless network in keeping user equipment devices on the wireless network. This network component is illustrated as location tracking service device 152 in FIGS. 1 and 3, location tracking service device 1102 in FIG. 11, and location tracking server 1212 in FIG. 12. The location tracking service device provides native stickiness by helping user equipment devices stay on or stick to their native wireless network instead of roaming to a foreign network while within the borders of the native country of the native wireless network. This component can be a stand alone component that works with various network entities or works with other location services components on the network depending on the implementation or alternatively can implemented as a software service including a plurality of software components operating on different hardware components of the network. For ease of explanation, it has been shown as a single logical component in the Figures.

Figure 11:
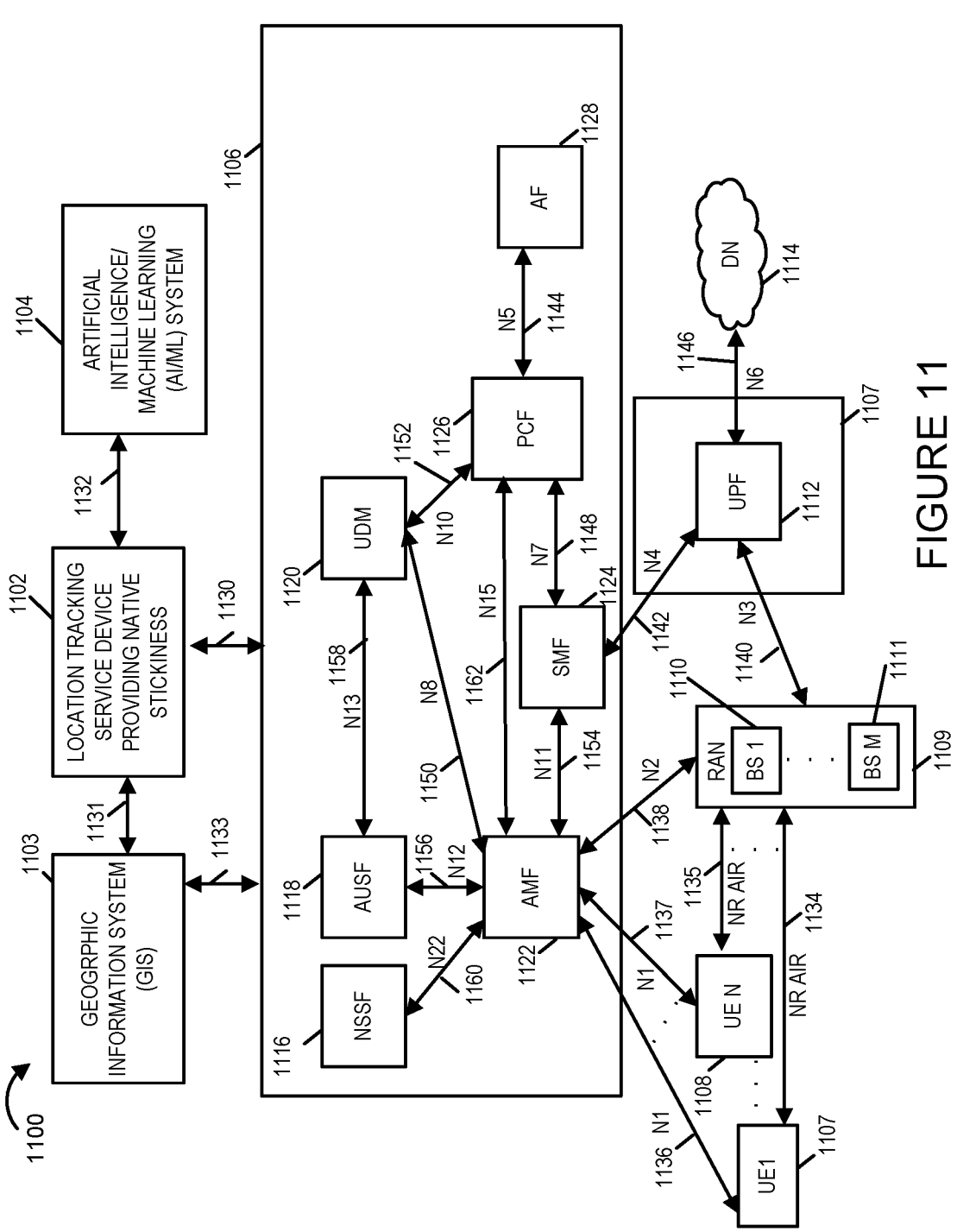
FIG. 11 illustrates an exemplary system 1100 in accordance with an embodiment of the present invention.

FIG. 11 illustrates an exemplary system 1100 implemented using 5G wireless technology in accordance with an embodiment of the present invention. The use of 5G technology in system 1100 is merely exemplary and for the sake for clarity in explaining the invention. It should be understood that the invention is not limited to 5G technology but may be, and in some embodiments is, implemented using other wireless technologies, e.g., 4G, LTE, etc. System 1100 includes a location tracking service device 1102, a Geographic Information System (GIS) 1103 an artificial intelligence/machine learning (AI/ML) system 1104, a plurality of user equipment device (UE 1 1107, . . . , UE N 1108, N being an integer greater than 1), a Radio Access Network (RAN) 1109 including a plurality of base stations (BS 1 1110, . . . , BS M 1111, M being an integer greater than 1), a User Plane Function (UPF) 1112, a Network Slice Selection Function (NSSF) 1116, an Authentication Server Function (AUSF) 1118, an Unified Data Management Function (UDM) 1120, an Access and Mobility Management Function (AMF) 1122, a Session Management Function (SMF) 1124, a Policy Control Function (PCF), and an Application Function (AF) 1128. The system 1100 wireless core network includes a user plane 1107 which includes the UPF 1107 component and a control plane which includes the NSSF 1116, AUSF 1118, UDM 1120, AMF 1122, SMF 1124, PCF 1126, and AF 1128 components. The user plane function component 1112 of the system 1100 is coupled to a Data Network (DN) 1114, e.g., the Internet. The base stations (e.g., BS 1 1110, . . . , BS M 1111) of the Radio Access Network 1109 may be, and in some embodiments are, gNodeBs.

The user equipment devices UE 1 1107, . . . , UE N 1108 may be, and in some embodiments are, 5G wireless devices such as for example 5G smartphones). It will be understood that the various functions of the system may be implemented in a variety of ways as components, servers, devices, nodes, etc. The components of the system 1100 are coupled and/or connected via communications links using various interfaces New Radio Air Interface 1134, New Radio Air Interface 1135, N1 interface 1136, N1 interface 1137, N2 interface 1138, N3 interface 1140, N4 interface 1142, N5 interface 1144, N7 interface 1148, N8 interface 1150, N10 interface 1152, N11 interface 1154, N12 1156, N13 1158, N22 1160, N15 1162 so that they can exchange information, data, and messages. The UE 1 1107, . . . , UE N 1108 utilize New Radio (NR) air interfaces 1134, . . . , 1135 to communicate with the base stations of the Radio Access Network 1109. UE 1 1107 to UE N 1108 utilize the N1 interfaces 1136, . . . , 1137 to communicate with the AMF 1122. The UPF 1112 utilizes the N6 1146 interface to communicate with the Data Network 1114.

The location tracking service device 1102 is coupled/connected to the wireless core network via communications link 1130. The location tracking device 1102 is coupled to the artificial intelligence/machine learning (AI/ML) system 1140 via communications link 1132. The location tracking service device is coupled/connected to the Geographic Information System (GIS) 1103 via communications link 1131. The Geographic Information System (GIS) 1103 is coupled/connected to the wireless core network via communications link 1133. The communications links and interfaces shown in FIG. 11 are exemplary and the functions/components of the system 1100 may be, and in some embodiments are, coupled and/or connected using a different configuration and/or interfaces. A brief description of the various functions will now be provided. The user equipment devices are 5G wireless devices which support New Radio air interface. The Access and Mobility Management Function (AMF) 1122 acts as a single entry point for UE connection and based on the service requested by the UE selects the respective Session Management Function (SMF) 1124 for managing the user session. The User Plane Function (UPF) 1112 transports the IP data traffic (user plane) between the User Equipment devices and the external Data Network (DN) 1114. The Authentication Server Function (AUSF) 1118 allows the AMF to authenticate the UE and access services of the 5G core network. The Session Management Function (SMF) 1124, Policy Control Function (PCF) 1126 and Unified Data Management Function (UDM) 1120 provide policy control for the network by implementing and applying policy decisions and accessing subscription information to control the behavior and operation of the network.

The location tracking service device 1102 provides native stickiness so that user equipment devices stay on or stick to their native wireless network instead of roaming to a foreign network while within the borders of the native country of the native wireless network. The Geographic Information System 1103 stores geographic information for wireless network including neighbor lists (e.g., white lists and black lists) corresponding to geographic locations. The Artificial Intelligence/Machine Learning system 1104 implements artificial intelligence machine learning algorithms to determine patterns of the wireless network with respect to its users location and interactions with foreign networks to optimize the network to keep the user equipment devices on the native network while within the borders of the native country while allowing the user equipment devices to roam to the foreign networks whenever not in the native network country. In some embodiments, the GIS 1103 and/or the AI/ML system 1104 are included in the location tracking service device, e.g., as sub-systems or sub-components. In some embodiments one or more of the location tracking service device 1102, the GIS 1103, and the AI/ML system 1104 are included in the wireless core network.

Figures 12, 12A, 12B, 12C:
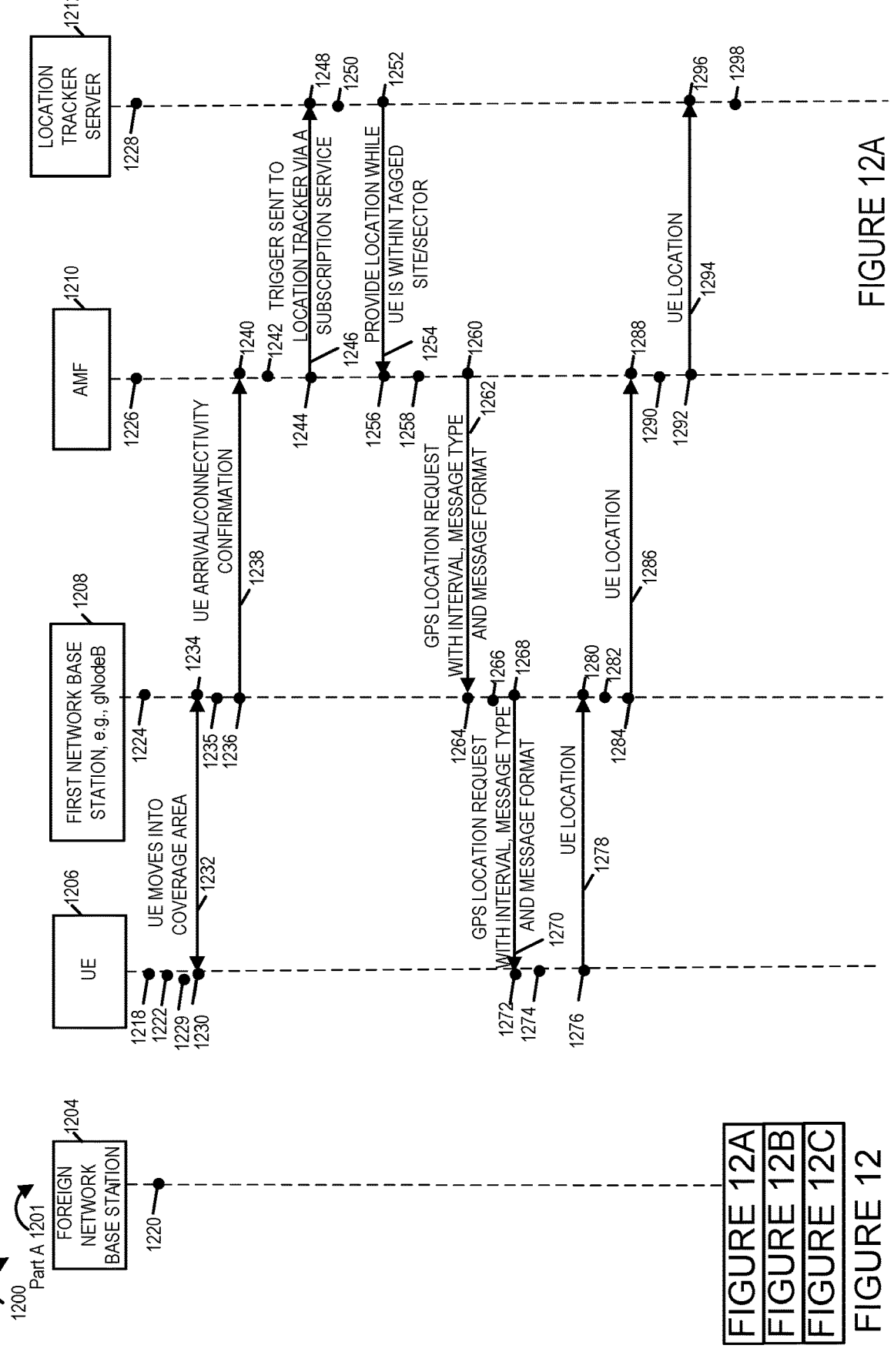
FIG. 12 comprises FIG. 12A, FIG. 12B, and FIG. 12C.
FIG. 12A is the first part of a signaling diagram which illustrates the steps and signaling of an exemplary method in accordance with an embodiment of the present invention.
FIG. 12B is the second part of a signaling diagram which illustrates the steps and signaling of an exemplary method in accordance with an embodiment of the present invention.
FIG. 12C is the third part of a signaling diagram which illustrates the steps and signaling of an exemplary method in accordance with an embodiment of the present invention.
Figure 12B:
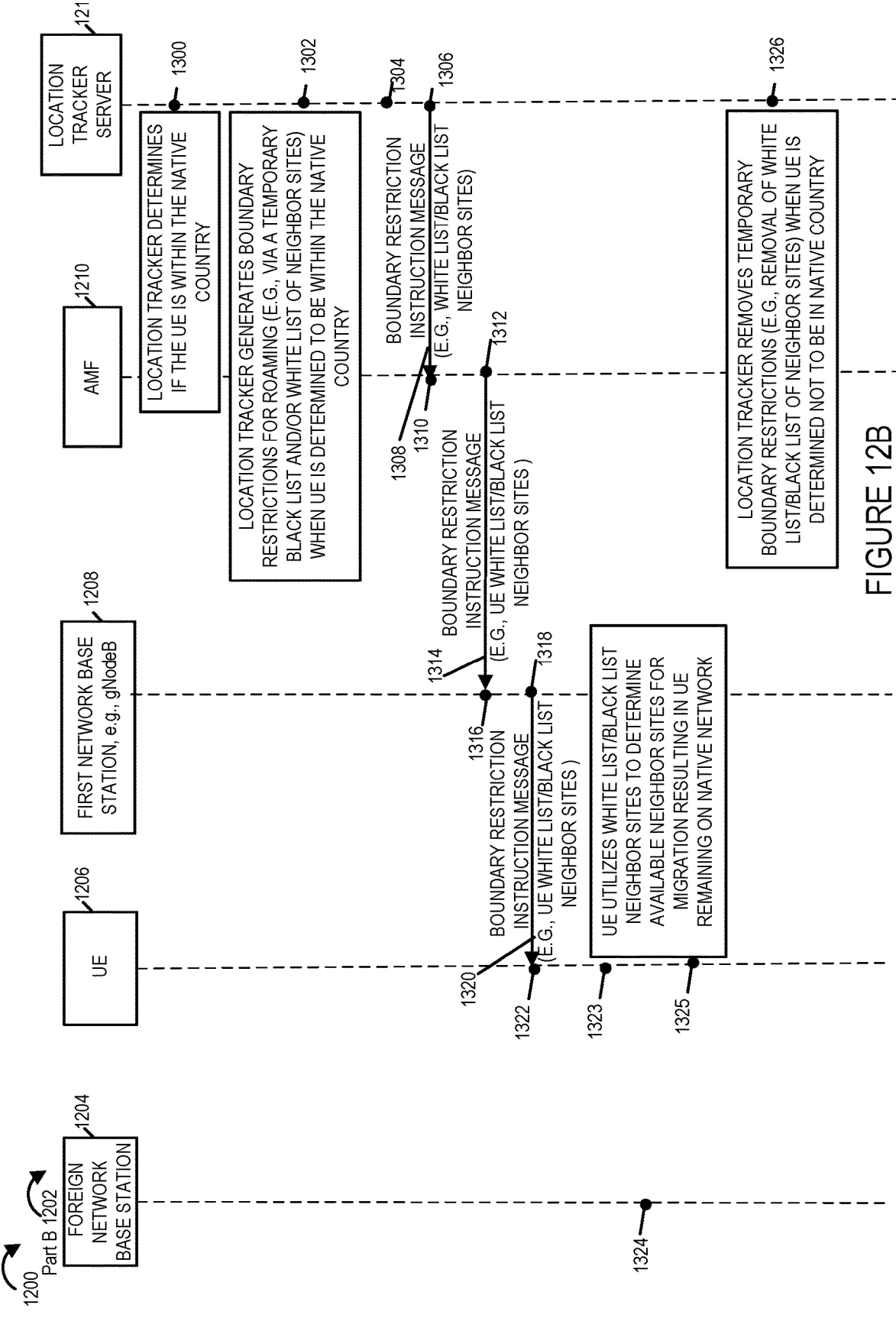
Figure 12C:
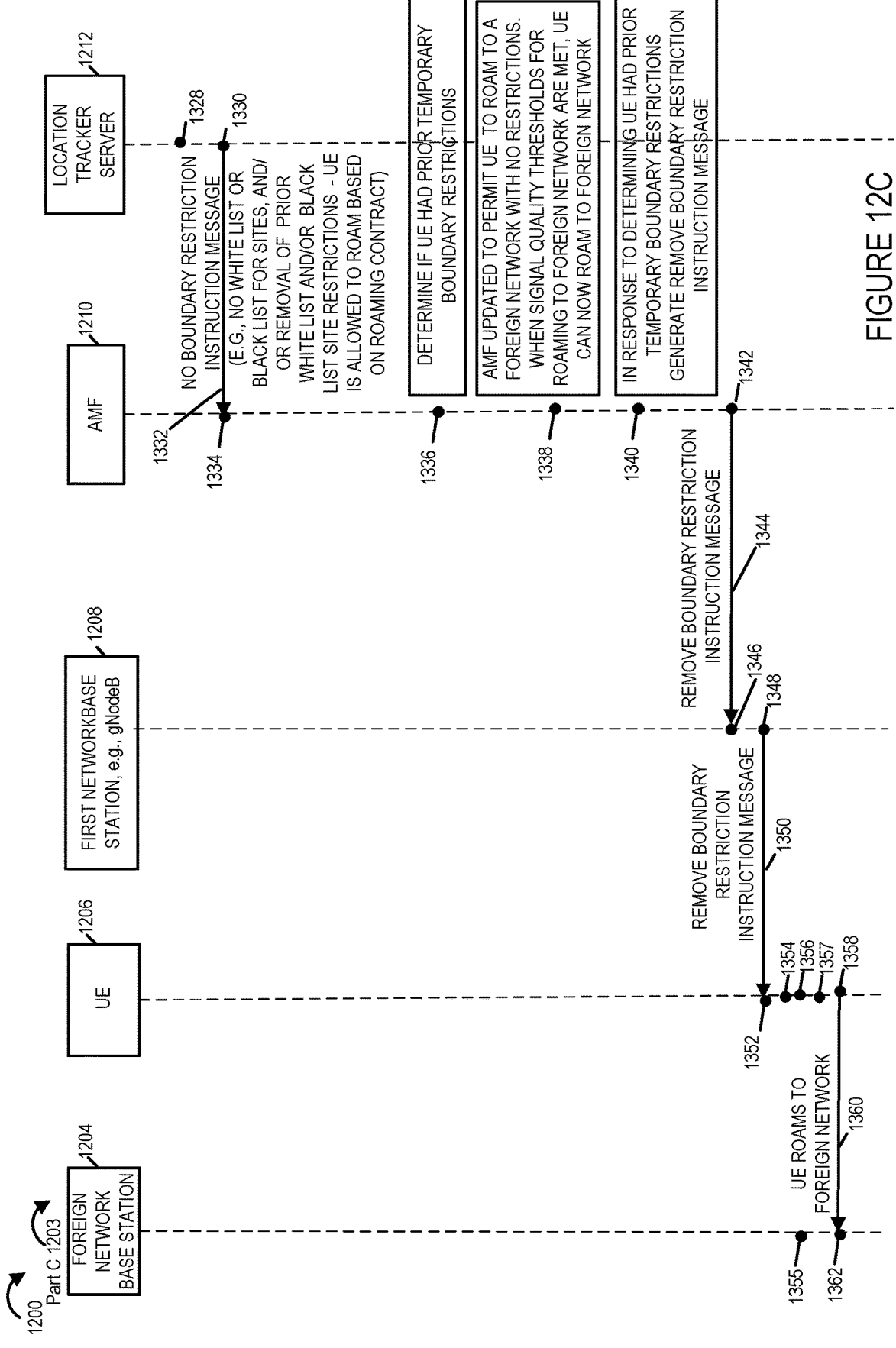

FIG. 12 comprises FIG. 12A, FIG. 12B, and FIG. 12C. FIG. 12A is the first part (Part A 1201) of a signaling diagram which illustrates the steps and signaling of an exemplary method 1200 in accordance with an embodiment of the present invention. FIG. 12B is the second part (Part B 1202) of a signaling diagram which illustrates the steps and signaling of an exemplary method 1200 in accordance with an embodiment of the present invention. FIG. 12C is the third part (Part C 1203) of a signaling diagram which illustrates the steps and signaling of an exemplary method 1200 in accordance with an embodiment of the present invention.

While it will be readily understood that additional steps and signaling are performed in connection with communicating information, messages, and packets between devices, the method 1200 focuses on and discusses the steps and signaling for understanding the invention. Elements or steps with the same reference numbers used in different figures are the same or similar and those elements or steps will not be described in detail again. The signaling diagram/method 1200 is implemented by a system including a user equipment device UE 1206 with GPS receiver, a foreign network including a plurality of wireless base stations of which foreign network base station 1204 is one of the foreign network's base stations, a first wireless network including a plurality of wireless base stations of which wireless base station 1208 is one of the base stations, the first wireless network including a first wireless core including an AMF device or node 1210, and a location tracker server 1212.

The UE 1206 is a wireless device, e.g., a mobile device such as by way of example a mobile phone, smart phone, laptop, tablet, with a first SIM card with credentials to access a first mobile network operator's network and a GPS receiver that can determine GPS coordinates, the UE 1206's position, velocity and heading from GPS signals it receives.

The foreign network base station 1204 in some embodiments is a gNodeB. The base station 1208 of the native network which is the first wireless network in some embodiments is a gNodeB. The first wireless network and the second wireless network having a roaming agreement which allows the UE 1206 to roam from the first wireless network to second wireless network. In various embodiments, the base station 1208 is located in a first country referred to as the native country and the foreign network base station 1204 is located in a second different country which is sometimes referred to as a foreign country. The foreign network base station 1204's coverage area extends over the border and into the coverage area of the base station 1208 in the first country. In various embodiments, the first and second wireless networks are operating utilizing the same frequency bands.

Figure 5:
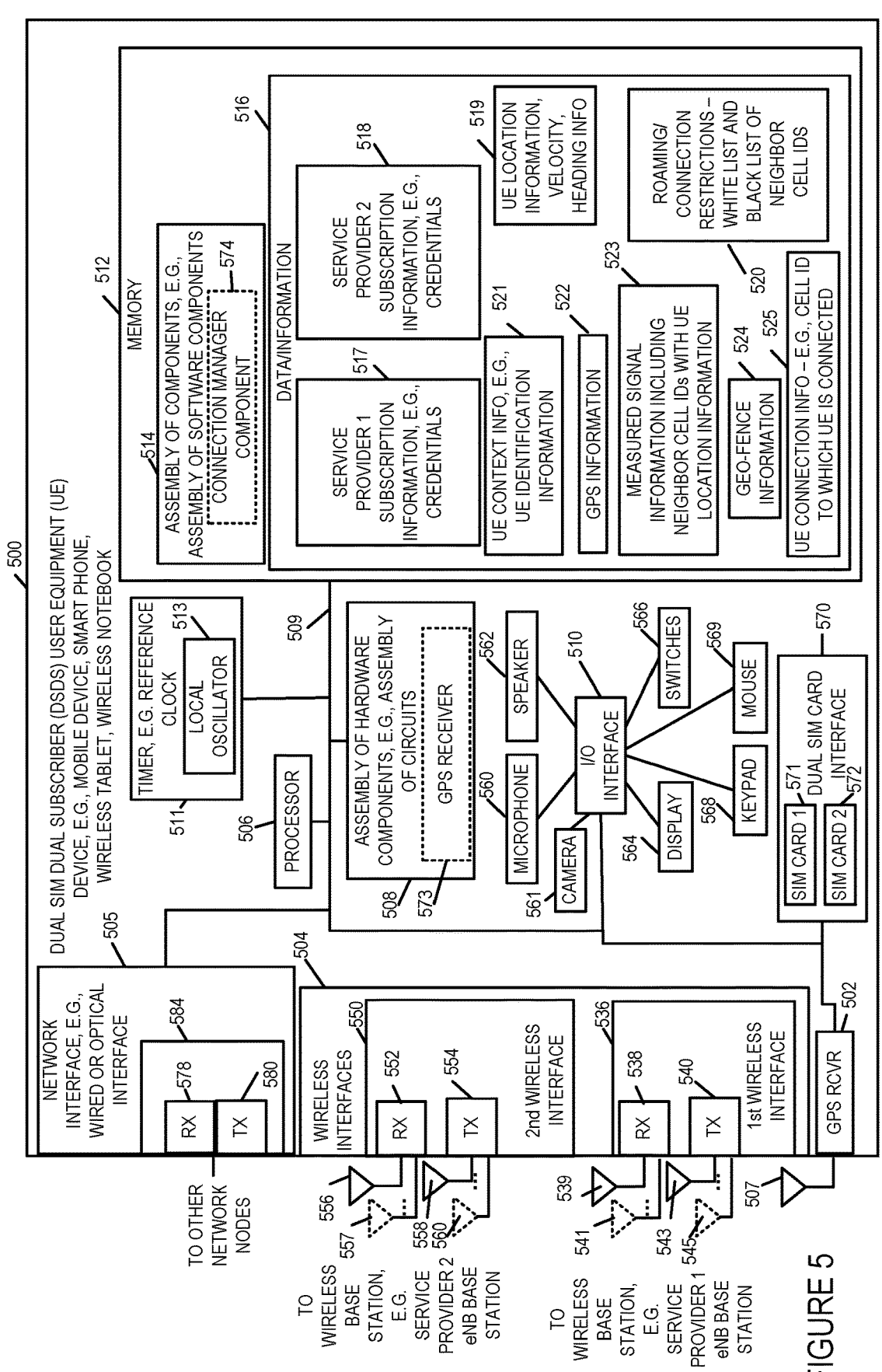
FIG. 5 illustrates details of an exemplary User Equipment (UE) device, e.g., a mobile device, cell phone, smartphone, wireless tablet, laptop, wireless notebook, in accordance with one embodiment of the present invention.

In some embodiments, the UE 1206 is implemented in accordance with user equipment device 500 shown in FIG. 5. In some embodiments, the wireless base station 1204 of the foreign network and the wireless base station 1208 of the first wireless network are implemented in accordance with wireless base station 700 of FIG. 7. In some embodiments, the location tracker server 1212 and AMF 1210 are implemented in accordance with the communications equipment device 600 of FIG. 6.

The signaling diagram/method 1200 may be, and in some embodiments is, implemented using exemplary first wireless network and second wireless network of FIG. 1. In one such exemplary implementation, the first wireless base station 1208 is base station 110, the AMF 1210 is included in the first wireless core network 150, the UE 1206 is UE 1A 124, the foreign network base station 1204 is base station 118. The location tracking server 1212 is the location tracking service device 152. The first wireless core network 150 being implemented as shown in system 1100 of FIG. 11. However, it should be understood that the method 1200 is not limited to the exemplary system shown in diagram 100 and may be, and is used, on other systems and system configurations. The signaling diagram/method 1200 illustrates the generation, message flow and usage of UE GPS information (e.g., physical location or position, velocity and heading information) to maintain or keep a UE device from roaming and incurring charges in a foreign network in accordance with an exemplary embodiment of the present invention. The method 1200 can be explained at a high level as including the following procedures: (1) when a UE (e.g., UE 120) moves into a designated border site coverage area, the AMF alerts the location tracker server; (2) UEs that are within a border site coverage area are instructed by the location tracker server 1212 to report their GPS/physical location in addition to their cell level location (e.g., cell ID information); (3) for the border sites, the UEs are sent a black list of neighbors (cells or cell sectors for the foreign wireless network) and instructions to avoid roaming or moving onto these neighbor cells or cell sectors belonging to the foreign network, or a white list of neighbors (cells or cell sectors of the native or first wireless network) and instructions that UE is to only move onto these cells or cell sectors; (4) when the GPS/physical location indicates that the UE is in the foreign country, e.g., has crossed the border, or is no longer in a border site, the restrictions on the UE are removed (i.e., the white list and black list are no longer effect and the UE can use it normal procedures (e.g., based on signal strength) as to what base station to which it should connect. When a UE is physically located in a border site, the UE receives instructions from the location tracking server 1212 commanding the UE to avoid getting on cells or cell sectors identified on the black list which correspond to non-native cells or cell sectors from the foreign country; or, alternatively, the UE receives instructions from the location tracking server 121 instructing the UE to just stay on the cells or cell sectors on the white list which are cells or cell sectors corresponding to the first wireless network also referred to as the native network. When the UE GPS/physical location indicates a UE is in the foreign country, no restrictions are applied or if they were applied and the UE subsequently moved into the foreign country, the restrictions (i.e., neighbor white list or neighbor black list) on which cells or cell sectors the UE can connect to are removed. The method allows for the real time and dynamic determination of whether the UE should roam onto the foreign network or not based on the UE's physical location thereby preventing unwanted roaming charges from foreign networks in foreign countries when the UE is physically located in its native network country to which the UE is a subscriber. The detailed steps of the method 1200 will now be discussed.

The method 1200 starts in start step 1220 of Part A 1202 shown on FIG. 12A. Operation proceeds from start step 1218 and proceeds in parallel to steps 1220, 1222, 1224, 1226, and 1228. In steps 1220, 1222, 1224, 1226 and 1228, each of the devices has been initialized and is operating. Operation proceeds from step 1222 to step 1229.

In step 1229, UE 1206 moves into the coverage area of the first network base station 1208. Operation proceeds from step 1229 to steps 1230 and 1234 wherein UE 1206 connects to and begins receiving services from the first network base station 1208. The messages 1232 representing the exchange of messages to establish a connection between the UE 1208 and base station 1208 as well as message exchanged in connection with services, e.g., call session, being provided to the UE 1206 from the base station 1208. Operation proceeds from step 1234 to step 1235.

In step 1235, the base station 1206 generates message 1238 which includes information indicating that that UE 1206 has connected to the wireless base station 1208 and/or confirms the arrival and establishment of connectivity with UE 1206. Operation proceeds from step 1235 to step 1236.

In step 1236, the base station 1208 transmits the message 1238 to AMF 1210 in the first wireless core network. Operation proceeds from step 1236 to step 1240.

In step 1240, the AMF 1210 receives the message 1238 from the base station 1208. Operation proceeds from step 1240 to step 1242.

In step 1242, AMF 1210 processes the received message and upon determining that UE 1206 has connected to base station 1208 generates trigger message 1246 which includes information indicating that UE 1206 has connected to base station 1208 and providing cell or cell sector information (e.g., cell ID) indicating the cell or cell sector UE 1206 in the first wireless network in which the UE 1206 is located. In some embodiments, step 1242 includes one or more of the following sub-steps: (i) determining by the AMF 1210 that base station 1208 has been tagged (e.g., designated, marked, labelled and/or identified) as a base station whose coverage includes a border site, (ii) determining by the AMF 1210 that the cell ID included in the message 1238 indicates that the UE 1208 has moved in a coverage area designated, marked, tagged, labelled and/or identified as a border site and for which the location tracker server 1212 has subscribed to be notified; (iv) determining by the AMF 1210 that the location tracker server 1212 has registered with the AMF 1210's subscription service to be notified when of the UE devices entering the cell ID coverage area provided for the UE 1206's location in message 1238; (v) generating trigger message 1244 including the location (e.g., cell ID) of the UE 1206 and/or base station identifier of the base station 1208 via which the UE 1206 has connected to the first wireless network. Operation proceeds from step 1242 to step 1244.

In step 1244, the AMF 1210 transmits the message 1246 to the location tracker server 1212, e.g., in response to location tracker server 1212 registering with the AMF 1210 to provide notifications of UE devices which connect to border site (e.g., border cell or cell sector of the first wireless network). Operation proceeds from step 1244 to step 1248.

In step 1248, the location tracker server 1212 receives the message 1248. Operation proceeds from step 1248 to step 1250.

In step 1250, the location tracker server 1212 in response to receiving message 1252 generates message 1254 which request/instructs the UE to provide GPS information (e.g., GPS coordinates providing physical location, velocity and heading) while the UE is within the tagged border site (e.g., cell or cell sector). In addition to the request/instruction to provide GPS information, the message 1254 also indicates an interval, message type and format at which the UE is to provide the GPS information (e.g., interval=every X minutes (X being a positive integer), message type (e.g., text or data message), format (e.g., latitude field, longitude field, altitude field, velocity field, heading field, with the separation of fields delineated by commas). The message format can further include the specific format in which the data is to be provided such as two digits—degrees, minutes, seconds plus compass direction for longitude and latitude. Operation proceeds from step 1250 to step 1252.

In step 1252, the location tracker server transmits the message 1254 to AMF 1210. Operation proceeds from step 1252 to step 1256.

In step 1256, the AMF 1210 receives the message 1256. Operation proceeds from step 1256 to step 1258.

In step 1258, the AMF 1210 generates the message 1262 based on received message 1254. Operation proceeds from step 1254 to step 1260.

In step 1260, the AMF 1210 transmits the message 1262 to base station 1208. The message 1262 includes the request/instructions that the UE is to provide GPS information (e.g., GPS coordinates providing physical location, velocity and heading) while the UE is within the tagged border site (e.g., cell or cell sector) along with the interval, message type and message format information. In some embodiments, the contents of message 1262 is the same as message 1254 and the AMF 1210 transmits or forwards the message 1262 to the base station 1208. Operation proceeds from step 1260 to step 1264.

In step 1264, the base station 1208 receives the message 1262. Operation proceeds from step 1264 to step 1266.

In step 1266, the base station 1208 generates the message 1270 based on received message 1262. Operation proceeds from step 1266 to step 1268.

In step 1268, the base station 1208 transmits the message 1270 to UE 1206. The message 1270 includes the request/instructions that the UE is to provide GPS information (e.g., GPS coordinates providing physical location, velocity and heading) while the UE is within the tagged border site (e.g., cell or cell sector) along with the interval, message type and message format information. In some embodiments, the contents of message 1270 is the same as message 1262 and the base station 1208 transmits or forwards the message 1270 to the UE 1206. Operation proceeds from step 1268 to step 1272.

In step 1272, the UE 1206 receives the message 1270. Operation proceeds from step 1272 to step 1274.

In step 1274, the UE 1206 processes the received message 1270 and in response to the received message commences generating the requested/instructed GPS information and reporting it back to the location tracker server at the intervals specified using the message type and message format specified in the message 1270. This includes the generation of UE location message 1278 which includes the UE 1206's physical location given in GPS coordinates, as well as its velocity and direction heading. Operation proceeds from step 1274 to step 1276.

In step 1276, the UE 1206 transmits the UE location message 1278 to the base station 1208. Operation proceeds from step 1276 to step 1280.

In step 1280, the base station 1208 receives the UE location message 1278. Operation proceeds from step 1280 to step 1282.

In step 1282, the base station 1208 generates the UE location message 1286 based on the received message 1278. The message 1286 including the same information/data as included in the UE location message 1278. In some embodiments, the message 1286 is the same as message 1278 or encapsulates the message 1278. Operation proceeds from step 1282 to step 1284.

In step 1284, the base station 1208 transmits the message 1286 or forwards the message 1286 to the AMF 1210. Operation proceeds from step 1284 to step 1288.

In step 1288, the AMF 1210 receives the UE location message 1286. Operation proceeds from step 1288 to step 1290.

In step 1290, the AMF 1210 generates the UE location message 1294 based on the received message 1286. The message 1294 includes the same information/data as included in the UE location message 1286. In some embodiments, the message 1294 is the same as message 1286 or encapsulates the message 1286. Operation proceeds from step 1290 to step 1292.

In step 1292, the AMF 1210 transmits the message 1294 or forwards the message 1294 to the location tracker server 1212. Operation proceeds from step 1292 to step 1296.

In step 1296, the location tracker server receives the UE location message 1294. Operation proceeds from step 1296 to step 1298.

In step 1298, the location tracker server 1212 processes the UE location message 1294 which includes extracting the GPS information (e.g., GPS physical coordinates, velocity and heading information) from the UE location message 1294). Operation proceeds from step 1298 to step 1300 shown on FIG. 12B.

In step 1300, the location tracker server 1212 determines based on the GPS information whether the UE 1206 is within the first country also referred to as the native country.

When the location tracker determines that the UE 1206 is within the first county/native country, operation proceeds from step 1300 to step 1302. When the location tracker determines the UE 1206 is not in the first country/native (e.g., UE 1206 is across the border 102 and is in the foreign country 103 not the native country 101), operation proceeds to step 1326.

In step 1302, the location tracker server 1212 generates boundary restrictions for roaming or moving between base station (e.g., via a temporary black list and/or white list of neighbor sites (e.g., cells, cell sectors) when the UE 1206 when the UE 1206 is determined to be physically located within the first country/native country. In addition, in various embodiments, the location tracker server 1212 also determines if the UE 1206 location reporting interval needs to be updated (e.g., the interval needs to be shortened based on the UE 1206's location, velocity and direction heading such as when the UE 1206 is close to the border between the native country and the foreign country and its velocity and direction heading indicate that it moving toward crossing the border or the interval between UE location reporting can be increased when the direction of the heading is away from the border). In some embodiments, the location tracker server 1212 provides the GPS information on UE's of the first wireless network to an AI/ML system (e.g., AI/ML system 154) which collects and processes the information using machine learning to enhance the reporting interval based on UE's speed, average camping in a location, UE subscriber movement patterns (e.g., commuting/travel at different times (days of weeks, times of day) to optimize the reporting interval based on GPS information to reduce the amount of reports which need to be sent thereby reducing wireless network traffic while still being able to keep the UE on the native network while in the native country. The black list of neighbors in some embodiments is a list of neighbor cells or cell sectors (e.g., cell IDs) of foreign cells or cell sectors previously identified by the first wireless network (e.g., by the location tracker server 1212) which have coverage within the border site (e.g., border cell or cell sectors of the base station 1208). In this example, the black list includes the foreign network base station 1204 cell ID. In this example, the white list includes the cell IDs for the native network cells or cell sectors having coverage within the border site (cell ID) coverage area of the base station 1208 in which the UE 1206 is located and/or in the physical location or area reported by the UE 1206. Operation proceeds from step 1302 to step 1304. In some embodiments, the location tracker server 1212 makes the determination as to whether to send a white list of neighbors (e.g., native cell IDs or a black list of neighbors (cell IDs) depending on which is more efficient (e.g., which list is shorter). In some embodiments, the location tracker server 1212 always sends a white list of neighbors. In some embodiments, the location tracker server 1212 always sends a black list of neighbors.

In step 1304, the location tracker server 1212 generates the boundary restriction message 1308 which includes the white list and/or black list of neighbor sites (e.g., cell IDs). The message 1308 also may, and in some embodiments does, include an updated reporting interval for the UE 1206. Operation proceeds from step 1304 to step 1306.

In step 1306, the location tracker server 1212 transmits the message 1308 to the AMF 1210. Operation proceeds from step 1306 to step 1310.

In step 1310, the AMF 1210 receives and processes the message 1308. Operation proceeds from step 1310 to step 1312.

In step 1312, the AMF 1210 generates the message 1314 based on received message 1308 and transmits the message 1314 to base station 1208. The message 1314 includes the same information as message 1308 (i.e., the boundary restrictions and in some embodiments a new reporting interval). In some embodiments, the message 1308 and 1314 are the same and the AMF 1210 merely forwards the received message 1308 to the base station 1208 as message 1314. Operation proceeds from step 1312 to step 1316.

In step 1316, the base station 1208 receives the message 1314. Operation proceeds from step 1316 to step 1318.

In step 1318, the base station 1208 generates the message 1320 based on received message 1314 and transmits the message 1320 to UE 1206. The message 1320 includes the same information as message 1314 (i.e., the boundary restrictions and in some embodiments a new reporting interval). In some embodiments, the message 1314 and 1320 are the same and the base station 1208 merely forwards the received message 1314 to the UE 1206 as message 1320. Operation proceeds from step 1318 to step 1322.

In step 1322, the UE 1206 receives the message 1320. Operation proceeds from step 1322 to step 1323.

In step 1323, the UE 1206 updates its GPS information/location reporting interval to match the updated reporting interval in the message 1320. In step 1324, the UE 1206 also implements the white list/black list of neighbor sites (i.e., cell IDs) to determine available neighbors sites (cells or cell sectors) for migration which results in the UE remaining on or sticking to cells or cell sectors on the native network and not roaming to the foreign network cells or cell sectors regardless of the signal strength of the foreign network cells or cell sectors. In step 1324, the foreign network base station 1204 transmits a signal to the UE 1206 which is stronger than the signals the UE 1206 is receiving from the base station 1208 or any other native network cells or cell sectors. In step 1325, the UE 1206 receives the signal from foreign network base station 1204 and determines its cell ID and utilizes the white list and/or black list of neighbor cell Ids provided in message 1320 to determine not migrate, move to, roam to and or be handoff to the foreign network base station 1204.

Operation proceeds from step 1325 to step 1274 where the UE 1206 at the end of the time interval generates a new UE location message 1278 with updated GPS information and the method continues as previously described.

As previously described in connection with step 1300 when the location tracker server 1212 determines that the UE 1206 is not within the native country, operation proceeds to step 1326.

In step 1326, the location tracker server 1212 determines that no boundary restrictions are to be applied to UE 1206 and removes any temporary boundary restrictions (e.g., removal of white list/black of neighbor sites/cells or cell sectors) previously applied, when the UE 1206 is determined not be in the native country of the first wireless network. Operation proceeds from step 1326 to step 1328 shown on FIG. 12C.

In step 1328, the location tracker server 1212 generates the no boundary restriction instruction message 1332 (e.g., no white list/black list of neighbor sites/cells/cell sectors and/or removal of prior white list and/or black list site/cell restrictions (i.e., the UE is allowed to migrate, move, and/or roam based on normal signal strength determinations and roaming contracts)). Operation proceeds from step 1328 to step 1330.

In step 1330, the location tracker server 1212 transmits the message 1332 to the AMF 1210. Operation proceeds from step 1330 to step 1334.

In step 1334, the AMF 1210 receives the message 1332. Operation proceeds from step 1334 to step 1336.

In step 1336, the AMF 1210 determines if UE 1206 had prior temporary boundary restrictions. When the determination is that no temporary boundary restrictions are currently in operation for UE 1206 operation continues as normal. When the determination is that there are temporary boundary restrictions currently in operation for UE 1206, operation proceeds to step 1338.

In step 1338, the AMF 1210 implements updated procedures to remove any temporary boundary restrictions on UE 1206 and to permit UE 1206 to roam to a foreign network with no restrictions. For example, when signal quality threshold for roaming to foreign network are met at UE 1206, the UE 1206 is allowed to roam to the foreign network with better quality signal. Operation proceeds from step 1338 to step 1340.

In step 1340, in response to determining in step 1336 that UE 1206 had temporary boundary restriction in effect, the AMF 1210 generates remove boundary restriction instruction message 1344 which includes an instruction for the UE to remove any temporary boundary restrictions on moving, migrating or roaming to other sites (e.g., terminate use of white list or black list of neighbor sites/cells/cell IDs in determining whether to move, migrant, roam or handoff to another site/cell/cell sector). In some embodiments, the message 1344 includes the same information as message 1332. Operation proceeds from step 1340 to step 1342.

In step 1342, the AMF 1210 transmits the message 1344 to the base station 1208. Operation proceeds from step 1342 to step 1346.

In step 1346, the base station 1208 receives the message 1344. Operation proceeds from step 1346 to step 1348.

In step 1348, the base station 1208 generates and transmits remove boundary restriction instruction message 1350 to UE 1206. The message 1350 is generated based on the message 1344. In various embodiments, the message 1350 includes the same information as the message 1344 with respect to the removal of temporary boundary restrictions. In some embodiments, the message 1350 encapsulates the message 1344 or is a copy of message 1344. Operation proceeds from step 1348 to step 1352.

In step 1352, the UE 1206 receives the remove boundary restriction instruction message 1350. Operation proceeds from step 1352 to step 1354.

In step 1354, the UE 1206 determines based on the message 1350 that the temporary boundary restrictions are no longer applicable and ceases to utilize the black list and/or white list of neighbor sites/cell/cell Ids to determine whether to migrate, move, roam or handoff to another site/cell/cell Id. Operation proceeds from step 1354 to step 1355.

In step 1355, the foreign network base station 1204 transmits a signal to the UE 1206. Operation proceeds from step 1355 to step 1356.

In step 1356, the UE 1206 receives the signal from foreign network base station 1204. Operation proceeds from step 1356 to step 1357.

In step 1357, the UE 1206 determines that the foreign network base station 1204 has better signal quality than the signal from base station 1208 and that the signal from foreign network base station 1204 meets the signal quality thresholds to move, roam, migrate, or be handed off from the base station 1208 to the foreign network base station 1204. Operation proceeds from step 1357 to step 1358.

In step 1358, the UE 1206 roams to foreign network base station 1204 that is UE 1206 has left the native wireless network and connects to the foreign network via the foreign network base station 1204. Roaming charges will now be applied but they are correct as the UE 1206 is now in the foreign country.

In some embodiments, the first wireless network is a Hybrid Mobile Network Operator (HMNO) network operated by a first network operator, e.g., Charter, and the second wireless network is a Mobile Network Operator network operated by a second network operator (e.g., Verizon) wherein the first network operator has entered into an agreement with the second mobile operator to allow clients of the HMNO network to roam onto and utilize the MNO network to expand the coverage area on which client devices or subscriber devices of the HMNO can receive services beyond the coverage area of the HMNO network. In some such embodiments, the method 1200 may be utilized to keep user equipment devices which are client devices of the HMNO network (e.g., UE 1206) on the HMNO network (e.g., Charter network) rather than roaming onto the MNO network (e.g., Verizon's network). In such embodiments, the coverage area of the HMNO network which is the native network of the HMNO client devices (e.g., UE 1206) serves as the boundary for making determinations. When the UE 1206 geographical position is reported as being within the HMNO network coverage area, a temporary roaming restriction is implemented as discussed in connection with method 1200 restricting the UE 1206 from roaming onto or connecting to the base stations of the MNO network (e.g., Verizon network) which is the foreign network for the UE 1206 client device. When the UE 1206, crosses the border of the HMNO network and exists the HMNO network area and either enters or is in an MNO network coverage area, the temporary roaming restrictions on UE 1206 are removed and the UE 1206 can roam onto or connect to the MNO network. In this way, HMNO network client devices (e.g., user equipment devices which have subscribed to the HMNO network are keep on the HMNO network as long as within the HMNO network coverage area reducing roaming costs for the HMNO network operator.

Figure 18:
FIG. 18 illustrates the use of geo-fencing around a native wireless network perimeter in accordance with an embodiment of the present invention.

Diagram 1800 in FIG. 18 illustrates geo-fencing 1802 around a native wireless network perimeter to which the user equipment device 1 (UE 1) 1805 and user equipment device 2 (UE 2) 1807 have subscribed. Arrow 1810 indicates UE 1 1805 moving out of coverage of the native network cell 1804 (i.e., cell 1804 of the HMNO, e.g., the Charter network) and arrow 1812 indicates UE 2 1807 moving from the foreign network (e.g., MNO network cell 1815, e.g., Verizon network) into coverage of the native network (i.e., the HMNO network cell 1807, e.g., the Charter network).

The ellipses 1804, 1806 and 1808 of diagram 1800 illustrate cells of a HMNO network in which the HMNO base station(s) provide wireless services. The HMNO network in this example is referred to as the native network. The hexagon 1815 illustrates a cell from a Mobile Network Operator network (e.g., Verizon) and its coverage includes the three HMNO network cells 1804, 1806 and 1808 coverage area. The dashed line 1802 represents a geo-fence around the HMNO network's coverage area which is at or just inside the perimeter of the combined coverage area of the HMNO network cells 1804, 1806, and 1808. The geo-fence location inside or along the perimeter or boundary of the combined HMNO network cells coverage insures that a UE located within or at the boundary will have HMNO coverage. The HMNO network and the MNO network have entered into an agreement in which the MNO network will provide services to the subscribers of the HMNO network so that the HMNO network subscribers can have additional coverage beyond the coverage area provided by the HMNO network.

The UE 1 1805 being connected to and serviced by the HMNO network base station providing the wireless coverage in the cell 1804. The MNO network has coverage throughout the entire area enclosed by the cell 1815. The UE 1 received a black list of cell ID(s) from a location tracker device in the HNMO core network based on the location the UE 1 1805 device reported to the HMNO location tracker device. The black list of cell IDs includes the cell ID for the MNO cell 1815. As a result, the UE 1 1805 will not roam onto the MNO network even if the signal from the MNO cell 1815 has better signal strength than the signal strength from the cell 1804. Arrow 1810 illustrates UE 1 1805 moving out of the coverage of native network (i.e., HMNO network cell 1804). As the UE 1 device 1805 approaches the geo-fence 1802, a GPS receiver on the UE 1 1805 device generates GPS coordinates, velocity and heading for the UE 1 at intervals specified by the location tracker device. A connection manager application residing/located/executing on the UE 1 device 1805 communicates this information to the location tracker device in the HMNO network core. As long as the UE reports its GPS coordinates within the geo-fenced area 1802, the location tracker device will maintain the black list roaming restriction and the UE 1 1805 will remain on the HMNO network which is its native network. Once the UE 1 device 105 moves outside the area of the geo-fence 1802 and reports GPS coordinates outside the geo-fenced area 1802, the location tracker device will remove the temporary black list restrictions allowing the UE 1 1805 to roam onto the MNO network cell 1815 if the signaling threshold indicate the UE 1 1805 will receive better service. UE 2 which is outside the coverage area of the native network and outside the geo-fenced area will initially be on the MNO network cell 1815. When it moves inside the geo-fenced area 1802 and connects to native network cell 1808, it will receive temporary roaming instructions which black list the MNO network cell 1815 restricting UE 1807 from roaming onto it while within the geo-fenced area 1802. In some embodiments, the geo-fenced coordinates are provided to a user equipment device upon connecting to a cell of the HMNO network along with temporary roaming restrictions to be applied while within the geo-fenced area. In this way, the UE does not have to report its location to the location tracker device in the HMNO network while within the geo-fenced area 1802 and once outside the geo-fenced area the restrictions will no longer apply.

Figure 13:
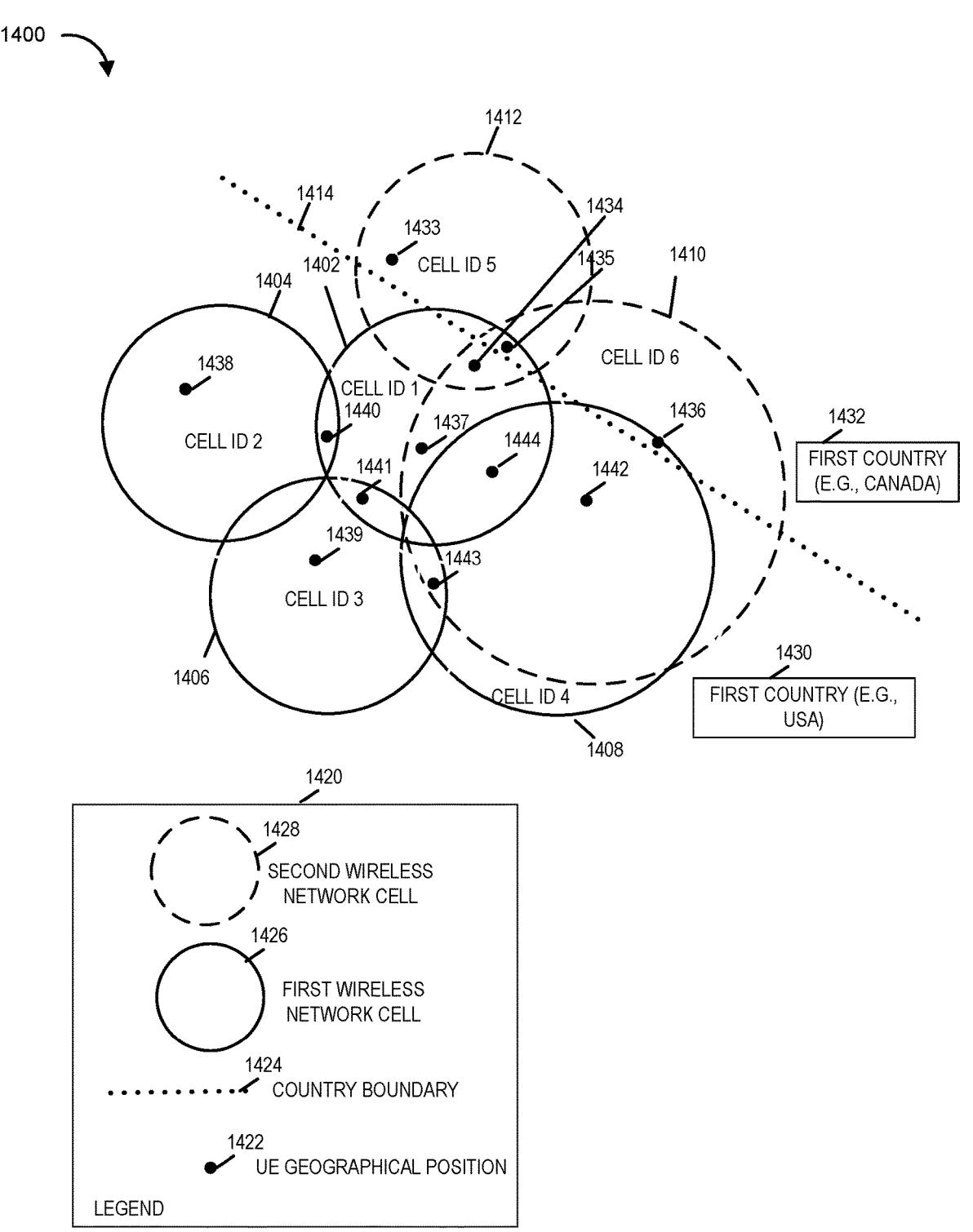
FIG. 13 illustrates an exemplary diagram of a first set of cells of a first wireless network and a second set of cells of second wireless network in accordance with an embodiment of the present invention.

FIG. 13 illustrates exemplary diagram 1400 of a first set of cells of a first wireless network and a second set of cells of second wireless network in accordance with an embodiment of the present invention. The diagram 1400 will be utilized to explain how neighbor cell ID lists (e.g., black list and white list of neighbor cell IDs) are generated and utilized in accordance with an exemplary embodiment of the present invention.

Legend 1420 provides information for understanding the diagram 1400. As noted in the legend 1420, a dot 1422 in the diagram 1400 represents a geographical position of user equipment device (e.g., client device or subscriber device of the first wireless network). Dots 1434, 1435, 1436, 1437, 1438, 1439, 1440, 1441, 1442, 1443, and 1444 represent the geographic position of a UE device in the diagram 1400. As noted in the legend 1420, a dotted straight line . . . 1424 represents a country boundary. Dotted line 1414 represents a boundary between a first country 1430 (e.g., USA) and a second country 1432 (e.g., Canada). The boxes 1430 and 1432 being labels. All of the area below the line 1414 is in the first country and all of the area above the line 1414 is in the second country. As noted in the legend 1420 a circle formed by a solid line 1426 indicates a wireless network cell belonging to the first wireless network with the area within the cell being the coverage area of the cell. Cells 1402, 1404, 1406, and 1408 are cells of the first wireless network with the solid line of each cell representing the boundary of the cell's cover area. Cell 1402 has cell ID 1. Cell 1404 has cell ID 2. Cell 1406 has cell ID 3. Cell 1408 has cell ID 4. As noted in the legend 1420 a circle formed by a dashed line 1428 indicates a wireless network cell belonging to the second wireless network with the area within the cell being the coverage area of the cell. Cells 1410 and 1412 are cells of the second wireless network with the dashed line of each cell representing the boundary of the cell's cover area. Cell 1410 has cell ID 6. Cell 1412 has cell ID 5. Each of the cell IDs (cell ID 1, cell ID 2, cell ID 3, cell ID 4, cell ID 5 and cell ID 6 is unique. From the cell ID, it can be determined whether the cell belongs the first wireless network or to different wireless network (e.g., the second wireless network). In some embodiments, the cell ID includes information which identifies the base station which is generating the signals forming the cell.

FIG. 14 illustrates a table 1450 which correlates base cell ID of each of the first wireless network cells with the neighbor cell IDs of each of the base cell's neighbors. This table may be, and in some embodiments is, generated by one or more user equipment devices moving throughout the cell areas of the cells 1402, 1404, 1406 and 1408 and determining the neighboring cells based on signals received by the one or more user equipment devices from the neighboring cells. A neighbor cell to a base cell is a cell that has an overlapping coverage area within the base cell. A neighbor cell need not be an adjacent cell, e.g., cell 1410 (cell ID 6) is not adjacent to cell 1406 (cell ID 3) but it is a neighbor cell as a portion of the coverage area of the cell 1410 (cell ID 6) overlaps with the coverage area of cell 1406 (cell ID 3).

The table 1450 includes columns 1452 and 1454 and rows 1456, 1458, 1460, 1462, 1464. The entries of the first row of the table 1456 includes header information or labels which explains the contents of the information in corresponding entries in the column. Entry row 1456, column 1452 includes the header base cell ID of the first wireless network indicating that the entries in this column are the cell ID of the base cell for the row in which the entry appears. The entry row 1456 column 1454 includes the header neighbor cell IDs which indicates that the entries in this column are the neighbor cell IDs for the base cell ID in the same row as the entry.

The entries in row 1458 indicate that the cell ID 1 (entry row 1458, column 1452) has neighbor cells with cell ID 2, cell ID 3, cell ID 4, cell ID 5, and cell ID 6 (entry row 1458, column 1454). A review of the diagram 1400 shows that cell 1402 with cell ID 1 has a coverage area which overlaps with cell 1404 (cell ID 2), cell 1406 (cell ID 3), cell 1408 (cell ID 4), cell 1410 (cell ID 6), and cell 1412 (cell ID 5) as described in row 1458 of the table 1450.

The entries in row 1460 indicate that the cell ID 2 (entry row 1460, column 1452) has neighbor cells with cell ID 1 and cell ID 3 (entry row 1460, column 1454). A review of the diagram 1400 shows that cell 1404 with cell ID 2 has a coverage area which overlaps with cell 1402 (cell ID 1) and cell 1406 (cell ID 3) as described in row 1460 of the table 1450.

The entries in row 1462 indicate that the cell ID 3 (entry row 1462, column 1452) has neighbor cells with cell ID 1, cell ID 2, cell ID 4, and cell ID 6 (entry row 1462, column 1454). A review of the diagram 1400 shows that cell 1406 with cell ID 3 has a coverage area which overlaps with cell 1402 (cell ID 1), cell 1404 (cell ID 2), cell 1408 (cell ID 4) and cell 1410 (cell ID 6) T) as described in row 1462 of table 1450.

The entries in row 1464 indicate that the cell ID 4 (entry row 1464, column 1452) has neighbor cells with cell ID 1, cell ID 3, and cell ID 6 (entry row 1464, column 1454). A review of the diagram 1400 shows that cell 1408 with cell ID 4 has a coverage area which overlaps with cell 1402 (cell ID 1), cell 1406 (cell ID 3), and cell 1410 (cell ID 6) as described in row 1464 of table 1450.

FIG. 15 illustrates table 1450' which is table 1450 that has been modified to only include base cell IDs of border cells of the first wireless network and their corresponding neighbor cell IDs. A border cell of the first wireless network being a cell of the first wireless network with an overlapping coverage area of a cell belonging to the second wireless network. The first wireless network determines the border cells by reviewing a base cell's neighboring cell IDs and determining whether any of the neighboring cell IDs do not belong to the first wireless network. In this example, the cell 1402 with cell ID 2 only has neighbor cells which belong to the first wireless network (i.e., cell 1402 cell ID 1, and cell 1439 cell ID 3). Cell 1402 with cell ID 2 is determined to not be a border cell of the first wireless network as it does not have any overlapping coverage area with cells that are not part of the first wireless network. As a result row 1460 of table 1450 has been deleted to create table 1450'.

Table 1450' of FIG. 15 includes columns 1452' and 1454' and rows 1456', 1458, 1462, 1464. The entries of the first row of the table 1456' includes header information or labels which explains the contents of the information in corresponding entries in the column. Entry row 1456', column 1452' includes the header base cell ID of border cells of the first wireless network indicating that the entries in this column are the cell ID of the base cell for the row in which the entry appears. The entry row 1456' column 1454' includes the header neighbor cell IDs which indicates that the entries in this column are the neighbor cell IDs for the base cell ID in the same row as the entry.

The entries in rows 1458, 1462, and 1464 of table 1450' are the same as in table 1450. From the entries in rows 1458, 1462, and 1464 it can be determined that the cells 1402 (cell ID 1), 1406 (cell ID 3), and 1408 (cell ID 4) are border cells of the first wireless network.

It can be determined that cells 1402, 1406, and 1408 with cell IDs 1, 3, and 4 respectively each have neighbor cells that are cells that are not within the first wireless network.

Cell 1402 with cell ID 1 has neighbor cells including cell 1410 with cell ID 6 and cell 1412 with cell ID 5. Based on the cell IDs 5 and 6, it can be determined that the cells with these cell IDs are not part of the first wireless network. Furthermore, in various embodiments, it can be determined based on the cell IDs that cell ID 5 and cell ID 6 belong to the second wireless network. As such, cell 1402 with cell ID 1 is a border cell of the first wireless network.

Cell 1406 with cell ID 3 has neighbor cells including cell 1410 with cell ID 6. Based on the cell ID 6, it can be determined that cell 1410 with cell ID 6 is not part of the first wireless network. Furthermore, in various embodiments, it can be determined based on the cell ID 6 that cell 1410 with cell ID 6 belongs to the second wireless network. As such, cell 1406 with cell ID 3 is a border cell of the first wireless network.

Cell 1408 with cell ID 4 has neighbor cells including cell 1410 with cell ID 6. Based on the cell ID 6, it can be determined that cell 1410 with cell ID 6 is not part of the first wireless network. Furthermore, in various embodiments, it can be determined based on the cell ID 6 that cell 1410 with cell ID 6 belongs to the second wireless network. As such, cell 1408 with cell ID 4 is a border cell of the first wireless network.

Table 1500 of FIG. 15 includes information correlating base cell ID of border cells of the first wireless network with a while list and a black list of neighbor cell IDs. The white list of neighbor cell IDs are the cell IDs of neighbor cells which are part of the first wireless network and are neighbors to the cell with the base cell ID in same row of the table. The black list of neighbor cell IDs are the cell IDs of neighbor cells which are not part of the first wireless network (e.g., are part of the second wireless network) and are neighbors to the cell with the base cell ID in the same row of the table.

Figure 16:
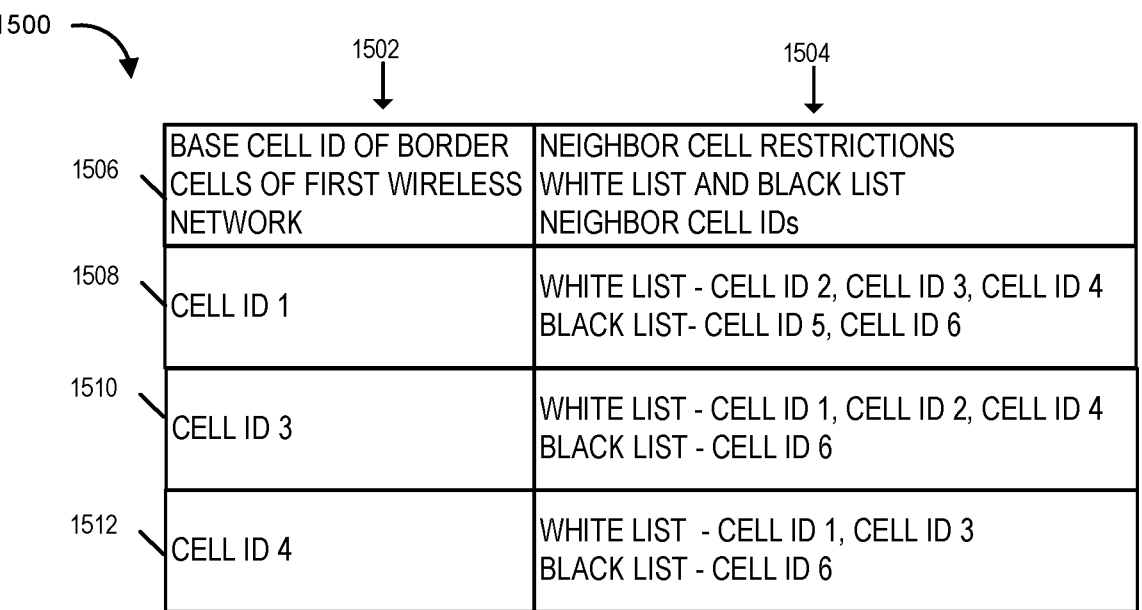
FIG. 16 illustrates an exemplary table that include base cell IDs of border cells of a first wireless network and white list and black list of neighbor cell IDs in accordance with an embodiment of the present invention.

Table 1500 of FIG. 16 includes columns 1502 and 1504 and rows 1506, 1508, 1510, and 1512. The entries of the first row of the table 1500 (row 1506) includes header information or labels which explains the contents of the information in corresponding entries in the column of the table. Entry row 1506, column 1502 includes the header base cell ID of border cells of the first wireless network indicating that the entries in this column are the cell ID of the base cell for the row in which the entry appears. The entry row 1506 column 1504 includes the header white list and black list neighbor cell IDs which indicates that the entries in this column are white list and black list neighbor cell IDs for the base cell ID in the same row as the entry.

Entry row 1508 column 1502 includes cell ID 1 indicating that the information in this row corresponds to the cell 1402 with cell ID 1. Entry row 1508, column 1504 includes the white list of neighbor cell IDs-cell ID 2, cell ID 3, and cell ID 4 which indicate that the cells with the cell IDs 2, 3, and 4 are neighbor cells to the cell with cell ID 1 and that these neighbor cells are part of the first wireless network and are the only neighbor cells to which a user equipment device connected to the cell with cell ID 1 is permitted to roam. Entry row 1508, column 1504 also includes the black list of neighbor cell IDs—cell ID 5 and cell ID 6 which indicate that the cells with the cell ID 5 and cell ID 6 are not part of the first wireless network and are neighbors cells to which a user equipment device connected to the first cell with cell ID 1 is restricted from roaming or connecting to.

Entry row 1510 column 1502 includes cell ID 3 indicating that the information in this row corresponds to the cell 1406 with cell ID 3. Entry row 1510, column 1504 includes the white list of neighbor cell IDs—cell ID 1, cell ID 2, and cell ID 4 which indicate that the cells with the cell IDs 1, 2, and 4 are neighbor cells to the cell with cell ID 3 and that these neighbor cells are part of the first wireless network and are the only neighbor cells to which a user equipment device connected to the cell with cell ID 3 is permitted to roam. Entry row 1510, column 1504 also includes the black list of neighbor cell IDs—cell ID 6 which indicate that the cell with cell ID 6 is not part of the first wireless network and is a neighbor cell to which a user equipment device connected to the first cell with cell ID 1 is restricted from roaming or connecting to.

Entry row 1512 column 1502 includes cell ID 4 indicating that the information in this row corresponds to the cell 1408 with cell ID 4. Entry row 1512, column 1504 includes the white list of neighbor cell IDs—cell ID 1 and cell ID 3 which indicate that the cells with the cell IDs 1 and 3 are neighbor cells to the cell with cell ID 4 and that these neighbor cells are part of the first wireless network and are the only neighbor cells to which a user equipment device connected to the cell with cell ID 4 is permitted to roam. Entry row 1512, column 1504 also includes the black list of neighbor cell IDs—cell ID 6 which indicate that the cell with cell ID 6 is not part of the first wireless network and is a neighbor cell to which a user equipment device connected to the first cell with cell ID 4 is restricted from roaming or connecting to.

Table 1700 of FIG. 17 includes columns 1702 and 1704 and rows 1706, 1708, 1710, 1712, 1714, and 1716. The table 1700 provides information mapping a UE geographical position and cell ID to which a UE is connected with a white list and black list of neighbor cell IDs that can be used to restrict the UE from roaming off of the first wireless network.

The entries of the first row of the table 1700 (row 1706) includes header information or labels which explains the contents of the information in corresponding entries in the column of the table. Entry row 1706, column 1702 includes the header User Equipment (UE) Geographical Position and Cell ID Connection indicating that the entries in this column provide the geographical position of a user equipment device and the cell ID to which the user equipment device is connected. The entry row 1706 column 1704 includes the header neighbor cell restrictions white list and black list neighbor cell IDs which indicates that the entries in this column indicate the cell restrictions for roaming including a white list and a black list of neighbor cell IDs that is to be used for a UE with the geographical position and cell ID connection identified on the same row as the entry.

Entries in the row 1708 include information that indicates a UE connected to the cell with cell ID 1 at the following geographic UE positions 1434, 1437, 1440, 1441, 1444 all of which are in the first country (entry row 1708, column 1702) as shown in diagram 1300 have a corresponding white list of neighbor cell IDs—cell ID 2, cell ID 3, cell ID 4 and a corresponding black list of neighbor cell IDs—cell ID 5 and cell ID 6 (entry row 1708, column 1704).

Entries in the row 1710 include information that indicates a UE connected to cell with cell ID 1 at the following geographic UE positions 1435 which is not in the first country but is in the second country (entry row 1710, column 1702) as shown in diagram 1300 have no neighbor cell roaming restrictions and no corresponding white list of neighbor cell IDs and no corresponding black list of neighbor cell IDs (entry row 1710, column 1704).

Entries in the row 1712 include information that indicates a UE connected to the cell with cell ID 3 at the following geographic UE positions 1439, 1441, 1443 all of which are in the first country (entry row 1712, column 1702) as shown in diagram 1300 have a corresponding white list of neighbor cell IDs—cell ID 2, cell ID 4 and a corresponding black list of neighbor cell IDs—cell ID 6 (entry row 1712, column 1704).

Entries in the row 17124 include information that indicates a UE connected to the cell with cell ID 4 at the following geographic UE positions 1442, 1443, and 1444 all of which are in the first country (entry row 1714, column 1702) as shown in diagram 1300 have a corresponding white list of neighbor cell IDs—cell ID 1, cell ID 3 and a corresponding black list of neighbor cell IDs—cell ID 6 (entry row 1714, column 1704).

Entries in the row 1716 include information that indicates a UE connected to cell with cell ID 4 at the following geographic UE position 1436 which is not in the first country but is in the second country (entry row 1716, column 1702) as shown in diagram 1300 have no neighbor cell roaming restrictions and no corresponding white list of neighbor cell IDs and no corresponding black list of neighbor cell IDs (entry row 1716, column 1704).

The table 1700 includes exemplary UE connections and positions that may be, and in some embodiments, are used, e.g., by a location tracker device of the first wireless network, to determine what if any roaming restrictions to apply to a user equipment device based on the user equipment devices geographically position and the cell ID of the cell in the first wireless network to which the user equipment device is connected. In various embodiments, the location tracker compares UE geographical positions to geographical coordinates defining the boundaries of the first country and/or the second country to determine whether the UE geographical position is within the first country or not.

In various embodiments, a location tracker device of the first wireless network (e.g. location tracking service device 152 of FIGS. 1 and 3, location tracking service device 1102 of FIG. 11, location tracker server 1212 of FIG. 12) are used to generate the tables 1450, 1450', 1500, and 1700. In some embodiments, the tables 1450, 1450', 1500 and 1700 and/or the information included in the tables 1450, 1450', 1500 and 1700 are stored in a Geographic Information System, e.g., GIS 1103. In some embodiments, the tables 1450, 1450', 1500 and 1700 and/or the information included in the tables 1450, 1450', 1500 and 1700 are stored in memory or a storage device which is part of or accessible by a location tracker device of the first wireless network.

FIG. 5 is a drawing of an exemplary user equipment (UE) device 500 in accordance with an exemplary embodiment. UE device 500 is, e.g., a wireless device, e.g., a mobile device such as a cell phone, a smart phone, wireless tablet or wireless notebook. While single SIM subscriber UE devices can be and are used in various embodiments of the present invention, dual SIM subscriber UE devices can and are also used with present invention. The exemplary UE device 500 is a dual SIM dual subscriber device that is enabled to communicate with different wireless base stations utilizing different wireless spectrum and/or wireless protocols, e.g., 5G wireless protocol, CBRS wireless protocol or cellular wireless protocol. The UE device 500 can communicate with a first wireless network (e.g., a MNO network) using a first set spectrum using the first of the dual SIM cards and the can communicate with a second wireless network (e.g., a MSO network) using a second set of spectrum using the second of the dual SIM cards. Exemplary UE device 500 includes wireless interfaces 504, a network interface 505, a processor 506, e.g., a CPU, an assembly of hardware components 508, e.g., an assembly of circuits, and I/O interface 510, a GPS receiver 502 coupled to GPS receive antenna 507, a timer 511, e.g., a reference clock including a local oscillator 513, a dual SIM card interface 570 including a first SIM card, SIM card 1 571, corresponding a first service provider, and a second SIM card, SIM card 2 572 corresponding to a second service provider, and memory 512 coupled together via a bus 509 over which the various elements may interchange data and information. UE device 500 further includes a microphone 560, camera 561, speaker 562, a display 564, e.g., a touch screen display, switches 566, keypad 568 and mouse 569 coupled to I/O interface 510, via which the various I/O devices (560, 561, 562, 564, 566, 568, 569) may communicate with other elements (502, 504, 505, 506, 508, 512, 570) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. In some embodiments, the assembly of hardware components 508 includes a Global Positioning System (GPS) receiver component 573 that can generate GPS information from received GPS signals. The GPS information may, and in some embodiments does include GPS coordinates, velocity and heading information, geographic physical location information including altitude, latitude, and longitude.

Wireless interfaces 504 include a plurality of wireless interfaces including first wireless interface 536 and a second wireless interface 550. The first wireless interface 536 is, e.g., used to communicate with wireless base stations in a first service provider's communications network, e.g., cellular, e.g., gNB or eNB tower base stations of the first service provider's communications network, e.g., using a first set of spectrum and a first communications protocol corresponding to the first service provider (e.g., MNO network service provider such as Verizon). The second wireless interface is, e.g., used to communicate with a device, e.g., a CBSD base station, gNB, or eNB, of a second service provider's communications network (e.g., MSO service provider such as Charter). For example, the second wireless interface is used to communicate with a CBDS, eNodeB, or gNB base station of the second service provider using a second set of spectrum and a second communication protocol corresponding to the second service provider. The first wireless interface 536 includes wireless receiver 538 and a wireless transmitter 540. In some embodiments, receiver 538 and transmitter 540 are part of a transceiver. In various embodiments, the first wireless interface 536 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., a cellular wireless base station of the first service provider. Wireless transmitter 540 is coupled to a plurality of wireless transmit antennas (transmit antenna 1 543, . . . , transmit antenna N 545) via which the user equipment device 500 can transmit signals to other wireless communications devices including a cellular wireless base station of the first service provider. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including, e.g. an eNodeB, a gNb or a CBSD base station of a second service provider. Wireless transmitter 554 is coupled to one or more wireless transmit antennas (transmit antenna 1 558, . . . , transmit antenna N 560) via which the user equipment device 500 can transmit signals to other wireless communications devices including, e.g., a CBSD, a eNB, or gNb of a second service provider. The user equipment device network interface 505 may be coupled to LAN or WAN networks or routers so that the user equipment device can also obtain services via a hardwired connection in addition to through the wireless interfaces, e.g. when the UE device 500 is at a location where such a connection is possible.

In various embodiments of the present invention, when a first wireless network and a second wireless network are utilizing the spectrum for communicating with user equipment client only a single wireless interface (e.g., first wireless interface 536) is utilized to communicate with the base station of both the first and second wireless networks. For example, UE 500 can communicate with both the base stations in the cells of the first wireless network in the first country in diagram 100 and the base stations in the cells of the second wireless network in the second country for both the first and second network are utilizing the same spectrum for wireless communication and have entered into a roaming agreement.

Memory 512 includes an assembly of components 514, e.g., an assembly of software components, and data/information 516. In some embodiments, the assembly of software components 514 includes a connection manager component 574 which implements roaming and other connection restrictions such as implementation of white lists of neighbor cell IDs and black lists of neighbor cell IDs. Data/information 516 includes service provider 1 subscription information 517, e.g., credentials corresponding to service provide 1, service provider 2 subscription information 518, e.g., credentials corresponding to service provider 2. Data/information 516 includes UE location information, velocity and heading information 519, e.g., GPS coordinates and/or cell and sector information. Data/information 516 includes roaming/connection restrictions—white list and black list of neighbor cell IDs 520. Data/information 516 further includes UE context information 521, e.g., UE identification information such as GUTI-1 assigned by a first wireless network, GUTI-2 assigned by a second wireless network, IMSI, IMEI, C-RNTI. Data/information 516 further includes Global Positioning System information 522 such as for example, GPS coordinates, velocity, and heading information. Data/information 516 further includes measured signal information 523 including neighbor cell IDs with UE location information and neighbor cell ID strength information (for example RSRP and RSRQ measured values). Data/information 516 in some embodiments includes geo-fencing information 524 which includes location information (e.g., GPS coordinates) establishing a perimeter around the boundary of the coverage area for the first and/or second wireless networks. Data/information 516 includes UE connection information 525 (e.g., cell ID to which the UE is currently connected).

In some embodiments, the user equipment devices discussed in the Figures and/or in connection with the embodiments of the present invention described are implemented in accordance with user equipment device 500. For example user equipment devices UE 124, 126, . . . , 128 which of the first wireless network show in FIG. 1, and user equipment devices 130, 131, . . . , 134 of the second wireless network shown in FIG. 1, UE 302 of FIGS. 3 and 4, UE 1107 of system 1100 of FIG. 13, UE 1206 of FIG. 12 may be, and in some embodiments are, implemented in accordance with user equipment device 500.

Figure 6:
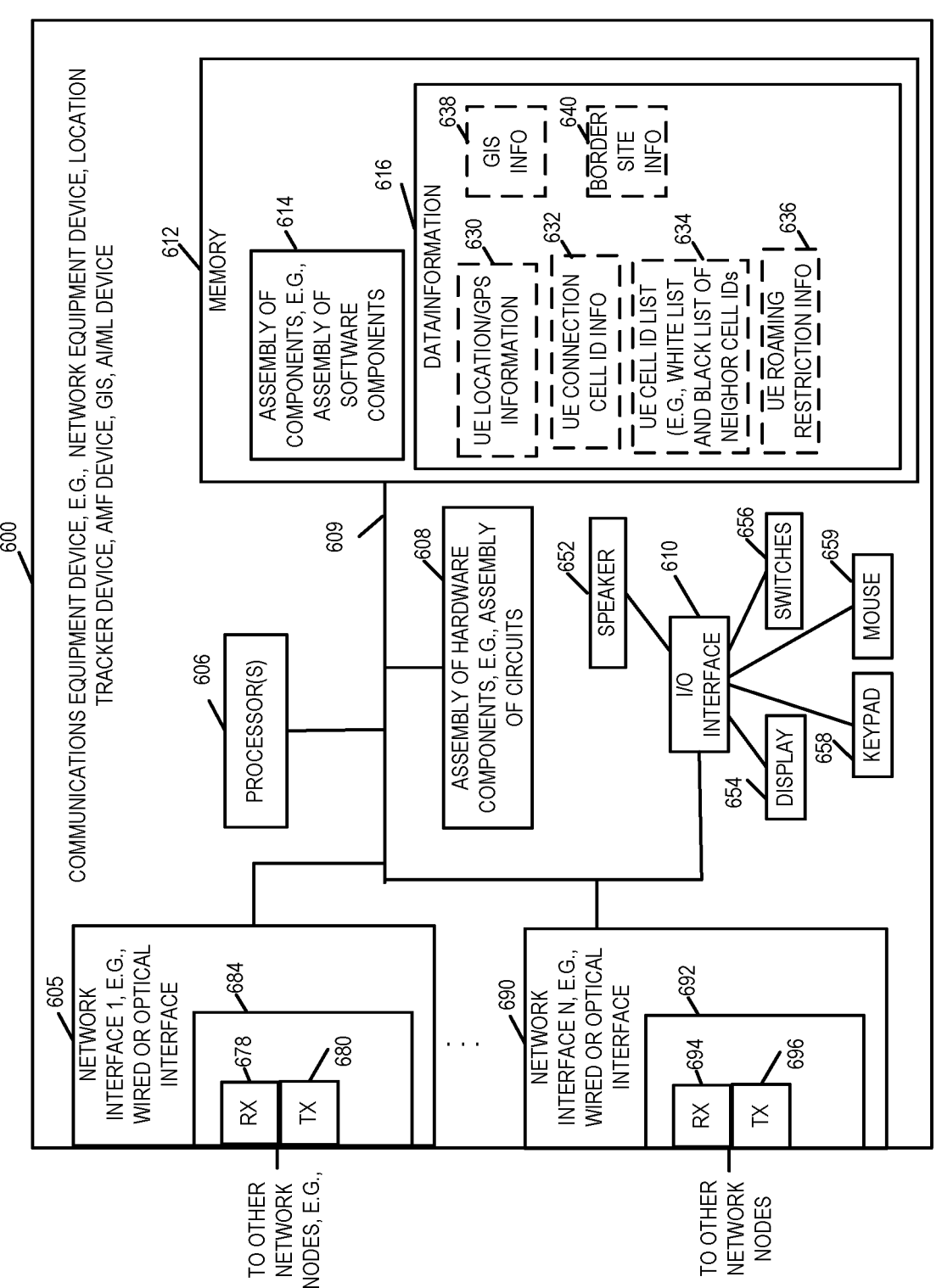
FIG. 6 illustrates details of an exemplary communications equipment device, e.g., location tracker device, location tracker server, Geographic Information System, AI/ML system, network equipment device, Access and Mobility Management Function (AMF) node/device in accordance with one embodiment of the present invention.

FIG. 6 is a drawing of an exemplary communications equipment device, e.g., network equipment device, location tracker device, location tracking service device, location tracker server, Access and Mobility Management Function (AMF) device/node, GIS system/apparatus, Artificial Intelligence/Machine Learning system/device in accordance with an exemplary embodiment. The communications equipment device 600 includes a plurality of network interfaces 605, . . . 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The communications equipment device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the communications equipment device 600. Network interface 605 includes a receiver 678 and a transmitter 680. The network interface 605 is typically used to communicate with other devices. In some embodiments, receiver 678 and transmitter 680 are part of a transceiver 684. Network interface 690 includes a receiver 694 and a transmitter 696. The network interface 690 is typically used to communicate with other devices, e.g., other network nodes in a core, etc. In some embodiments, receiver 694 and transmitter 696 are part of a transceiver 692. Memory 612 includes an assembly of component 614, e.g., an assembly of software components, and data/information 616. Data/information 616 includes information and data being stored at the communications equipment device e.g., UE location/GPS information 630 when the communications equipment device 600 is for example as a location tracker device, location tracking service device, location tracker server, GIS device, AI/ML device; UE connection cell ID information 632 when the communications equipment device 600 is implemented for example as a location tracker device, location tracking service device, location tracker server, GIS device, AI/ML device, AMF device; UE cell ID List Information (e.g., white list and black list of neighbor cell IDs with respect to a base cell ID to which a UE is connected) 634, UE roaming restriction information 636, GIS Information 638 (e.g., UE geographic information and cell ID restriction mapping information, network coverage information, UE travel data) when the communications device 600 is implemented for example as a location tracker device, location tracking service device, location tracker server, GIS device; border site information 640 (e.g., identification of which sites/cell/ cell sectors are border sites in a network) when the communications device 600 is implemented as a location tracker device, location tracking service device, location tracker server, GIS device, AI/ML device. The data/information 616 which is included in the communications device 600 can include each of the items identified above and is used for storing any data or information used by or necessary for performing the operations of the device as implemented whether it be an AMF device, location tracker device or a artificial intelligence/machine learning device/system.

In some embodiments, the communications equipment devices discussed in the Figures and/or in connection with the embodiments of the present invention described are implemented in accordance with communications equip-ment device 600. For example, communications equipment devices and/or functions in the first core network of the system 1100 shown in FIG. 11 (e.g., AMF 1122, GIS 1103, location tracking service device 1102, AI/ML system 1104), the location tracking service device 152 shown in FIG. 1, FIG. 3, location tracking service device 1102 in FIG. 11, location tracker server 1212 in FIG. 12, the AMF 1210 in FIG. 13 may be, and in some embodiments are, implemented in accordance with the communications device 600.

Figure 7:
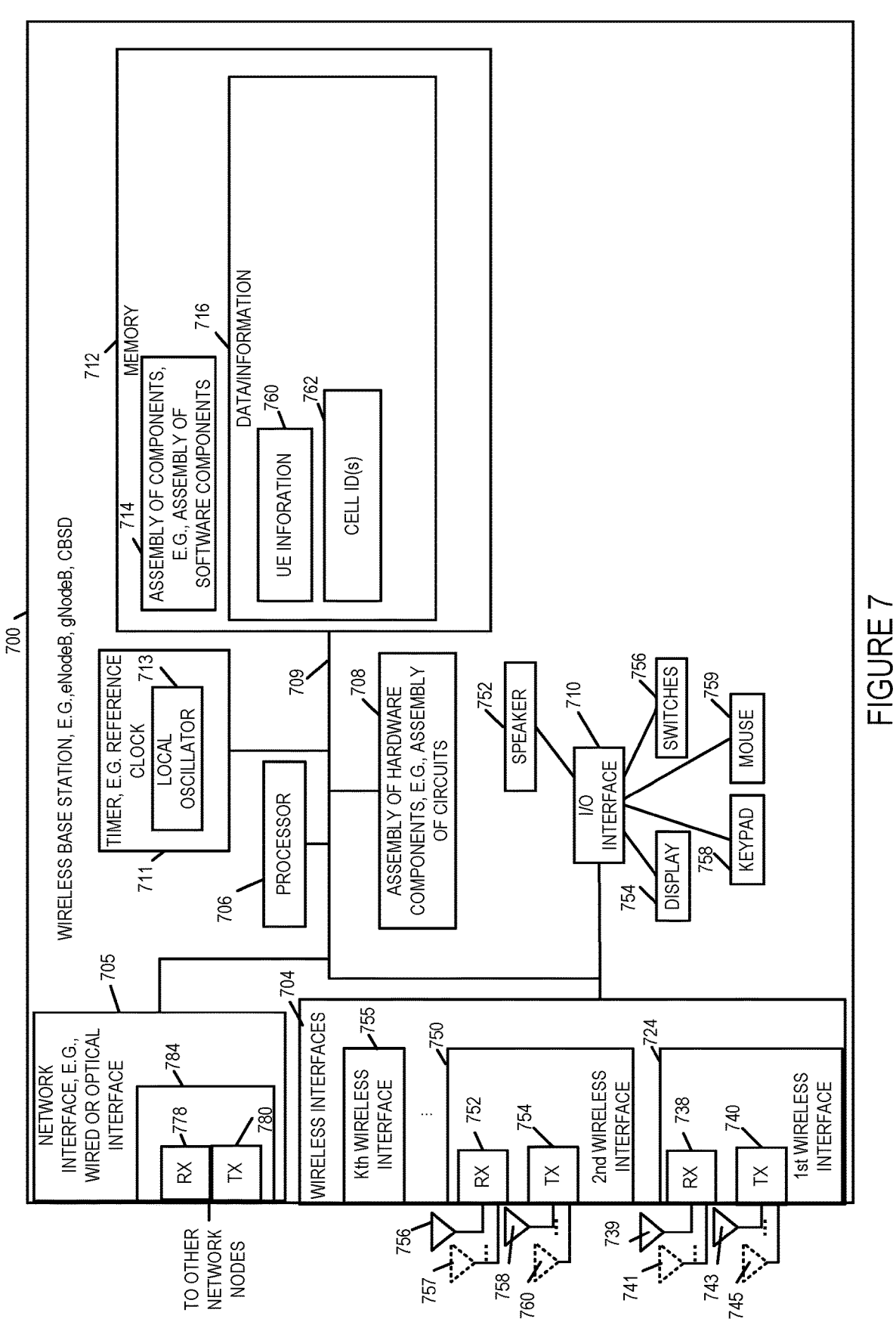
FIG. 7 illustrates an exemplary wireless base station in accordance with an embodiment of the present invention.

FIG. 7 is a drawing of an exemplary wireless base station 700 in accordance with an exemplary embodiment. FIG. 7 is a drawing of an exemplary wireless base station 700, e.g., an eNodeB, a gNodeB, or Citizens Broadband Radio Service wireless base station (CBSD), in accordance with an exemplary embodiment. Exemplary wireless base station 700 includes a wireless interface 704, a network interface 705, e.g., a wired or optical interface, a processor 706, e.g., a CPU, an assembly of hardware components 708, e.g., an assembly of circuits, and I/O interface 710, timer, e.g., reference clock 711 including a local oscillator 713, and memory 712 coupled together via a bus 709 over which the various elements may interchange data and information. Wireless base station 700 further includes a speaker 752, a display 754, switches 756, keypad 758 and mouse 759 coupled to I/O interface 710, via which the various I/O devices (752, 754, 756, 758, 759) may communicate with other elements (704, 705, 706, 708, 711, 712) of the wireless base station 700. Network interface 705 includes a receiver 778 and a transmitter 780. In some embodiments, receiver 778 and transmitter 780 are part of a transceiver 784. Wireless interfaces 704 include a plurality of wireless interfaces including first wireless interface 724, second wireless interface 750, . . . , Kth wireless interface 755. The wireless interfaces are used to communicate with the wireless devices, e.g., user equipment device, e.g., dual SIM dual subscriber (DSDS) user equipment devices. The first wireless interface 724 is used for example to communicate with a first user equipment device using a first spectrum band. The second wireless interface can be used to communicate with a second user equipment device using a second spectrum band. The first wireless interface 724 includes wireless receiver 738 and a wireless transmitter 740. In some embodiments, receiver 738 and transmitter 740 are part of a transceiver. In various embodiments, the first wireless interface 724 includes a plurality of wireless receivers and a plurality of wireless transmitters. Wireless receiver 738 is coupled to a plurality of receive antennas (receive antenna 1 739, . . . , receive antenna M 741), via which wireless base station 700 can receive wireless signals from other wireless communications devices including a second wireless communications device, e.g., a user equipment device. Wireless transmitter 740 is coupled to a plurality of wireless transmit antennas (transmit antenna 1 743, . . . , transmit antenna N 745) via which the wireless base station 700 can transmit signals to other wireless communications devices including a second wireless communications device, e.g., a user equipment device.

The second wireless interface 750 includes wireless receiver 752 and a wireless transmitter 754. In some embodiments, receiver 752 and transmitter 754 are part of a transceiver. In various embodiments, the second wireless interface 750 includes a plurality of wireless receivers and a plurality of wireless transmitters. Wireless receiver 752 is coupled to one or more receive antennas (receive antenna 1 756, . . . , receive antenna M 757), via which wireless base station 700 can receive wireless signals from other wireless communications devices including a second wireless communications device, e.g., DSDS UE device, using the same or a different wireless protocol than the first wireless interface. Wireless transmitter 754 is coupled to one or more wireless transmit antennas (transmit antenna 1 758, . . . , transmit antenna N 760) via which the wireless base station 400 can transmit signals to other wireless communications devices including a second wireless communications device. The wireless base station network interface 705 may be coupled to a cable modem, a core network, other networks, e.g., internet, or other wireless base stations.

Memory 712 includes an assembly of components 714, e.g., an assembly of software components, and data/information 716. Data/information 716 includes UE information 760 and cell ID(s) 762. The UE information 760 includes information on which UEs the base station is serving including any reported information such as UE GPS information (geographic information), cell connection information (e.g., cell ID of the base station's cell or cell sector to which the UE is connected). The cell ID(s) 762 is information on each cell ID corresponding to a cell or cell sector of the wireless base station.

While the details of the first and second wireless interfaces are shown, the other wireless interfaces of the wireless base station, e.g., wireless interface K where K is an integer greater than 2 also include multiple receivers and transmitters so that the wireless base station 700 can provide wireless services to for example a plurality of wireless devices such as user equipment devices. In some embodiments, one or more of the wireless base stations discussed and/or shown in the Figures and/or in connection with the methods discussed herein are implemented in accordance with the wireless base station 700. For example, the wireless base stations shown and/or discussed in connection with FIGS. 1-4 including wireless base stations 104, 108, 110, . . . , 112, 114, 116, 118, 120, . . . 122, the wireless base stations BS 1 1110, . . . , SB M 111 of system 1100 of FIG. 11, base stations 1204 and 1208 of FIG. 12 may be, and in some embodiments are, implemented in accordance with the wireless base station 700.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a first SIM component 812, a second SIM component 814, a connection manager component 816, a storage component 818, a dual SIM dual subscriber mode of operation component 820, a Global Positioning System (GPS) component 822.

The control routines component 802 is configured to control operation of the UE.

The communications component 804 is configured to handle communications, e.g., receipt and transmission of signals and provide protocol signal processing for one or more protocols for the UE.

The message generator component 806 is configured to generate messages for transmission to wireless base stations (e.g., CBSD devices, eNodeBs, gNodeBs) such as messages including UE reporting messages, UE location and signal measurement reporting messages, etc. In some embodiments, the message generator component 806 is a sub-component of the communications component 804.

The message processing component 808 processes received messages, e.g., requests for information, roaming or connection restrictions, instructions for reporting information, e.g., GPS information, physical position information, velocity and heading information, cell ID signal strength information. In some embodiments, the message processing component 808 is a sub-component of the communications component 804.

The determinator component 810 makes determination for the user equipment devices such as for example, whether or not and when to measure signals and record cell ID and signal strength, determine UE location and/or GPS information, report UE GPS information and/or location information and/or signal measurements.

The first SIM component 812 is configured to store Subscriber Identity Information, e.g., a first set of credentials, for obtaining access to a first service provider/operator's wireless network.

The second SIM component 814 is configured to store Subscriber Identity Information, e.g., a second set of credentials, for obtaining access to a second service provider/operator's wireless network.

The connection manager component 816 is configured to manage the communications between the user equipment device and a first network and a second network including determining what cells and/or cell sectors the UE can roam and/or connect to or is not permitted to roam and/or connect to. For example, by implementing roaming/connection restrictions provided as a white list of cell IDs which indicate the cell IDs of cells or cell sectors to which the UE is permitted to roam and/or implementing roaming/connection restrictions provided as a black list of cell IDs which indicate the cell IDs of cells or cell sectors to which the UE is restricted from roaming onto. In some embodiments, the connection manager component 816 is a sub-component of the communications component 804.

The storage component 818 is configured to perform all operations in storing and retrieving information, e.g., UE state information, UE context information, UE location information, UE velocity information, UE heading information, location reporting time intervals, reporting message format and type information, UE roaming/connection restriction information, UE signal measurements, geo-fencing coordinates/information for one or more wireless networks coverage area (e.g., first wireless network coverage area and second wireless network coverage area), Global Positioning System Information, from memory and/or storage devices (e.g., SIMs) located in the user equipment device.

The dual SIM dual subscriber mode of operation component 820 is configured to implement all operations for operating as a dual subscriber in which the user equipment device utilizes both SIM cards to communicate with two different wireless base stations using two different subscriptions, e.g., simultaneously or switching back forth between the two different wireless base stations. This component includes the management of the signaling between the two wireless base stations. In some embodiments, the dual SIM dual subscriber mode of operation component is a sub-component of the communications component 804.

The GPS component 822 generates GPS information from received GPS signals including GPS coordinates or geographical location information, velocity and heading information.

FIG. 9 is a drawing of an exemplary assembly of components 900 which may be included in a communications equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the communications equipment device 600, with the components controlling operation of the communications equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the communications equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, an UE temporary roaming restriction component 910, a determinator component 912, a storage component 914, a white list cell ID generator component 916, a black list cell ID generator component 918, a connection manager component 920, a geo-fence component 922, a GIS component 924, a UE context component 926, a UE reporting interval component 928, an Artificial Intelligence/Machine Learning Component 930, a comparator component 932, a mobility management component 934.

The control routines component 902 is configured to control operation of the communications equipment device. The communication component 904 is configured to handle communications, e.g., transmission and reception of messages, and protocol signaling for the communications equipment device. The message generator component 906 is configured to generate messages for transmission to other devices. Exemplary messages which are generated include temporary roaming restriction instruction messages, UE location reporting instruction messages, and roaming restriction removal message. The message processing component 908 is configured to process messages and implement procedures/operations in response to messages or based on the contents of messages. This includes messages received from other devices, e.g., messages from user equipment devices, messages from wireless base stations, notification messages, messages with instructions, message from AMF in the core network.

The UE temporary roaming restriction component 910 is configured to determine what if any roaming restrictions are to be applied to a user equipment device within a border site and/or based on reported UE location, velocity and heading information and/or signaling measurements. The UE temporary roaming restriction component 910 also generates temporary roaming restrictions instructions for user equipment devices. In some embodiments the UE temporary roaming restriction component 910 is a sub-component of the communications component 904, connection manager component 920 or message generator component 906.

The determinator component 912 is configured to make determinations and decisions for the communications equipment device including for example: determining and/or identifying one or more border sites (e.g., cells or cell sectors in the coverage area of a first wireless network); determining UE roaming restrictions, determining white lists of neighbor cell IDs for a base cell ID, determining black of neighbor cell IDs for base cell ID, determining UE roaming restrictions to be applied based on real time reported UE physical geographic location (e.g., using GPS coordinates), determining UE reporting interval based on cell ID in which UE is located and/or based on UE reported physical geographic location, and/or UE reported velocity and heading, determining whether a notification message is to be sent to a location tracker device based on UE connection to a cell having a particular cell ID.

The storage component 914 is configured to manage the storage, and retrieval of data and/or instructions to/and from memory, and/or storage devices coupled and/or connected to the communications equipment device, e.g., storage of a UE geographic location, velocity and heading data, UE roaming restriction in affect, black list of neighbor cell IDs for UE, white list of neighbor cell IDs for UE; UE location reporting interval, cell ID of UE connection, GIS information of border sites (e.g., cell IDs of cells and/or cell sectors of the native wireless network affected by non-native or foreign network signals), event data tracking/travel data for UEs to be input in to AI/ML system to determine optimal UE reporting intervals, geo-fence coordinates for network, UE signal measurements, UE context information, UE subscriber information, UE identification information, and session identification information.

The white list cell ID generator component 916 is configured to generate and/or modify white lists of neighbor cell IDs for a base cell ID. In some embodiments, the white list cell ID generator component 916 is a sub-component of the UE temporary roaming restriction component 910. The black list cell ID generator component 918 is configured to generate and/or modify black lists of neighbor cell IDs for a base cell ID. In some embodiments, the black list cell ID generator component 918 is a sub-component of the UE temporary roaming restriction component 910. The connection manager component 920 is configured to manage the connection of UEs to different base stations, e.g., by generating and implementing roaming restrictions for UE devices. In some embodiments, the connection manager component 920 is a sub-component of the UE temporary roaming restriction component 910.

The geo-fence component 922 is configured to generate and implement geo-fences, e.g., by generating geo-fences along the borders of a native network based on signals measured and reported by UE devices. The geo-fence component 922 implements geo-fences defining UE roaming restrictions to be implemented by UEs as the cross a geo-fence or report a geographic location that can be used to determine their geographic location with respect to the geo-fence. In some embodiments, the geo-fence generator component 922 is a component that generates a geo-fence around the perimeter of the coverage area of wireless network. In some embodiments, the geo-fence generator component 922 also provides the geographical coordinates of the geo-fence to user equipment devices.

The GIS component 924 implements a geographic information system which maps e.g., border sites, cell IDs, coverage areas for different base stations of the same and different networks, geographic locations, UE restrictions to be applied based on geographic locations and/or UE connection information, reported base station signal strength of different cells/cell sectors, travel information for UEs, and geo-fencing information.

The UE context component 926 generates a record or context of each UE including information correlating UE ID, current location, velocity, heading, cell ID of cell or cell sector to which the UE is connected, any temporary roaming restrictions in effect for the UE, UE reporting interval, UE subscriber information, UE data reported on travel movements for analysis, UE data (signal measurements and location information reported for determination of foreign network interference and coverage).

The UE reporting interval component 928 is configured to determine what reporting interval a UE should use when reporting information (e.g., geographic location information, velocity, heading, signaling measurements) while in a designated border site, for determining border sites or for network definition and optimization purposes.

The Artificial Intelligence/Machine Learning (AI/ML) component 930 is configured to use artificial intelligence machine learning to optimize the UE reporting information based on travel event data collected and reported by the UE over a period of time. The AI/ML component is also configured to use artificial intelligence machine learning to optimize geo-fencing along the perimeter of the native network to keep subscribers of the native network on the native network while within the geo-fenced area, and to evaluate and assess which areas of the native network need to be designated or marked as border sites (e.g., border cells or cell sectors) based on collected base station signal measurements and corresponding physical geographic location information collected and reported by one or more UEs which traverse the coverage area of the native network and/or areas along the border between a native country and a foreign country.

The comparator component 932 is configured to compare data, information and/or records to determine if there is a match.

The mobility management component 934 is configured to perform mobility management functions such as for example assigning GUTI identifiers to UE devices and providing UE connectivity to entities or enforcing roaming UE roaming restrictions.

The specific components of the assembly of components 900 included in any particular communications equipment device may, and typically does vary depending on the specific communications equipment device and the functionality required for the device and/or the operations the communications equipment device is responsible for performing.

Figure 10:
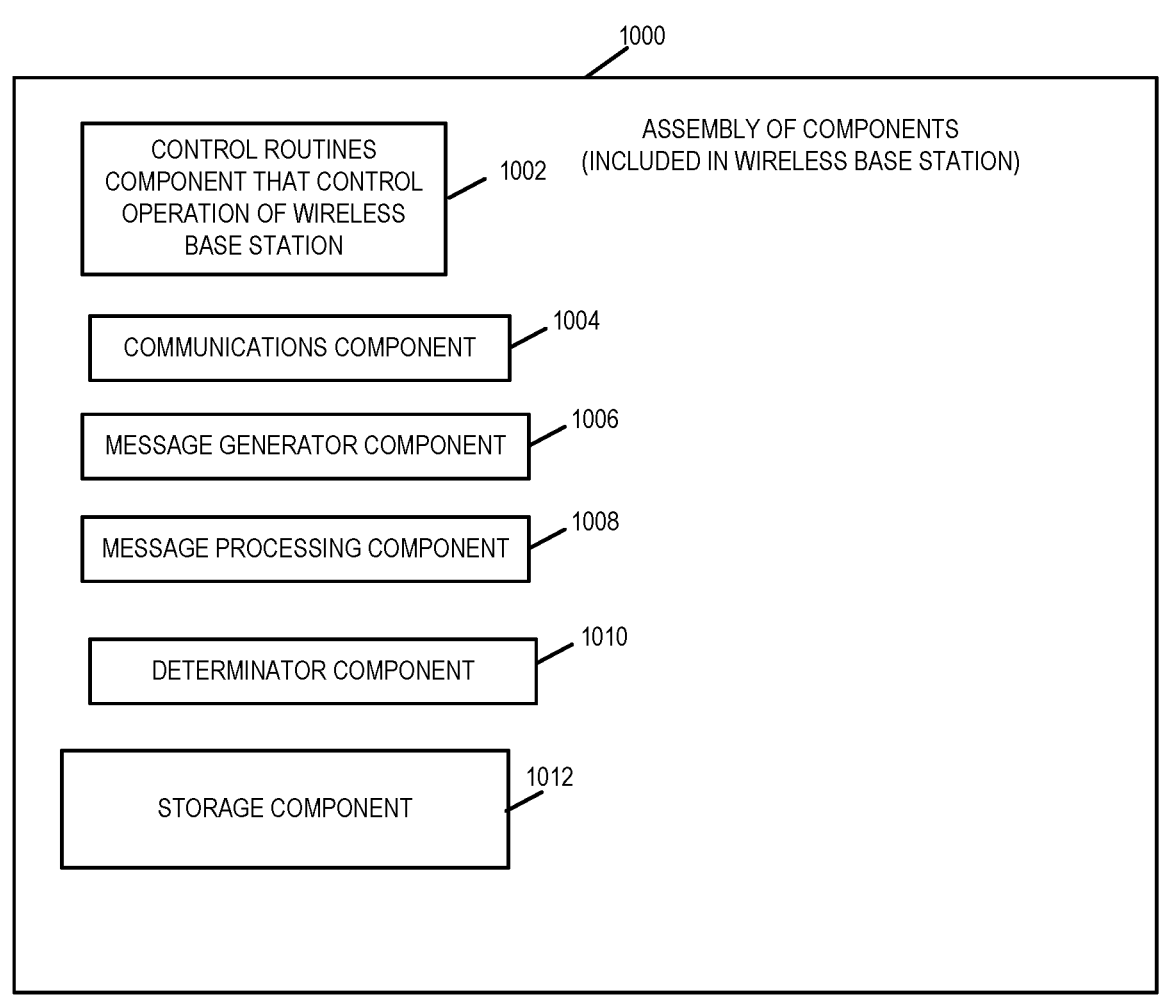
FIG. 10 illustrates an exemplary assembly of components for a wireless base station in accordance with an embodiment of the present invention.

FIG. 10 is a drawing of an exemplary assembly of components 1000 which may be included in an exemplary wireless base station (e.g., exemplary wireless base station 700 of FIG. 7), in accordance with an exemplary embodiment. The components in the assembly of components 1000 can, and in some embodiments are, implemented fully in hardware within a processor, e.g., processor 706, e.g., as individual circuits. The components in the assembly of components 1000 can, and in some embodiments are, implemented fully in hardware within the assembly of hardware components 708, e.g., as individual circuits corresponding to the different components. In other embodiments some of the components are implemented, e.g., as circuits, within processor 706 with other components being implemented, e.g., as circuits within assembly of components 708, external to and coupled to the processor 706. As should be appreciated the level of integration of components on the processor and/or with some components being external to the processor may be one of design choice. Alternatively, rather than being implemented as circuits, all or some of the components may be implemented in software and stored in the memory 712 of the wireless base station 700, with the components controlling operation of wireless base station device 700 to implement the functions corresponding to the components when the components are executed by a processor e.g., processor 706. In some such embodiments, the assembly of components 1000 is included in the memory 712 as assembly of software components 714. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 706, configure the processor to implement the function corresponding to the component. In embodiments where the assembly of components 1000 is stored in the memory 712, the memory 712 is a computer program product comprising a computer readable medium comprising code, e.g., individual code for each component, for causing at least one computer, e.g., processor 706, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 700 or elements therein such as the processor 406, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1002, a communications component 1004, a message generator component 1006, a message processing component 1008, a determinator component 1010, and a storage component 1012.

The control routines component 1002 is configured to control operation of the wireless base station (e.g., eNodeB, gNodeB, CBSD, etc.).

The communication component 1004 is configured to handle communications, e.g., transmission and reception of messages, and protocol signaling for the wireless base station.

The message generator component 1006 is configured to generate messages for transmission to other devices, e.g., request messages, response messages, notification messages, communications messages with network equipment devices, communications messages with user equipment devices. In some embodiments, the message generator component 1006 is a sub-component of the communications component 1004.

The message processing component 1008 is configured to process messages received from other devices and implement operations in response to instructions and/or information included in the processed message, e.g., processing and implementing operations in connection with messages from user equipment devices, messages from network equipment devices. In some embodiments, the message processing component 1008 is a sub-component of the communications component 1004.

The determinator component 1010 is configured to make determinations and decisions for the wireless base station including for example: determining when to send information and/or messages to a network equipment device in a core network or attached to a core network in response to receiving information and/or messages from a user equipment device (e.g., UE location and/or signaling measurement messages, UE reporting messages).

The storage component 1012 is configured to manage the storage, and retrieval of data and/or instructions to/and from memory, buffers in memory, hardware buffers and/or storage device coupled and/or connected to the wireless base station.

Various exemplary numbered embodiments illustrating different features of the present invention will now be discussed. The various features discussed may be used in variety of different combinations. The numbered embodiments are only exemplary and are not meant to be limiting to the scope of the invention. The various method embodiments may be, and in some embodiments are, implemented on system 1100 of FIG. 11.

LIST OF EXEMPLARY NUMBERED METHOD EMBODIMENTS

Method Embodiment 1. A communications method comprising: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

Method Embodiment 1A. The communications method of Method Embodiment 1, wherein the first user equipment device is a subscriber of the first wireless network and includes subscriber identification information for the first wireless network (e.g., a SIM card or e-SIM with subscriber credentials for operation on the first wireless network); and wherein the first wireless network and the second wireless network have a roaming agreement allowing user equipment devices subscribed to the first wireless network (e.g., having first wireless network subscriber credential information) to roam onto the second wireless network to receive services.

Method Embodiment 1B. The communications method of Method Embodiment 1A, further comprising: charging (e.g., by an operator of the second wireless network) roaming charges to any user equipment device of the first wireless network (e.g., subscriber of the first wireless network) that roams onto the second wireless network.

Method Embodiment 1C. The communications method of Method Embodiment 1A, wherein the first wireless network includes a plurality of wireless base stations which are located and operated within a first country, said first wireless base station being one of the plurality of first wireless network base stations located and operated in the first country; wherein the second wireless network includes a plurality of wireless base stations which are located and operated within a second country, said second wireless base station being one of the plurality of second wireless network base stations located and operated in the second country; and wherein one or more of the second wireless network base stations have cell coverage extending into and overlapping with the cell coverage in the first country provided by one or more of the first wireless network base stations.

Method Embodiment 1C1. The communications method of Method Embodiment 1C, wherein the second wireless base station has cell coverage extending into and overlapping with the cell coverage of the first wireless base station in the first country.

Method Embodiment 1D1. The communications method of Method Embodiment 1C, wherein one or more of the first wireless network base stations have cell coverage extending into and overlapping with the cell coverage in the second country provided by one or more of the second wireless network base stations.

Method Embodiment 1D2. The communications method of Method Embodiment 1D, wherein the first wireless network and the second wireless network operate using the same or overlapping wireless spectrum to wirelessly communicate with user equipment devices allowing user equipment devices of the first wireless network to connect to wireless base stations of the second wireless network.

Method Embodiment 1D3. The communications method of Method Embodiment 1D, wherein the first wireless network uses a first set of spectrum to communicate with user equipment devices on the first wireless network and the second wireless network utilizes a second set of spectrum to communicate with user equipment devices on the second wireless network, said first and said second set of spectrum being different; and wherein at least some of the user equipment devices of the first wireless network are equipped to operate on both the first set of spectrum and the second set of spectrum (e.g., by having two transceivers, a first transceiver for communicating on the first set of spectrum and a second transceiver for operating on the second set of spectrum).

Method Embodiment 1E. The communications method of Method Embodiment 1, wherein the temporary roaming restriction instruction also includes a location reporting interval or time period instructing the first user equipment device to report its geographic location on a recurring basis each time the interval or time period expires.

Method Embodiment 1F. The communications method of Method Embodiment 1E, wherein the reporting interval is based on the geographic position of the first user equipment device and one or more of the following: velocity and heading of the first user equipment.

Method Embodiment 1F1. The communications method of Method Embodiment 1F, further comprises: receiving from the first user equipment device travel data for a first period of time (e.g., a month); using an artificial intelligence machine learning system to analyze the first user equipment device travel data to determine travel patterns for first user equipment device; and determining based on said determined travel patterns determining a set of reporting intervals for the first user equipment device.

Method Embodiment 1F2. The communications method of Method Embodiment 1F1, wherein the travel data includes GPS location information, velocity information and heading information for the first wireless device taken at regular intervals (e.g., every 5 minutes).

Method Embodiment 1F3. The communications method of Method Embodiment 1F2, wherein the set of reporting intervals for the first user equipment device include different intervals based on GPS location, velocity, and heading and time of day and day of the week (e.g., different intervals for weekdays than weekends, different intervals for commuting times for the first user equipment device than the non-commuting times).

Method Embodiment 1G. The communications method of Method Embodiment 1F, further comprising: receiving, at the location tracking device of the first wireless network, second geographic location information for the first user equipment device connected to the first wireless base station of the first wireless network at the expiration of the first reporting interval; dynamically determining in real time, by the location tracking device, whether or not to remove the temporary restriction on the first user equipment device from roaming to a second wireless network based on the received second geographic location information; and when said determination is to remove the temporary restriction on the first user equipment device from roaming to the second wireless network, communicating a roaming restriction removal instruction to the first user equipment device, said roaming restriction removal instruction when implemented by the first user equipment device removing any temporary restrictions on the first user equipment device from roaming to the second wireless base station. (This occurs for example when the first user equipment device's second geographic location information indicates that the first user equipment device is outside the first country in which the first wireless network is operating/has base stations or the second geographic location information indicates that the first user equipment device has crossed a geo-fence around the border coverage area of the first wireless network).

Method Embodiment 1G1. The communications method of Method Embodiment 1G, further comprising: when said determination is to not remove the temporary restriction on the first user equipment device from roaming to the second wireless network, determining based on the second geographic location information: (i) whether to shorten, increase, or maintain the reporting interval for the first user equipment device, (ii) whether the temporary roaming restriction instruction needs to be updated (e.g., previously provided white list or black list of cell IDs needs to be updated based on the second geographic location information); and communicating any changed or updated reporting interval or any changed or updated temporary roaming restriction instruction to the first user equipment device.

Method Embodiment 1G2. The communications method of Method Embodiment 1, wherein the determination of whether to shorten, increase, or maintain the reporting interval for the first user equipment device is further based on a velocity and heading (e.g., direction) of the first user equipment device reported with the second geographic location information (e.g., GPS coordinates, velocity and heading).

Method Embodiment 2. The communications method of Method Embodiment 1, wherein the first geographic location information is Global Positioning System (GPS) information including a first set of GPS coordinates for the first user equipment device.

Method Embodiment 3. The communications method of Method Embodiment 2, wherein the temporary roaming restriction instruction includes a list of cell identifiers.

Method Embodiment 3A1. The communications method of Method Embodiment 3, wherein each cell identifier identifies a cell or a cell sector.

Method Embodiment 3A2. The communications method of Method Embodiment 3, wherein each cell identifier is a globally unique identifier.

Method Embodiment 3B. The communications method of Method Embodiment 3, wherein the list of cell identifiers is a black list of cell identifiers which identify neighbor cells and cell sectors of the second wireless network; and wherein said temporary roaming restriction instruction includes an indication that the first user equipment device is restricted from roaming or connecting to all cells and cell sectors with a cell identifier included on the list of cell identifiers.

Method Embodiment 3B1. The communications method of Method Embodiment 3, wherein the list of cell identifiers is a black list of cell identifiers which identify neighbor cells and/or cell sectors of the second wireless network; and wherein said temporary roaming restriction instruction includes an indication that the first user equipment device is restricted from roaming or connecting to any cell and/or cell sector with a cell identifier included on the list of cell identifiers.

Method Embodiment 3C. The communications method of Method Embodiment 3, wherein the list of cell identifiers is a white list of cell identifiers which identify neighbor cells or cell sectors of the first wireless network; and wherein said temporary roaming restriction instruction includes an indication that the first user equipment device is restricted to only roam or connect to a cell or a cell sector having a cell identifier included on the list of cell identifiers.

Method Embodiment 3C1. The communications method of Method Embodiment 3, wherein the list of cell identifiers is a white list of cell identifiers which identify neighbor cells and/or cell sectors of the first wireless network; and wherein said temporary roaming restriction instruction includes an indication that the first user equipment device is restricted to only roam or connect to a cell and/or a cell sector having a cell identifier included on the list of cell identifiers.

Method Embodiment 4. The communications method of Method Embodiment 2, further comprising: prior to said receiving at the location tracking device said first geographic location information for the first user equipment device, determining a cell ID for each cell or cell sector of the second wireless base station with coverage that extends into and overlaps with cell coverage provided by the first wireless base station in a first cell or cell sector of the first wireless base station, said first cell or cell sector of the first wireless base station having a first cell ID; and wherein said first set of GPS coordinates for the first user equipment device indicates the first user equipment device is within a first area of the first cell or cell sector of the first wireless base, said first area of the first cell or cell sector being an area identified by the first wireless network as an area in which user equipment devices of the first wireless network are to be restricted from roaming onto cells or cell sectors of wireless base stations of the second wireless network.

Method Embodiment 4A. The communications method of Method Embodiment 4, wherein said first cell ID is different than any cell ID of any cell or cell sector of the second wireless network.

Method Embodiment 4B. The communications method of Method Embodiment 4A, further comprising: prior to said receiving at the location tracking device said first geographic location information for the first user equipment device, generating a black list of cell IDs for use in restricting user equipment devices connected to the first wireless base station in the first cell or cell sector having the first cell ID from roaming to the second wireless network based on the determined cell IDs for each cell or cell sector of the second wireless base station with coverage that extends into and overlaps with cell coverage provided by the first wireless base station in the first cell or cell sector of the first wireless base station.

Method Embodiment 4C. The communications method of Method Embodiment 4A, further comprising: prior to said receiving at the location tracking device said first geographic location information for the first user equipment device, determining a cell ID for each cell or cell sector of the wireless base station of the first wireless network with coverage that extends into and overlaps with cell coverage provided by the first wireless base station in the first cell or cell sector of the first wireless base station; and generating a white list of cell IDs for use in restricting user equipment devices connected to the first wireless base station in the first cell or cell sector having the first cell ID from roaming to the second wireless network based on the determined cell IDs for each cell or cell sector of the wireless base stations of the first wireless network with coverage that extends into and overlaps with cell coverage provided by the first wireless base station in the first cell or cell sector of the first wireless base station, said user equipment devices being permitted to only roam onto cells or cell sectors with the determined cell IDs on said white list of cell IDs.

Method Embodiment 5. The communications method of Method Embodiment 4, wherein the first area is within a first country in which the first wireless base station is located.

Method Embodiment 6. The communications method of Method Embodiment 1, when said determination is not to restrict the first user equipment device from roaming to the second wireless network, determining by the location tracking device whether any temporary roaming restrictions have been communicated to the first user equipment device which are still in effect; in response to determining that temporary roaming restrictions are still in effect at the first user equipment device generating a roaming restriction removal instruction for the first user equipment device, said roaming restriction removal instruction when implemented by the first user equipment device removes any temporary roaming restrictions previously communicated to the first user equipment device from the location tracker device; and communicating, by the location tracker device, the generated roaming restriction removal instruction to the first user equipment device.

Method Embodiment 6A. The communications method of Method Embodiment 6, in response to determining that no temporary roaming restrictions are still in effect at the first user equipment device refraining, by the location tracker device, from implementing any procedures to temporarily restrict the first user equipment device from roaming onto the second wireless network (e.g., connecting to the second wireless base station).

Method Embodiment 7. The communications method of Method Embodiment 6, further comprising: prior to said receiving at the location tracking device said first geographic location information for the first user equipment device, identifying geographical areas in which temporary roaming restrictions are to be applied to user equipment devices connected to the first wireless base station to prevent roaming from the first wireless base station to the second wireless network; and wherein the first geographic location information indicates the first user equipment device is not located within one of the identified geographical areas in which temporary roaming restrictions are to be applied to user equipment devices connected to the first wireless base station to prevent roaming from the first wireless base station to the second wireless network.

Method Embodiment 8. The communications method of Method Embodiment 7, wherein the identified geographical areas in which temporary roaming restrictions are to be applied to user equipment devices connected to the first wireless base station to prevent roaming from the first wireless base station to the second wireless network are all areas within a first country in which the first wireless network operates and in which the first wireless base station is located.

Method Embodiment 9. The communications method of Method Embodiment 1, further comprising: prior to said receiving at the location tracking device said first geographic location information for the first user equipment device, receiving a first notification message (e.g., from a AMF of the first wireless network), at the location tracker device, said first notification message including information indicating that the first user equipment device is connected to a border site of the first wireless network, the information including a cell identifier and a user equipment device identifier, the cell identifier uniquely identifies the first wireless network cell or cell sector in which the first user equipment device is located, the user equipment device identifier uniquely identifies the first user equipment device; in response to receiving the first notification message generating, by the location tracker device, a first location reporting instruction message, said first location reporting instruction message instructing the first user equipment device to report the first user equipment device's geographical location; and communicating the first location reporting instruction message to the first user equipment device (e.g., via the AMF).

Method Embodiment 10. The communications method of Method Embodiment 9, wherein said first location reporting instruction message includes: a first reporting interval, said first reporting interval indicating that the first user equipment device is to report the first user equipment device's location on a recurring basis when an amount of time equal to the first reporting interval expires; and format information specifying the format in which the geographical location is to be provided, said format information specifying the format to be as Global Positioning System (GPS) coordinates.

Method Embodiment 11. The communications method of Method Embodiment 9, further comprising: generating by the first user equipment device the first geographic location information in response to receiving the first location reporting instruction message, said first geographic location information including the Global Positioning System (GPS) coordinates of the first user equipment device; and communicating the first geographic location information to the location tracker device.

Method Embodiment 12. The communications method of Method Embodiment 1, wherein the first wireless network is a hybrid mobile network operator network operated by a first network operator; wherein the second wireless network is a mobile network operator network operated by a second network operator, said first and second network operators being different; wherein the first network operator and second network operator have entered into an agreement allowing user equipment devices of the first wireless network to operate on the second wireless network; and wherein the coverage area of the first wireless base station and the second wireless base station overlap.

Method Embodiment 13. The communications method of Method Embodiment 1, further comprising: prior to said receiving at the location tracking device said first geographic location information for the first user equipment device, determining geographical boundaries of the first wireless network with respect to the second wireless network; and wherein making the determination of whether or not to restrict the first user equipment device from roaming to the second wireless network based on the received first geographical location information includes: determining, by the location tracker device, whether or not the first geographic location information indicates that the first user equipment device is located within the determined boundaries of the first wireless network.

Method Embodiment 14. The communications method of Method Embodiment 13, wherein the first wireless network is a hybrid mobile network operator network operated by a first network operator; wherein the second wireless network is a mobile network operator network operated by a second network operator, said first and second network operators being different; wherein the first network operator and second network operator have entered into an agreement allowing user equipment devices of the first wireless network to operate on the second wireless network; and wherein the coverage area of the first wireless base station and the second wireless base station overlap.

LIST OF EXEMPLARY NUMBERED
APPARATUS EMBODIMENTS

Apparatus Embodiment 1. A location tracker device for a wireless network comprising: memory; and a first processor, said first processor controlling the location tracker device to perform the following operations: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

Apparatus Embodiment 1A. The location tracker device of Apparatus Embodiment 1, wherein the first user equipment device is a subscriber of the first wireless network and includes subscriber identification information for the first wireless network (e.g., a SIM card or e-SIM with subscriber credentials for operation on the first wireless network); and wherein the first wireless network and the second wireless network have a roaming agreement allowing user equipment devices subscribed to the first wireless network (e.g., having first wireless network subscriber credential information) to roam onto the second wireless network to receive services.

Apparatus Embodiment 1B. The location tracker device of Apparatus Embodiment 1A, wherein the first processor further controls the location tracker device to perform the following operations: charging (e.g., by an operator of the second wireless network) roaming charges to any user equipment device of the first wireless network (e.g., subscriber of the first wireless network) that roams onto the second wireless network.

Apparatus Embodiment 1C. The location tracker device of Apparatus Embodiment 1A, wherein the first wireless network includes a plurality of wireless base stations which are located and operated within a first country, said first wireless base station being one of the plurality of first wireless network base stations located and operated in the first country; wherein the second wireless network includes a plurality of wireless base stations which are located and operated within a second country, said second wireless base station being one of the plurality of second wireless network base stations located and operated in the second country; and wherein one or more of the second wireless network base stations have cell coverage extending into and overlapping with the cell coverage in the first country provided by one or more of the first wireless network base stations.

Apparatus Embodiment 1C1. The location tracker device of Apparatus Embodiment 1C, wherein the second wireless base station has cell coverage extending into and overlapping with the cell coverage of the first wireless base station in the first country.

Apparatus Embodiment 1D. The location tracker device of Apparatus Embodiment 1C, wherein one or more of the first wireless network base stations have cell coverage extending into and overlapping with the cell coverage in the second country provided by one or more of the second wireless network base stations.

Apparatus Embodiment 1E. The location tracker device of Apparatus Embodiment 1D, wherein the first wireless network and the second wireless network operate using the same or overlapping wireless spectrum to wirelessly communicate with user equipment devices allowing user equipment devices of the first wireless network to connect to wireless base stations of the second wireless network.

Apparatus Embodiment 1F. The location tracker device of Apparatus Embodiment 1D, wherein the first wireless network uses a first set of spectrum to communicate with user equipment devices on the first wireless network and the second wireless network utilizes a second set of spectrum to communicate with user equipment devices on the second wireless network, said first and said second set of spectrum being different; and wherein at least some of the user equipment devices of the first wireless network are equipped to operate on both the first set of spectrum and the second set of spectrum (e.g., by having two transceivers, a first transceiver for communicating on the first set of spectrum and a second transceiver for operating on the second set of spectrum).

Apparatus Embodiment 1G. The location tracker device of Apparatus Embodiment 1, wherein the location tracker device is located in a first core network of the first wireless network.

Apparatus Embodiment 1H. The communications method of Apparatus Embodiment 1, wherein the temporary roaming restriction instruction also includes a location reporting interval or time period instructing the first user equipment device to report its geographic location on a recurring basis each time the interval or time period expires.

Apparatus Embodiment 1I. The communications method of Apparatus Embodiment 1H, wherein the reporting interval is based on the geographic position of the first user equipment device and one or more of the following: velocity and heading of the first user equipment.

Apparatus Embodiment 1I1. The communications method of Apparatus Embodiment 1I, further comprises: receiving from the first user equipment device travel data for a first period of time (e.g., a month); using an artificial intelligence machine learning system to analyze the first user equipment device travel data to determine travel patterns for first user equipment device; and determining based on said determined travel patterns determining a set of reporting intervals for the first user equipment device.

Apparatus Embodiment 1I2. The communications method of Apparatus Embodiment 1I1, wherein the travel data includes GPS location information, velocity information and heading information for the first wireless device taken at regular intervals (e.g., every 5 minutes).

Apparatus Embodiment 1I3. The communications method of Apparatus Embodiment 1I2, wherein the set of reporting intervals for the first user equipment device include different intervals based on GPS location, velocity, and heading and time of day and day of the week (e.g., different intervals for weekdays than weekends, different intervals for commuting times for the first user equipment device than the non-commuting times).

Apparatus Embodiment 1J. The communications method of Apparatus Embodiment 1I, further comprising: receiving, at the location tracking device of the first wireless network, second geographic location information for the first user equipment device connected to a first wireless base station of the first wireless network at the expiration of the first reporting interval; dynamically determining in real time, by the location tracking device, whether or not to remove the restriction on the first user equipment device from roaming to a second wireless network based on the received second geographic location information; and when said determination is to remove the restriction on the first user equipment device from roaming to the second wireless network, communicating a roaming restriction removal instruction to the first user equipment device, said roaming restriction removal instruction when implemented by the first user equipment device removing any temporary restrictions on the first user equipment device from roaming to the second wireless base station. This occurs for example when the first user equipment device's second geographic location information indicates that the first user equipment device is outside the first country in which the first wireless network is operating/has base stations or the second geographic location information indicates that the first user equipment device has crossed a geo-fence around the border coverage area of the first wireless network).

Apparatus Embodiment 1J1. The communications method of Apparatus Embodiment 1J, further comprising: when said determination is to not remove the restriction on the first user equipment device from roaming to the second wireless network, determining based on the second geographic location information: (i) whether to shorten, increase, or maintain the reporting interval for the first user equipment device, (ii) whether the temporary roaming restriction instruction needs to be updated (e.g., previously provided white list or black list of cell IDs needs to be updated based on the second geographic location information); and communicating any changed or updated reporting interval or any changed or updated roaming restriction instruction to the first user equipment device.

Apparatus Embodiment 2. The location tracker device of Apparatus Embodiment 1, wherein the first geographic location information is Global Positioning System (GPS) information including a first set of GPS coordinates for the first user equipment device.

Apparatus Embodiment 3. The location tracker device of Apparatus Embodiment 2, wherein the temporary roaming restriction instruction includes a list of cell identifiers.

Apparatus Embodiment 3A1. The location tracker device of Apparatus Embodiment 3, wherein each cell identifier identifies a cell or a cell sector.

Apparatus Embodiment 3A2. The location tracker device of Apparatus Embodiment 3, wherein each cell identifier is a globally unique identifier.

Apparatus Embodiment 3B. The location tracker device of Apparatus Embodiment 3, wherein the list of cell identifiers is a black list of cell identifiers which identify neighbor cells and cell sectors of the second wireless network; and wherein said temporary roaming restriction instruction includes an indication that the first user equipment device is restricted from roaming or connecting to all cells and cell sectors with a cell identifier included on the list of cell identifiers.

Apparatus Embodiment 3B1. The location tracker device of Apparatus Embodiment 3, wherein the list of cell identifiers is a black list of cell identifiers which identify neighbor cells and/or cell sectors of the second wireless network; and wherein said temporary roaming restriction instruction includes an indication that the first user equipment device is restricted from roaming or connecting to any cell and/or cell sector with a cell identifier included on the list of cell identifiers.

Apparatus Embodiment 3C. The location tracker device of Apparatus Embodiment 3, wherein the list of cell identifiers is a white list of cell identifiers which identify neighbor cells or cell sectors of the first wireless network; and wherein said temporary roaming restriction instruction includes an indication that the first user equipment device is restricted to only roam or connect to a cell or a cell sector having a cell identifier included on the list of cell identifiers.

Apparatus Embodiment 3C1. The location tracker device of Apparatus Embodiment 3, wherein the list of cell identifiers is a white list of cell identifiers which identify neighbor cells and/or cell sectors of the first wireless network; and wherein said temporary roaming restriction instruction includes an indication that the first user equipment device is restricted to only roam or connect to a cell and/or a cell sector having a cell identifier included on the list of cell identifiers.

Apparatus Embodiment 4. The location tracker device of Apparatus Embodiment 2, wherein the first processor further controls the location tracker device to perform the following additional operations: prior to said receiving at the location tracking device said first geographic location information for the first user equipment device, determining a cell ID for each cell or cell sector of the second wireless base station with coverage that extends into and overlaps with cell coverage provided by the first wireless base station in a first cell or cell sector of the first wireless base station, said first cell or cell sector of the first wireless base station having a first cell ID; and wherein said first set of GPS coordinates for the first user equipment device indicates the first user equipment device is within a first area of the first cell or cell sector of the first wireless base, said first area of the first cell or cell sector being an area identified by the first wireless network as an area in which user equipment devices of the first wireless network are to be restricted from roaming onto cells or cell sectors of wireless base stations of the second wireless network.

Apparatus Embodiment 4A. The location tracker device of Apparatus Embodiment 4, wherein said first cell ID is different than any cell ID of any cell or cell sector of the second wireless network.

Apparatus Embodiment 4B. The location tracker device of Apparatus Embodiment 4A, further comprising: prior to said receiving at the location tracking device said first geographic location information for the first user equipment device, generating a black list of cell IDs for use in restricting user equipment devices connected to the first wireless base station in the first cell or cell sector having the first cell ID from roaming to the second wireless network based on the determined cell IDs for each cell or cell sector of the second wireless base station with coverage that extends into and overlaps with cell coverage provided by the first wireless base station in the first cell or cell sector of the first wireless base station.

Apparatus Embodiment 4C. The location tracker device of Apparatus Embodiment 4A, wherein the first processor further controls the location tracker device to perform the following operations: prior to said receiving at the location tracking device said first geographic location information for the first user equipment device, determining a cell ID for each cell or cell sector of the wireless base station of the first wireless network with coverage that extends into and overlaps with cell coverage provided by the first wireless base station in the first cell or cell sector of the first wireless base station; and generating a white list of cell IDs for use in restricting user equipment devices connected to the first wireless base station in the first cell or cell sector having the first cell ID from roaming to the second wireless network based on the determined cell IDs for each cell or cell sector of the wireless base stations of the first wireless network with coverage that extends into and overlaps with cell coverage provided by the first wireless base station in the first cell or cell sector of the first wireless base station, said user equipment devices being permitted to only roam onto cells or cell sectors with the determined cell IDs on said white list of cell IDs.

Apparatus Embodiment 5. The location tracker device of Apparatus Embodiment 4, wherein the first area is within a first country in which the first wireless base station is located.

Apparatus Embodiment 6. The location tracker device of Apparatus Embodiment 1, when said determination is not to restrict the first user equipment device from roaming to the second wireless network, determining by the location tracking device whether any temporary roaming restrictions have been communicated to the first user equipment device which are still in effect; in response to determining that temporary roaming restrictions are still in effect at the first user equipment device generating a roaming restriction removal instruction for the first user equipment device, said roaming restriction removal instruction when implemented by the first user equipment device removes any temporary roaming restrictions previously communicated to the first user equipment device from the location tracker device; and communicating, by the location tracker device, the generated roaming restriction removal instruction to the first user equipment device.

Apparatus Embodiment 6A. The location tracker device of Apparatus Embodiment 6, in response to determining that no temporary roaming restrictions are still in effect at the first user equipment device refraining, by the location tracker device, from implementing any procedures to temporarily restrict the first user equipment device from roaming onto the second wireless network (e.g., connecting to the second wireless base station).

Apparatus Embodiment 7. The location tracker device of Apparatus Embodiment 6, wherein the first processor further controls the location tracker device to perform the following operation: prior to said receiving at the location tracking device said first geographic location information for the first user equipment device, identifying geographical areas in which temporary roaming restrictions are to be applied to user equipment devices connected to the first wireless base station to prevent roaming from the first wireless base station to the second wireless network; and wherein the first geographic location information indicates the first user equipment device is not located within one of the identified geographical areas in which temporary roaming restrictions are to be applied to user equipment devices connected to the first wireless base station to prevent roaming from the first wireless base station to the second wireless network.

Apparatus Embodiment 8. The location tracker device of Apparatus Embodiment 7, wherein the identified geographical areas in which temporary roaming restrictions are to be applied to user equipment devices connected to the first wireless base station to prevent roaming from the first wireless base station to the second wireless network are all areas within a first country in which the first wireless network operates and in which the first wireless base station is located.

Apparatus Embodiment 9. The location tracker device of Apparatus Embodiment 1, wherein the first processor further controls the location tracker device to perform the following operations: prior to said receiving at the location tracking device said first geographic location information for the first user equipment device, receiving a first notification message (e.g., from a AMF of the first wireless network), at the location tracker device, said first notification message including information indicating that the first user equipment device is connected to a border site of the first wireless network, the information including a cell identifier and a user equipment device identifier, the cell identifier uniquely identifies the first wireless network cell or cell sector in which the first user equipment device is located, the user equipment device identifier uniquely identifies the first user equipment device; in response to receiving the first notification message generating, by the location tracker device, a first location reporting instruction message, said first location reporting instruction message instructing the first user equipment device to report the first user equipment device's geographical location; and communicating the first location reporting instruction message to the first user equipment device (e.g., via the AMF).

Apparatus Embodiment 10. The location tracker device of Apparatus Embodiment 9, wherein said first location reporting instruction message includes: a first reporting interval, said first reporting interval indicating that the first user equipment device is to report the first user equipment device's location on a recurring basis when an amount of time equal to the first reporting interval expires; and format information specifying the format in which the geographical location is to be provided, said format information specifying the format to be as Global Positioning System (GPS) coordinates.

Apparatus Embodiment 11. The location tracker device of Apparatus Embodiment 9, wherein the first geographic location information is generated by the first user equipment in response to the first user equipment device receiving the first location reporting instruction message from the location tracker device, said first geographic location information including the Global Positioning System (GPS) coordinates of the first user equipment device; and wherein the first user equipment device communicates the first geographic location information to the location tracker device.

Apparatus Embodiment 12. The location tracker device of Apparatus Embodiment 1, wherein the first wireless network is a hybrid mobile network operator network operated by a first network operator; wherein the second wireless network is a mobile network operator network operated by a second network operator, said first and second network operators being different; wherein the first network operator and second network operator have entered into an agreement allowing user equipment devices of the first wireless network to operate on the second wireless network; and wherein the coverage area of the first wireless base station and the second wireless base station overlap.

Apparatus Embodiment 13. The location tracker device of Apparatus Embodiment 1, wherein the first processor further controls the location tracker device to perform the following operation: prior to said receiving at the location tracking device said first geographic location information for the first user equipment device, determining geographical boundaries of the first wireless network with respect to the second wireless network; and wherein making the determination of whether or not to restrict the first user equipment device from roaming to the second wireless network based on the received first geographical location information includes: determining, by the location tracker device, whether or not the first geographic location information indicates that the first user equipment device is located within the determined boundaries of the first wireless network.

Apparatus Embodiment 14. The location tracker device of Apparatus Embodiment 13, wherein the first wireless network is a hybrid mobile network operator network operated by a first network operator; wherein the second wireless network is a mobile network operator network operated by a second network operator, said first and second network operators being different; wherein the first network operator and second network operator have entered into an agreement allowing user equipment devices of the first wireless network to operate on the second wireless network; and wherein the coverage area of the first wireless base station and the second wireless base station overlap.

Apparatus Embodiment 13. The location tracker device of Apparatus Embodiment 3, wherein the first wireless network is a Multiple System Operator (MSO) network (e.g., cable and wireless system network such as Charter's network of CBRS cells and cable system) operated by a first operator (e.g., Charter); wherein the second wireless network is a Mobile Network Operator network (e.g., carrier cellular wireless network such as Verizon's wireless network) operated by a second operator (e.g., carrier network such as Verizon) for the first operator (e.g., Charter) as a Mobile Virtual Network; and wherein the first wireless network and the second wireless network are operated independently and have overlapping coverage areas.

LIST OF EXEMPLARY NUMBERED SYSTEM EMBODIMENTS

System Embodiment 1. A communications system comprising: a first wireless network including a plurality of wireless base stations, a first wireless core network coupled or connected to each of the plurality of wireless base stations; and a location tracker device, said location tracker device including: memory, and a first processor, said first processor controlling the location tracker device to perform the following operations: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

System Embodiment 2. The communications system of System Embodiment 1, wherein the location tracker device is located in the first core network.

System Embodiment 3. The communications system of System Embodiment 1, wherein the location tracker device is not part of the first core network but is coupled or connected to the elements (e.g., devices) of the first core network.

LIST OF EXEMPLARY NUMBERED NON-TRANSITORY COMPUTER READABLE MEDIUM EMBODIMENTS

Non-transitory Computer Readable Medium Embodiment 1. A non-transitory computer readable medium including a first set of computer executable instructions which when executed by a processor of a location tracker device causes the location tracker device to perform the steps of: receiving, at a location tracking device of a first wireless network, first geographic location information for a first user equipment device connected to a first wireless base station of the first wireless network; determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

Non-transitory Computer Readable Medium Embodiment 2. The non-transitory computer readable medium of Non-transitory Computer Readable Medium Embodiment 1, wherein the first geographic location information is Global Positioning System (GPS) information including a first set of GPS coordinates for the first user equipment device.

Non-transitory Computer Readable Medium Embodiment 3. The non-transitory computer readable medium of Non-transitory Computer Readable Medium Embodiment 2, wherein the temporary roaming restriction instruction includes a list of cell identifiers.

Non-transitory Computer Readable Medium Embodiment 3A1. The non-transitory computer readable medium of Non-transitory Computer Readable Medium Embodiment 3, wherein each cell identifier identifies a cell or a cell sector.

The non-transitory computer readable medium of Non-transitory Computer Readable Medium Embodiment 3A2. The location tracker device of Apparatus Embodiment 3, wherein each cell identifier is a globally unique identifier.

Non-transitory Computer Readable Medium Embodiment 3B. The non-transitory computer readable medium of Non-transitory Computer Readable Medium Embodiment 3, wherein the list of cell identifiers is a black list of cell identifiers which identify neighbor cells and cell sectors of the second wireless network; and wherein said temporary roaming restriction instruction includes an indication that the first user equipment device is restricted from roaming or connecting to all cells and cell sectors with a cell identifier included on the list of cell identifiers.

Non-transitory Computer Readable Medium Embodiment 3B1. The non-transitory computer readable medium of Non-transitory Computer Readable Medium Embodiment 3, wherein the list of cell identifiers is a black list of cell identifiers which identify neighbor cells and/or cell sectors of the second wireless network; and wherein said temporary roaming restriction instruction includes an indication that the first user equipment device is restricted from roaming or connecting to any cell and/or cell sector with a cell identifier included on the list of cell identifiers.

Non-transitory Computer Readable Medium Embodiment 3C. The non-transitory computer readable medium of Non-transitory Computer Readable Medium Embodiment 3, wherein the list of cell identifiers is a white list of cell identifiers which identify neighbor cells or cell sectors of the first wireless network; and wherein said temporary roaming restriction instruction includes an indication that the first user equipment device is restricted to only roam or connect to a cell or cell sector having a cell identifier included on the list of cell identifiers.

Non-transitory Computer Readable Medium Embodiment 3C1. The non-transitory computer readable medium of Non-transitory Computer Readable Medium Embodiment 3, wherein the list of cell identifiers is a white list of cell identifiers which identify neighbor cells and/or cell sectors of the first wireless network; and wherein said temporary roaming restriction instruction includes an indication that the first user equipment device is restricted to only roam or connect to a cell and/or cell sector having a cell identifier included on the list of cell identifiers.

The techniques of various embodiments may be implemented using software, hardware and/or a combination of software and hardware. Various embodiments are directed to apparatus, e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements. Various embodiments are also directed to methods, e.g., method of controlling and/or operating e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements described herein are implemented using one or more components to perform the steps corresponding to one or more methods, for example, generating or creating cell ID lists, GPS information, generating messages, implementing roaming restrictions, comparing data and information, signal processing, sending, comparing, identifying, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements are configured to perform the steps of the methods described as being performed by the e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements, with a processor which includes a component corresponding to each of the steps of the various described methods performed by the device in which the processor is included. In some but not all embodiments a device, e.g., e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in e.g., wireless base stations, wireless devices, mobile terminals, network equipment, communications devices, eNBs, gNBs, CBSDs, location tracker devices, location tracking service devices, Geographic Information Systems, Artificial Intelligence Machine Learning systems, mobility management entities, Access and Mobility Management Function devices/nodes, smart devices, user equipment devices, computers, smartphones, wireless networks, subscriber devices, network cores, Evolved Packet Cores (EPCs), servers, nodes, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
  determining geographical boundaries of a first wireless network with respect to a second wireless network;
  subsequent to determining said geographical boundaries of the first wireless network with respect to the second wireless network, receiving, at a location tracking device of the first wireless network, first geographic location information for a first user equipment device connected to a first wireless base station of the first wireless network;
  determining, by the location tracking device, whether or not to restrict the first user equipment device from roaming to the second wireless network based on the received first geographic location information, said determining whether or not to restrict the first user equipment device from roaming to the second wireless network based on the received first geographic location information includes: determining, by the location tracking device, whether or not the first geographic location information indicates that the first user equipment device is located within the determined geographical boundaries of the first wireless network; and
  when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

2. The communications method of claim 1, wherein the first geographic location information is Global Positioning System (GPS) information including a first set of GPS coordinates for the first user equipment device.

3. The communications method of claim 2, wherein the temporary roaming restriction instruction includes a list of cell identifiers.

4. The communications method of claim 2, further comprising:
  prior to said receiving at the location tracking device said first geographic location information for the first user equipment device,
    determining a cell ID for each cell or cell sector of the second wireless base station with coverage that extends into and overlaps with cell coverage provided by the first wireless base station in a first cell or cell sector of the first wireless base station, said first cell or cell sector of the first wireless base station having a first cell ID; and
    wherein said first set of GPS coordinates for the first user equipment device indicates the first user equipment device is within a first area of the first cell or cell sector of the first wireless base station, said first area of the first cell or cell sector being an area identified by the first wireless network as an area in which user equipment devices of the first wireless network are to be restricted from roaming onto cells or cell sectors of wireless base stations of the second wireless network.

5. The communications method of claim 4,
  wherein the first area is within a first country in which the first wireless base station is located.

6. The communications method of claim 1, further comprising:
  prior to said receiving at the location tracking device said first geographic location information for the first user equipment device,
    receiving a first notification message, at the location tracking device, said first notification message including information indicating that the first user equipment device is connected to a border site of the first wireless network, the information including a cell identifier and a user equipment device identifier, the cell identifier uniquely identifies the first wireless network cell or cell sector in which the first user equipment device is located, the user equipment device identifier uniquely identifies the first user equipment device;
    in response to receiving the first notification message, generating, by the location tracking device, a first location reporting instruction message, said first location reporting instruction message instructing the first user equipment device to report the first user equipment device's geographical location; and
    communicating the first location reporting instruction message to the first user equipment device.

7. A communications method comprising:
  receiving, at a location tracking device of a first wireless network, first geographic location information for a first user equipment device connected to a first wireless base station of the first wireless network; and
  determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network; and when said determination is not to restrict the first user equipment device from roaming to the second wireless network, performing the following operations by the location tracking device:

(i) determining by the location tracking device whether any temporary roaming restrictions have been communicated to the first user equipment device which are still in effect;

(ii) in response to determining that temporary roaming restrictions are still in effect at the first user equipment device generating a roaming restriction removal instruction for the first user equipment device, said roaming restriction removal instruction when implemented by the first user equipment device removes any temporary roaming restrictions previously communicated to the first user equipment device from the location tracking device; and (iii) communicating, by the location tracking device, the generated roaming restriction removal instruction to the first user equipment device.

8. The communications method of claim 7, further comprising:

prior to said receiving at the location tracking device said first geographic location information for the first user equipment device, identifying geographical areas in which temporary roaming restrictions are to be applied to user equipment devices connected to the first wireless base station to prevent roaming from the first wireless base station to the second wireless network; and wherein the first geographic location information indicates the first user equipment device is not located within one of the identified geographical areas in which temporary roaming restrictions are to be applied to user equipment devices connected to the first wireless base station to prevent roaming from the first wireless base station to the second wireless network.

9. The communications method of claim 8, wherein the identified geographical areas in which temporary roaming restrictions are to be applied to user equipment devices connected to the first wireless base station to prevent roaming from the first wireless base station to the second wireless network are all areas within a first country in which the first wireless network operates and in which the first wireless base station is located.

10. A communications method comprising:

receiving, at a location tracking device of a first wireless network, first geographic location information for a first user equipment device connected to a first wireless base station of the first wireless network;

determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network; and wherein the first wireless network is a hybrid mobile network operator network operated by a first network operator;

wherein the second wireless network is a mobile network operator network operated by a second network operator, said first and second network operators being different;

wherein the first network operator and second network operator have entered into an agreement allowing user equipment devices of the first wireless network to operate on the second wireless network; and wherein coverage areas of the first wireless base station and the second wireless base station overlap.

11. A location tracking device of a first wireless network comprising:

memory, and a first processor, said first processor controlling the location tracking device to perform the following operations:

determining, by the location tracking device, geographical boundaries of the first wireless network with respect to a second wireless network;

subsequent to determining said geographic boundaries of the first wireless network with respect to the second wireless network, receiving, at the location tracking device of the first wireless network, first geographic location information for a first user equipment device connected to a first wireless base station of the first wireless network;

determining, by the location tracking device, whether or not to restrict the first user equipment device from roaming to the second wireless network based on the received first geographic location information, said determining whether or not to restrict the first user equipment device from roaming to the second wireless network based on the received first geographic location information includes: determining, by the location tracking device, whether or not the first geographic location information indicates that the first user equipment device is located within the determined geographical boundaries of the first wireless network; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

12. The location tracking device of claim 11, wherein the first geographic location information is Global Positioning System (GPS) information including a first set of GPS coordinates for the first user equipment device.

13. The location tracking device of claim 12, wherein the temporary roaming restriction instruction includes a list of cell identifiers.

14. The location tracking device of claim 12, wherein the first processor further controls the location tracking device to perform the following additional operations:

prior to said receiving at the location tracking device said first geographic location information for the first user equipment device, determining a cell ID for each cell or cell sector of the second wireless base station with coverage that extends into and overlaps with cell coverage provided by the first wireless base station in a first cell or cell sector of the first wireless base station, said first cell or cell sector of the first wireless base station having a first cell ID; and wherein said first set of GPS coordinates for the first user equipment device indicates the first user equipment device is within a first area of the first cell or cell sector of the first wireless base station, said first area of the first cell or cell sector being an area identified by the first wireless network as an area in which user equipment devices of the first wireless network are to be restricted from roaming onto cells or cell sectors of wireless base stations of the second wireless network.

15. The location tracking device of claim 14, wherein the first area is within a first country in which the first wireless base station is located.

16. A location tracking device of a first wireless network comprising:

memory, and a first processor, said first processor controlling the location tracking device to perform the following operations:

receiving, at the location tracking device of the first wireless network, first geographic location information for a first user equipment device connected to a first wireless base station of the first wireless network;

determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network; and when said determination is not to restrict the first user equipment device from roaming to the second wireless network, (i) determining by the location tracking device whether any temporary roaming restrictions have been communicated to the first user equipment device which are still in effect;

(ii) in response to determining that temporary roaming restrictions are still in effect at the first user equipment device generating a roaming restriction removal instruction for the first user equipment device, said roaming restriction removal instruction when implemented by the first user equipment device removes any temporary roaming restrictions previously communicated to the first user equipment device from the location tracking device; and (iii) communicating, by the location tracking device, the generated roaming restriction removal instruction to the first user equipment device.

17. The location tracking device of claim 16, wherein the first processor further controls the location tracking device to perform the following additional operation:

prior to said receiving at the location tracking device said first geographic location information for the first user equipment device, identifying geographical areas in which temporary roaming restrictions are to be applied to user equipment devices connected to the first wireless base station to prevent roaming from the first wireless base station to the second wireless network; and wherein the first geographic location information indicates the first user equipment device is not located within one of the identified geographical areas in which temporary roaming restrictions are to be applied to user equipment devices connected to the first wireless base station to prevent roaming from the first wireless base station to the second wireless network.

18. The location tracking device of claim 17, wherein the identified geographical areas in which temporary roaming restrictions are to be applied to user equipment devices connected to the first wireless base station to prevent roaming from the first wireless base station to the second wireless network are all areas within a first country in which the first wireless network operates and in which the first wireless base station is located.

19. A non-transitory computer readable medium including a first set of computer executable instructions which when executed by a processor of a location tracking device of a first wireless network causes the location tracking device to perform the steps of:

determining geographical boundaries of the first wireless network with respect to a second wireless network;

subsequent to determining said geographical boundaries of the first wireless network with respect to the second wireless network, receiving, at the location tracking device of the first wireless network, first geographic location information for a first user equipment device connected to a first wireless base station of the first wireless network;

determining, by the location tracking device, whether or not to restrict the first user equipment device from roaming to the second wireless network based on the received first geographic location information, said determining whether or not to restrict the first user equipment device from roaming to the second wireless network based on the received first geographic location information includes: determining, by the location tracking device, whether or not the first geographic location information indicates that the first user equipment device is located within the determined geographical boundaries of the first wireless network; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network.

20. A location tracking device of a first wireless network comprising:

memory, and a first processor, said first processor controlling the location tracking device to perform the following operations:

receiving, at the location tracking device of the first wireless network, first geographic location information for a first user equipment device connected to a first wireless base station of the first wireless network;

determining, by the location tracking device, whether or not to restrict the first user equipment device from roaming to a second wireless network based on the received first geographic location information; and when said determination is to restrict the first user equipment device from roaming to the second wireless network, communicating a temporary roaming restriction instruction to the first user equipment device, said temporary roaming restriction instruction when implemented by the first user equipment device restricting the first user equipment device from roaming to a second wireless base station, said second wireless base station being part of the second wireless network;

wherein the first wireless network is a hybrid mobile network operator network operated by a first network operator;

wherein the second wireless network is a mobile network operator network operated by a second network operator, said first and second network operators being different;

wherein the first network operator and second network operator have entered into an agreement allowing user equipment devices of the first wireless network to operate on the second wireless network; and wherein coverage areas of the first wireless base station and the second wireless base station overlap.

* * * * *